(12) United States Patent

Schochet et al.

(10) Patent No.: US 12,670,505 B1

(45) Date of Patent: Jun. 30, 2026

(54) DISTRIBUTED ARCHITECTURE FOR DATA TRANSPARENCY PLATFORM

(71) Applicant: Arktos Technologies, Inc., New York, NY (US)

(72) Inventors: Jordan Schochet, New York, NY (US); James Kennington, State College, PA (US); William Colwell, New York, NY (US)

(73) Assignee: Arktos Technologies, Inc., New York, NY (US)

( * ) Notice: Subject to any disclaimer, the term of this patent is extended or adjusted under 35 U.S.C. 154(b) by 0 days.

(21) Appl. No.: 18/436,489

(22) Filed: Feb. 8, 2024

Related U.S. Application Data

(60) Provisional application No. 63/483,897, filed on Feb. 8, 2023.

(51) Int. Cl.
*G06Q 30/0201* (2023.01)
*G06Q 40/04* (2012.01)

(52) U.S. Cl.
CPC ......... *G06Q 30/0201* (2013.01); *G06Q 40/04* (2013.01)

(58) Field of Classification Search
None
See application file for complete search history.

(56) References Cited

U.S. PATENT DOCUMENTS

| | | | |
|---|---|---|---|
| 5,978,778 A | 11/1999 | O'Shaughnessy |
| 7,461,027 B1 | 12/2008 | Volpert |
| 7,653,582 B2 | 1/2010 | Costache et al. |
| 7,870,052 B1 | 1/2011 | Goldberg et al. |
| 7,873,595 B2 | 1/2011 | Singh et al. |

| | | | |
|---|---|---|---|
| 7,937,316 B2 | 5/2011 | Friedman et al. |
| 8,244,616 B1 | 8/2012 | Ben Dor et al. |
| 8,374,951 B2 | 2/2013 | Arnott et al. |
| 8,452,682 B1 | 5/2013 | Gastineau et al. |
| 8,756,140 B1 | 6/2014 | Menchero et al. |

(Continued)

FOREIGN PATENT DOCUMENTS

| | | | | | |
|---|---|---|---|---|---|
| EP | 4597317 A1 | * | 8/2025 | ............. | G06N 3/105 |
| WO | WO-2011033109 A1 | * | 3/2011 | ............. | G06Q 40/06 |

(Continued)

OTHER PUBLICATIONS

Marszk et al., Exchange-Traded Funds on European Markets: Has Critical Mass been Reached? Implications for Financial Systems (Year: 2020).*

(Continued)

*Primary Examiner* — Mohamed N El-Bathy

(74) *Attorney, Agent, or Firm* — Fish & Richardson P.C.

(57) ABSTRACT

Described are methods, platforms, systems, and media for providing passive data transparency in a distributed market, comprising: aggregating or using aggregated ETF data at least including ownership data to generate a first database; applying, in a distributed parallel computing architecture, a first algorithm utilizing a vectorized calculation over time series data to generate a multi-dimensional representation of relationship graphs including pass through variables between nodes within or across the Primary Markets and Secondary Markets; generating a database, searchable by any dimension of the calculated data or any component of the relationship graph; and providing an analytics layer for synthesizing any component of the relationship graph including pass through variables, and the database to perform a task. Wherein a task can comprise providing information, analysis, recommendation, predictions, projections, and/or performing actions to manage an investment portfolio or a combination thereof.

30 Claims, 38 Drawing Sheets

(56) References Cited

U.S. PATENT DOCUMENTS

| | | | |
|---|---|---|---|
| 8,924,274 B2 | 12/2014 | Schmid et al. | |
| 9,495,452 B2 | 11/2016 | Berkhin et al. | |
| 10,755,093 B2 | 8/2020 | Stadermann et al. | |
| 11,023,675 B1 | 6/2021 | Neervannan et al. | |
| 11,055,784 B1 | 7/2021 | Lieblich et al. | |
| 11,080,789 B1 | 8/2021 | Guzman et al. | |
| 11,205,043 B1 | 12/2021 | Neervannan et al. | |
| 11,205,044 B1 | 12/2021 | Neervannan et al. | |
| D940,152 S | 1/2022 | Klancisar et al. | |
| 11,216,164 B1 | 1/2022 | Neervannan et al. | |
| 11,226,992 B1 | 1/2022 | Ramsey et al. | |
| 11,227,109 B1 | 1/2022 | Neervannan et al. | |
| 11,227,114 B1 | 1/2022 | Yurtsev et al. | |
| 11,347,383 B1 | 5/2022 | Neervannan et al. | |
| 11,366,966 B1 | 6/2022 | Ramsey et al. | |
| 11,410,234 B2 * | 8/2022 | Agarwal | G06Q 40/04 |
| 11,449,940 B2 | 9/2022 | Weber et al. | |
| D967,131 S | 10/2022 | Disend et al. | |
| D967,188 S | 10/2022 | Disend et al. | |
| 11,474,676 B1 | 10/2022 | Neervannan et al. | |
| 11,550,453 B1 | 1/2023 | Neervannan et al. | |
| 11,551,298 B1 * | 1/2023 | Samuels | G06Q 40/03 |
| 11,561,682 B1 | 1/2023 | Neervannan et al. | |
| 11,605,131 B1 | 3/2023 | O'Hara et al. | |
| 11,640,526 B2 * | 5/2023 | Guo | G06N 3/0464 |
| | | | 706/25 |
| 11,687,218 B1 | 6/2023 | Neervannan et al. | |
| 11,699,036 B1 | 7/2023 | Neervannan et al. | |
| 11,704,006 B1 | 7/2023 | Neervannan et al. | |
| 11,726,818 B1 | 8/2023 | Sutton et al. | |
| 11,727,062 B1 | 8/2023 | Gaskell et al. | |
| 11,740,770 B1 | 8/2023 | Neervannan et al. | |
| D1,005,304 S | 11/2023 | Sajbel et al. | |
| 11,809,691 B1 | 11/2023 | Neervannan et al. | |
| 11,861,712 B1 * | 1/2024 | Kenigsberg | G06Q 40/06 |
| 11,887,136 B1 | 1/2024 | Symes et al. | |
| 11,893,636 B1 * | 2/2024 | Bryant | H04L 51/046 |
| 2002/0188543 A1 | 12/2002 | Wizon et al. | |
| 2002/0188544 A1 | 12/2002 | Wizon et al. | |
| 2002/0198811 A1 | 12/2002 | Wizon et al. | |
| 2002/0198812 A1 | 12/2002 | Wizon et al. | |
| 2003/0144940 A1 | 7/2003 | Kochansky et al. | |
| 2003/0167221 A1 | 9/2003 | Kochansky | |
| 2003/0187777 A1 | 10/2003 | Kochansky et al. | |
| 2003/0200171 A1 | 10/2003 | Kochansky | |
| 2003/0233302 A1 | 12/2003 | Weber et al. | |
| 2004/0073579 A1 | 4/2004 | Snyder | |
| 2005/0055300 A1 | 3/2005 | Kochansky | |
| 2005/0086155 A1 | 4/2005 | Villacorta et al. | |
| 2005/0234934 A1 | 10/2005 | Mackay et al. | |
| 2005/0267835 A1 | 12/2005 | Condron et al. | |
| 2007/0282728 A1 * | 12/2007 | Carpenter | G06Q 40/06 |
| | | | 705/36 R |
| 2009/0094069 A1 | 4/2009 | Castille et al. | |
| 2009/0198630 A1 * | 8/2009 | Treitler | G06Q 40/06 |
| | | | 705/36 R |
| 2010/0174664 A1 | 7/2010 | Kelly et al. | |
| 2010/0256995 A1 | 10/2010 | Oliver | |
| 2011/0166983 A1 | 7/2011 | Tucker et al. | |
| 2012/0036059 A1 | 2/2012 | Ionascu et al. | |
| 2012/0158614 A1 | 6/2012 | Samandar et al. | |
| 2012/0330796 A1 | 12/2012 | O'Hara et al. | |
| 2013/0332326 A1 | 12/2013 | Archard et al. | |
| 2014/0040093 A1 | 2/2014 | Kochansky et al. | |
| 2014/0068006 A1 | 3/2014 | Singhal et al. | |
| 2014/0229403 A1 | 8/2014 | Ramkumar et al. | |
| 2014/0337373 A1 * | 11/2014 | Morsi | G06F 16/9024 |
| | | | 707/769 |
| 2014/0344186 A1 | 11/2014 | Nadler | |
| 2014/0358762 A1 | 12/2014 | O'Hara et al. | |
| 2015/0187008 A1 | 7/2015 | Cavatoni et al. | |
| 2015/0269679 A1 | 9/2015 | Padilla et al. | |
| 2016/0098778 A1 | 4/2016 | Blumenthal et al. | |
| 2016/0247226 A1 * | 8/2016 | Robert | G06Q 40/08 |
| 2016/0335718 A1 | 11/2016 | Callahan et al. | |
| 2018/0075160 A1 * | 3/2018 | Plouet | G06Q 10/10 |
| 2018/0204285 A1 | 7/2018 | Nadler | |
| 2018/0218011 A1 | 8/2018 | Taycher et al. | |
| 2018/0373810 A1 | 12/2018 | Rosen et al. | |
| 2019/0026675 A1 * | 1/2019 | McKibbin | G06Q 10/06393 |
| 2019/0057165 A1 | 2/2019 | Rosen et al. | |
| 2019/0107529 A1 | 4/2019 | Colella et al. | |
| 2019/0205475 A1 | 7/2019 | Ulfelder, Jr. et al. | |
| 2019/0258723 A1 | 8/2019 | Taycher et al. | |
| 2020/0286002 A1 | 9/2020 | Szanto et al. | |
| 2020/0364796 A1 | 11/2020 | Nadler | |
| 2021/0056625 A1 | 2/2021 | Kotarinos | |
| 2021/0090170 A1 | 3/2021 | Gilleeney et al. | |
| 2021/0109954 A1 | 4/2021 | Wang et al. | |
| 2021/0109968 A1 | 4/2021 | Kim et al. | |
| 2021/0192628 A1 * | 6/2021 | Yeh | G06Q 40/06 |
| 2021/0224910 A1 | 7/2021 | Romero | |
| 2021/0240752 A1 | 8/2021 | Curme et al. | |
| 2021/0272013 A1 | 9/2021 | Szanto | |
| 2021/0279824 A1 | 9/2021 | Choi et al. | |
| 2021/0294859 A1 | 9/2021 | Watson et al. | |
| 2021/0303634 A1 | 9/2021 | Choi et al. | |
| 2021/0397609 A1 | 12/2021 | Yurtsev et al. | |
| 2022/0020092 A1 * | 1/2022 | Wang | G06Q 30/018 |
| 2022/0027387 A1 | 1/2022 | Wang et al. | |
| 2022/0027989 A1 | 1/2022 | Katz et al. | |
| 2022/0036387 A1 | 2/2022 | Papadimitriou et al. | |
| 2022/0067579 A1 | 3/2022 | Choi et al. | |
| 2022/0092697 A1 | 3/2022 | Ma et al. | |
| 2022/0198562 A1 * | 6/2022 | Cella | G06Q 40/04 |
| 2022/0230253 A1 | 7/2022 | Kim et al. | |
| 2022/0270169 A1 | 8/2022 | Valsecchi et al. | |
| 2022/0271533 A1 | 8/2022 | Rilett et al. | |
| 2022/0301048 A1 | 9/2022 | Hoger Von Hogersthal et al. | |
| 2022/0327439 A1 | 10/2022 | Farooq | |
| 2022/0327567 A1 | 10/2022 | Farooq | |
| 2022/0342945 A1 | 10/2022 | Dagar et al. | |
| 2022/0405845 A1 | 12/2022 | Diamond et al. | |
| 2022/0405849 A1 | 12/2022 | Biem et al. | |
| 2023/0036483 A1 | 2/2023 | Tsay et al. | |
| 2023/0051447 A1 | 2/2023 | Zhang et al. | |
| 2023/0061590 A1 | 3/2023 | Zhao et al. | |
| 2023/0066971 A1 | 3/2023 | Tsay et al. | |
| 2023/0080091 A1 | 3/2023 | Ramkumar et al. | |
| 2023/0098981 A1 | 3/2023 | Hayden et al. | |
| 2023/0102524 A1 | 3/2023 | Christie et al. | |
| 2023/0103951 A1 | 4/2023 | Vezza et al. | |
| 2023/0121712 A1 | 4/2023 | Wentworth | |
| 2023/0121968 A1 | 4/2023 | Sommer et al. | |
| 2023/0124411 A1 | 4/2023 | Sommer et al. | |
| 2023/0127966 A1 | 4/2023 | Prentice et al. | |
| 2023/0132739 A1 | 5/2023 | Anglin | |
| 2023/0153331 A1 | 5/2023 | Hua et al. | |
| 2023/0161971 A1 | 5/2023 | Szanto et al. | |
| 2023/0177061 A1 | 6/2023 | Hayden et al. | |
| 2023/0195300 A1 | 6/2023 | Matlin | |
| 2023/0196435 A1 | 6/2023 | Chaturvedi et al. | |
| 2023/0206339 A1 | 6/2023 | O'Hara et al. | |
| 2023/0237269 A1 | 7/2023 | Guzik et al. | |
| 2023/0306520 A1 | 9/2023 | Van Beek et al. | |
| 2024/0054515 A1 * | 2/2024 | Subramanian | G06Q 30/0202 |
| 2024/0121117 A1 * | 4/2024 | Grube | H04L 9/3213 |

FOREIGN PATENT DOCUMENTS

| | | | | |
|---|---|---|---|---|
| WO | WO-2012128776 A1 * | 9/2012 | | G06Q 40/00 |
| WO | WO-2013028935 A1 * | 2/2013 | | G06Q 40/04 |
| WO | WO-2015095229 A1 * | 6/2015 | | G06Q 40/06 |

OTHER PUBLICATIONS

Yue et al., sPortfolio: Stratified Visual Analysis of Stock Portfolios (Year: 2019).*

Rahmani et al., Applications of Artificial Intelligence in the Economy, Including Applications in Stock Trading, Market Analysis, and Risk Management (Year: 2023).*

Caginalp et al., Nonlinear price dynamics of S&P. 100 stocks (Year: 2019).*

(56) References Cited

OTHER PUBLICATIONS

Vasilache et al., Tensor Comprehensions: Framework-Agnostic High-Performance Machine Learning Abstractions (Year: 2018).*
Gabaix, Xavier et al. In Search of the Origins of Financial Fluctuations: The Inelastic Markets Hypothesis. Jun. 11, 2021. 120 pages.

* cited by examiner

Current Structure

Structure with Technology Described Herein

Figure 13F:
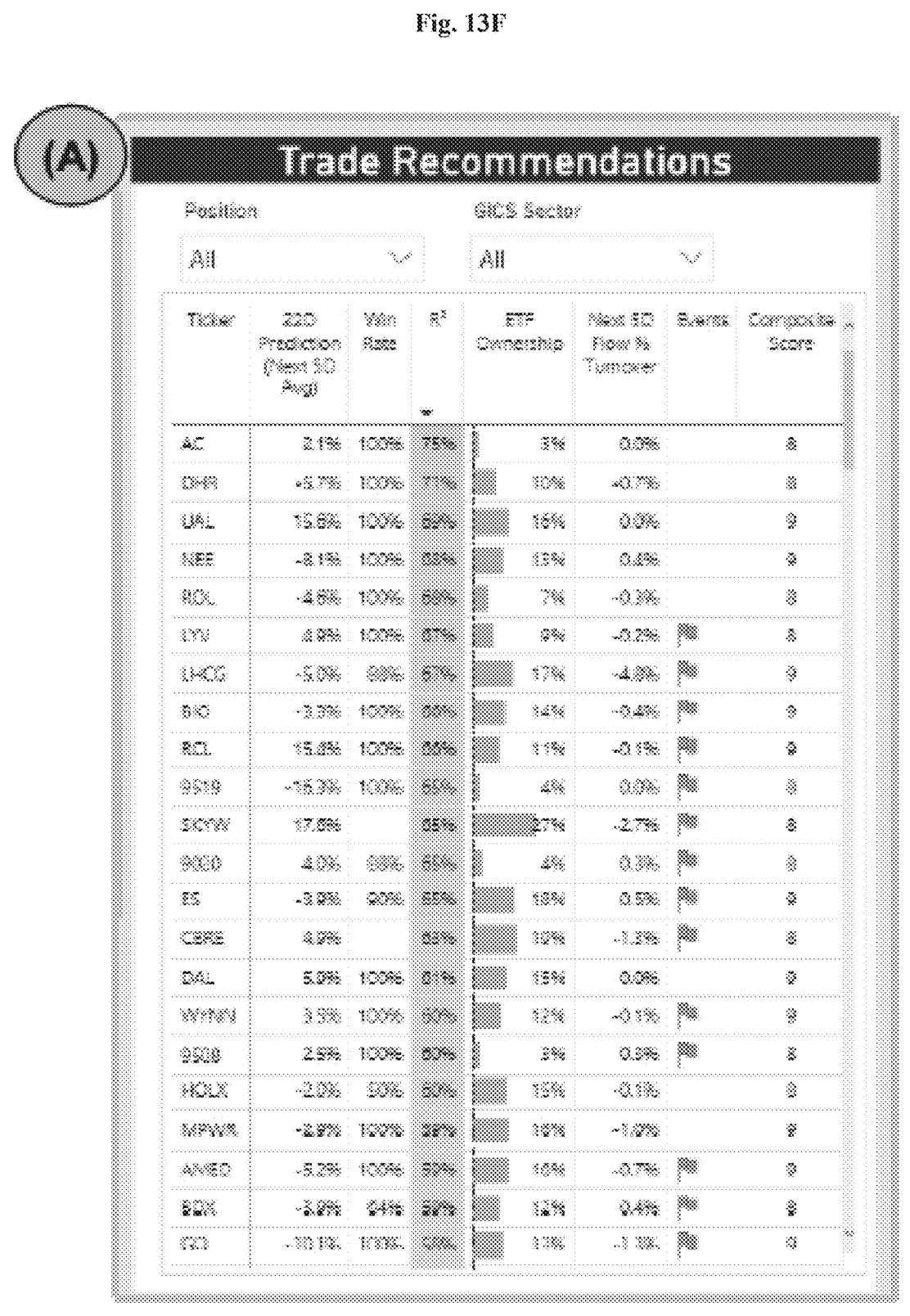

Trade Recommendations

Position

All ⌄

GICS Sector

All ⌄

| Ticker | 22D Prediction (Next 10 Avg) | Win Rate | $R^2$ | ETF Ownership | Next 5D Flow & Turnover | Events | Composite Score |
|---|---|---|---|---|---|---|---|
| AC | 2.1% | 100% | 75% | 3% | 0.0% | | 8 |
| DHR | -5.7% | 100% | 71% | 10% | -0.7% | | 8 |
| UAL | 15.6% | 100% | 69% | 16% | 0.0% | | 9 |
| NEE | -8.1% | 100% | 68% | 13% | 0.6% | | 9 |
| ROL | -4.6% | 100% | 68% | 7% | -0.3% | | 8 |
| DY | 6.9% | 100% | 67% | 9% | -0.2% | | 8 |
| LHCG | -5.0% | 98% | 67% | 17% | -4.9% | | 9 |
| BIO | -3.5% | 100% | 66% | 14% | -0.4% | | 9 |
| ROL | 15.6% | 100% | 66% | 11% | -0.1% | | 9 |
| SRPT | -15.3% | 100% | 66% | 4% | 0.0% | | 8 |
| SNOW | 17.6% | | 66% | 27% | -2.7% | | 8 |
| SGD | 4.0% | 68% | 66% | 4% | 0.0% | | 9 |
| ES | -3.8% | 90% | 65% | 18% | 0.5% | | 9 |
| CBRE | 4.9% | | 65% | 18% | -1.3% | | 8 |
| DAL | 5.9% | 100% | 64% | 18% | 0.0% | | 9 |
| WYNN | 3.5% | 100% | 60% | 12% | -0.1% | | 9 |
| SSB | 2.9% | 100% | 60% | 3% | 0.0% | | 8 |
| HOLX | -2.0% | 50% | 60% | 15% | -0.1% | | 9 |
| MPWR | -2.9% | 100% | 58% | 18% | -1.0% | | 9 |
| AMED | -5.2% | 100% | 58% | 16% | -0.7% | | 9 |
| BDX | -3.9% | 64% | 58% | 13% | 0.4% | | 8 |
| ISD | -10.1% | 100% | 58% | 17% | -1.1% | | 9 |

1354

1352

1364

1362

1368

DISTRIBUTED ARCHITECTURE FOR DATA TRANSPARENCY PLATFORM

CROSS-REFERENCE

This application claims the benefit of U.S. Provisional Application No. 63/483,897, filed Feb. 8, 2023, which is incorporated herein by reference in its entirety.

BACKGROUND

Passive investment vehicles were created after the invention of most existing stock market infrastructure. For example, the invention of the Bloomberg Terminal (1981) predated the creation of the first US Exchange Traded Fund (ETF) by over 10 years. The assets held in an ETF or similar Index Fund may include individual stocks, bonds, cash, commodities, derivatives, swaps, or any tradeable asset, including contracts based on the value of any of the foregoing.

SUMMARY

Over the past decade, passive investing has grown at a remarkable pace, with passive funds becoming the majority of the market in late 2019. As passive investing has continued to grow, with ETFs becoming one of the most common passive investment vehicles, these passive investment vehicles now exert a profound impact on the global stock market.

Leveraging information regarding these passive vehicles (such as flows) cannot be achieved by simply adding them to a system's database. Rather, passive vehicles such as ETFs introduce an added element of complexity to financial markets as the intelligence created across the network of ETF issuers, index providers, and asset investors has become increasingly distributed. Existing technology platforms are currently unable to map the relationship between assets, passive investment funds and the indices which the passive funds track. For a given market participant or market maker evaluating a given security, it is almost impossible to ascertain the historical or ongoing influence which passive instruments (and their associated interactions) exert on that asset. Large, sophisticated asset managers and banks do not appear to have systems that can adequately track and analyze the global passive investment universe. Index providers suffer from high levels of technical debt as a result of the intended and unintended siloing of legacy data structures and platforms. This technical debt is partially the result of decades of acquisitions combining disparate data platforms.

The growth of passive investing has transformed the structure of global markets far too quickly for incumbent technology providers to keep up. As a result, market intelligence is currently unfit to track the current market environment, leading to inefficiencies in global markets which impact the vast majority of global wealth daily. In 2021, over $1.2 tn of capital flowed into global ETFs as net inflow (none of this flow was readily visible in existing infrastructure), while more than $60 tn of cash flowed in and out of mutual funds through creation and redemption alone. In 2020, over $105 tn of volume was recorded in US-listed ETF option trading alone. After major components of Vanguard's "heartbeat" patent expired in 2023, a large portion of mutual funds are expected to covert to ETFs in the immediate future, causing the complexity of the ETF/asset ownership network to increase exponentially.

Capturing the distributed nature of markets partially created by ETFs would require a complete overhaul of legacy systems' technologies. As a result, many current systems are blind to some of the most critical passive information, such as fund flow (e.g., SEC Rule 613 created the Consolidated Audit Trail ("CAT NMS Plan"), which explicitly notes Primary market activity (create/redeem) is out of scope). Creation/Redemption (the process by which capital flows in/out of ETF's), is not recorded as volume, leaving asset level market participants unable to 'see' trillions of dollars entering and exiting the financial system annually. This shortcoming persists despite the fact that these fund flow events are often material relative to the average trading volume of a single given asset. For a myriad of reasons, this information would be useful for both public and private markets. From an investor perspective, accurate passive information could lead to improved price discovery. In a non-limiting example, an investor who utilizes some sort of short interest signal to trade has short data on individual stocks readily available. However, it might be beneficial to the investor to know "pass through" short interest. That is, synthetic short interest pressure on a stock generated by shorting of its ETF parents.

In some embodiments, "pass through" short interest is calculated by generating a historical time-series relationship graph, passing it to an algorithm, as described herein, which may then generate daily "pass through" short interest data for a stock by taking the weighted-sum of short interest from every single ETF it is a constituent of. From an institutional perspective, improved data would be helpful in aiding compliance related activities given current and impending regulations. In a non-limiting example, a broker which may be marketing a fund for which it is also the primary securities lender. The broker may then face multiple conflicts of interest that demand disclosure as it is likely the broker would benefit not only fee-wise for each additional dollar of AUM or volume traded, but also on the interest they can collect as the securities lender. The technology described herein provides numerous levels of benefit to such users. In some embodiments, it may offer a centralized hub for which an institution could view the complex and opaque relationships across the ecosystem. In some embodiments it may also be configured to quantify such benefits through measuring and visualizing "pass through" levels of this benefit. In a non-limiting example, a broker markets a fund that also happens to hold the stock of the broker itself (e.g., a financial sector ETF). A dollar of inflow into the ETF would have some unknown history of translating into a dollar of "pass through" inflow for the stock of the constituent. One could plainly see the need to quantify and disclose this number, historically. The systems and methods described herein are configured to allow a user to be able to track how meaningful a dollar of inflow (or outflow) into an ETF is to each underlying asset from a historical basis.

From the perspective of an issuer of a passive fund or passive product, the improved data and market transparency, generated by the systems and methods described herein, would be helpful in bolstering operational intelligence and risk management, allowing for improved management of security lending activities, objective evaluation of service provider outcomes, and more efficient marketing and understanding of end user or investor needs and objectives. In a non-limiting example, there is an issuer of an ETF that tracks a very popular index that other ETF issuers follow as well. It would be helpful to understand the magnitude of holdings across the ownership network, including but not limited to those of competing ETFs that are tracking the same index. Ahead of an index event such as a rebalancing, where an asset may be completely dropped by an index, index providers send rebalance information to funds which have benchmarks impacted by the rebalancing. As an ETF issuer or Security Lending provider to said issuers, the ability to understand and model how and when several other significant funds might also react to the news of a rebalancing (have to drop the same stock) would be beneficial in allowing funds to better enact mandated index changes with minimal market disruption to the stocks involved. The security lending agents of said funds would alter their lending practices for the stocks involved in order to avoid adverse or unintended market events such as squeezes on the single name holdings. In some embodiments, the systems and methods described herein are configured to generate and provide such from the system's proprietary index to ETF database. In some embodiments, the index to ETF database may be created at least in part by web scraping and mapping of tracking relationships between indices and ETFs. In some embodiments, an issuer user may be able to see the other funds that track the same index and see the magnitude of their aggregated holdings on a daily basis. In some embodiments, the systems and methods described herein may be configured to utilize improved data transparency in order to aid users with simpler marketing related use cases such as understanding how advertising spend by index providers or fund issuers translates into demand for ETFs following these indices. In some embodiments, the systems and methods described herein may be configured to model the impact of investor attention (or website traffic) on corresponding investing behavior.

Information providers that do track fund flow, often quote inaccurate or outdated statistics for ETFs that they are solely purposed to track. Even when information is provisioned accurately to an inquiring party, further information is often necessary to knit puzzle pieces together to form any actionable insight. It is an astronomical amount of work for a human to perform this analysis on a manual basis for even one name, and impossible to repeat the necessary analysis for all assets globally. This exercise is made even more difficult as it also requires the standardization of information across different reporting sources and formats.

For example, it is useful to know an ETFs ownership of an underlying asset, but this is rendered useless if a user cannot then go back, historically and track the time series evolution of this same statistic. Furthermore, even if an ETFs position in an underlying security is known, one currently has to navigate across many independent sources in a non-repeatable fashion just to understand if the index the ETF tracks is facing an impending methodology change or rebalance.

Perhaps, as is almost always the case, more than one ETF owns a given stock. The workflow involved in sifting through all of the websites of corresponding ETF issuers (such as Blackrock or Vanguard), ETF information providers (such as FactSet or Morningstar), and index providers (such as MSCI or S&P) just to calculate an aggregate ETF holding value for a single stock is prohibitively time consuming and computationally expensive with current techniques. Even still, the synthesis of all this information still only provides a "point in time" view of fund flow as opposed to a time-series oriented lens which, furnishes an added layer of insight. There are no current publicly available technologies which can track a distributed market such as the one investors face today in time-series oriented manner. Information regarding the passive market is currently fragmented, hard to trust and verify, and unable to provide actionable insight for an investor. With the substantially increasing number of ETFs launching and closing each year this problem will only continue to grow and become more difficult to address with the current infrastructure in place.

Index Providers are currently given an exemption from the Investment Advisers Act of 1940, specifically via the "Publisher's Exclusion." An index provider meets the principles set forth in Lowe v. SEC, 472 U.S. 181 (1985) which established a trio of criteria to qualify as a publication as it: (i) Provides only impersonal advice; (ii) is "bona fide," meaning that it provides genuine and disinterested commentary; and (iii) is of general and regular circulation rather than issued from time to time in response to episodic market activity. This causes the communications between indices and ETFs to be one sided, wherein ETFs track indices but indices offer minimal utility for tracking ETFs. Providing such insight and utility, could undermine the appearance of genuine, disinterested commentary and risk publisher's exemption status. As such, a private platform is necessary to grant transparency to the ETF/index/asset network.

Further illumination into the relational service provider ecosystem behind passive investment vehicles is desperately needed as well. An ETF has a bevy of supporting relationships (loosely segmented into Fund Administrators, Regulators, Market Makers, and Brokers) which are not easily searchable or known. This constitutes a large but opaque network of service providers and market participants that form interconnected relationships across Primary & Secondary, exchange traded, dark pool, and international market. A platform with the ability to track and model information flow (including but not limited to capital flow, services flow, and compliance/disclosure flow) across this relationship web in a consolidated manner does not currently exist. Information describing Authorized participants (which control the creation and redemption of shares through Market Makers) for an ETF are not made easily available, including information regarding the activity and transactions of said Authorized participants. Furthermore, the identities and activities of market makers operating for said Authorized Participants are not commonly held knowledge, and are often engaged in activities via subsidiaries or non-street names which are not easily mapped to parent level entities. Information on associated money market funds or centralized liquidity funds which hold liquidity for passive funds are not made easily available. Data vendors for ETF or passive fund issuers are not made easily searchable. Primary security lenders and service providers associated with collateral management for an ETFs underliers have almost no digital footprint easy to discern using street names. Feeder funds or master funds are often loosely linked, and often only for promotional purposes. Understanding the broker dealers that directly or indirectly receive compensation for participating in fund related transactions is beneficial to all participants in the market, as well as regulators. Such information is buried in SEC filings (notably from NCEN) but is of little practical use to an investor unless the relationships are mapped across the network in a time-dependent manner. While the examples listed above of service providers in the ETF ecosystem, illustrated in FIG. 13Q, are not intended to be limiting, it is important to note that for a given ETF or fund there may be dozens of entities with monetary and or regulatory interest in its infrastructure. In a world where relationships across the ETF ecosystem are often wide ranging and interconnected, dissemination of such connections and relationships across time are of practical value for an individual or entity concerned with compliance and disclosure of conflicts of interest. Take, for example, an advisor who recommends their client to buy shares of an ETF for which the advisor's company is the primary securities lender (a profitable role). Typically, such a relationship is not immediately disclosed to the investor. Described herein are methods, system, and medias configured to quantify the pass through benefit the advisor's company receives as a securities lender. In some embodiments, the methods, systems, and medias further assist in determining any potential conflicts of interest the advisor may have had that could have impacted their judgement. In some embodiments, the methods, systems, and medias are configured to determine one or potential conflicts of interest the advisor may have had that could have impacted their judgement. In some embodiments the methods, systems, and medias may further determine a severity score or ranking of the one or more potential conflicts of interest.

In some embodiments, the methods, systems, and medias described herein are configured to analyze and interpret data from connecting nodes and edges within the ETF issuer, asset investor, and Index provider triangular relationship to determine internet traffic and website activity data. Search engine optimization and ad spending constitutes a significant channel in which fund issuers, asset managers, and index providers spend money. Such information may not be useful on its own, as index providers are nominally not providing securities themselves and ad spend at the index or fund level can currently not be translated into a signal for investing. However, such information could be helpful if a technology can pass through ad spend (in a time dependent manner) from indices to ETFs that track indices, and subsequently down to the assets that belong to these investment vehicles. In other words, the input value on the node (in this example, ad spend) requires a time-series mapping of edges to securities. For example, MSCI spending money on SEO and ad spend could then be linked to the ETF or ETFs that track MSCI indices. In some embodiments, the methods, systems, and media described herein are configured to translate an entity's spending through an algorithm into predicted fund flows, down to the asset level. In some embodiments, the methods, systems, and media described herein are configured to translate an entity's spending through an algorithm into predicted changes in investor attention, down to the asset level. The system may then provide insight to investors, governments, regulators, and fund issuers, and exchanges.

The relationship between ETFs and assets vis a vis authorized participants demands further explication. As previously noted, Primary market activity (create/redeem) is out of scope according to the Consolidated Audit Trail (CAT NMS Plan). FIG. 14 illustrates a basic diagram of Authorized Participants' role in governing the interactions between the primary (ETF issuers) and secondary (investors on exchanges) market. Currently, investors widely only have centralized visibility into the Secondary Market, and are blind to a valuable and extensive repository of information that could both protect and benefit average investors. This primary market and associated relationship information could aid in the management of systemic and counterparty risk at a market level.

The systems, methods, and media provided herein are configured to provide increased transparency and analysis of the ETF/index/asset network. In some embodiments, the systems, methods, and media described herein may be configured to lower the barrier to obtaining this knowledge and provide further transparency to the market. In some embodiments, the systems, methods and media described herein, may be configured to calculate pass though flows and generate a time series database, based at least in part on said calculated pass through flows, to accurately portray the state of the Primary Market from the Secondary Market and vice versa (i.e., the state of the Secondary Market from the Primary Market). In some embodiments, the systems, methods and media described herein may be configured to track imbalances between supply and demand of ETF shares on the Secondary Market. The system, methods, and media may provide further analysis of the tracked imbalances and determine how the tracked data translates to creation and redemption on the Primary Market. In some embodiments, the system, methods, and media may further calculate: the internalization of create redeem activity by broker dealers, operational shorting activity, direct/synthetic counterparty risk exposure, Fails to Deliver activity, or other activities down to the authorized participant level for a given ETF.

This allows insight into any internalization, operational shorting, or other activities in which authorized participants might engage in for a given ETF.

As such, provided herein are systems, methods, and media that are comprehensive, accurate, actual, attributable, accountable, and fast. The systems, methods, and media provided herein may (i) leverage web scraping and cleaning methods to amalgamate and synthesize index event data and index-related information into a queryable platform easily queryable by asset to receive aggregated information across the global index provider universe with links directly to primary source documents; (ii) automate the calculation of "pass through flows" from secondary markets to primary markets and vice versa (primary markets to secondary markets) using an algorithm which enables a multi-dimensional representation of a network's relational structure; (iii) leverage crawling, scraping, parsing, aggregating indices and ETFs, and mapping identifiers that track them into a database to create a look up table which is easily queryable by ETF, asset, or Index; (iv) leverage PageRank-like algorithms to offer operational and actionable insight which can be personalized to any portfolio or universe set. The systems, methods, and media provided herein may form a multi-dimensional data fabric, semantic database, or foundational model, in which all information is readily accessible and standardized across the modern stock market through the combination of the elements described above. In some embodiments the algorithm performs vectorized and highly efficient parallel computing techniques to evaluate functions too complicated, expensive, and difficult for legacy infrastructures to evaluate. In some embodiments the algorithm analyzes a combination of ownership information (which describe the holdings of all ETFs), relationship data, or associated ETF service provider data, as well as time series data for multiple classes of nodes, allowing a user to pass through any variable or function from the secondary market to the primary market, in both directions. In some embodiments, the algorithm leverages the service provider ecosystem data to aggregate any variable at the level of the ecosystem participant, based on publicly reported details regarding the nature of and structure of their relationship. In some embodiments, "pass though flows" may include but is not limited to passing through, information flows, capital flows, fund flows, flow of risk or derivative/swap exposure, synthetic exposure, flow of reported transactional data, or any other flow of information or data between two or more of indices, ETFs, assets, Primary Markets, Secondary Markets, market maker, market participants, authorized participants, or the like.

In some embodiments, systems, methods, and media that are comprehensive, accurate, actual, attributable, accountable, and fast. The systems, methods, and media provided herein may (i) leverage web scraping and cleaning methods to amalgamate and synthesize index event data and index-related information into a queryable platform easily query-able by asset to receive aggregated information across the global index provider universe with links directly to primary source documents; (ii) automate the calculation of "pass through flows" from ETFs (parents) or related service pro-viders down to assets (children), and vice versa (asset to ETF or related service providers) using an algorithm which enables a multi-dimensional representation of a network's relational structure; (iii) leverage crawling, scraping, pars-ing, aggregating indices and ETFs, and mapping identifiers that track them into a database to create a look up table which is easily queryable by ETF or Index; (iv) leverage PageRank-like algorithms to offer operational and action-able insight which can be personalized to any portfolio or universe set. The systems, methods, and media provided herein may form a multi-dimensional data fabric, semantic database, or foundational model, in which all information is readily accessible and standardized across the modern stock market through the combination of the elements described above. In some embodiments the algorithm performs vec-torized and highly efficient parallel computing techniques to evaluate functions too complicated, expensive, and difficult for legacy infrastructures to evaluate. In some embodiments the algorithm analyzes a combination of ownership infor-mation (which describe the holdings of all ETFs), as well as time series data for both classes of nodes, allowing a user to pass through any variable or function from the ETF or ETF service provider level (parent) down to the underlying holdings (children), in both directions. In some embodi-ments, the algorithm leverages the service provider ecosys-tem data to aggregate any variable at the level of the ecosystem participant, based on publicly reported details regarding the nature of and structure of their relationship. In some embodiments, "pass though flows" may include but is not limited to passing through, information flows, capital flows, fund flows, flow of risk or derivative/swap exposure, flow of orders or changes to existing or latent order books, flow of consolidated trades and quotes, flow of distributions/ dividends or equivalent yields, flow of payments for order flow, flow of dark pool or odd lot transactional information, flow of tax liability or tax related information, flow of proxy or shareholder votes, flow of Material Non-Public Insider Information, or any other flow of information or data between two or more of indices, ETFs, assets, Primary Markets, Secondary Markets, market makers, market par-ticipants, authorized participants, exchanges, asset classes, or the like.

In some embodiments, the systems, methods, and media described herein are configured to compress the workflow required for an investor, market participant, or regulator, to query one or more stocks and analyze and/or monitor ETF activities or index events. The ETF activities or index events may include one or more stocks being queried by the investor. In some embodiments, index events may include events that have material impacts on fund flows. The index events may include but are not limited to index rebalances, methodology changes, or the like. This technology addresses an unmet need by offering valuable transparency into the passive market and enables an investor to effectively and efficiently access, review, analyze and comprehend accurate and comprehensive passive investment information, which has become difficult, to nearly impossible, for investors and market participants to do in today's environment, given there are now over 8,000 global with $11 tn in assets under management and a complicated array of current financial legal requirements and regulations across the financial sec-tor.

In some embodiments, the systems, methods, and media herein are configured to compress the workflow required for an investor, market participant, regulator, or an institution involved within the ETF service providing ecosystem to analyze parties with stakes of interest in ETFs or indices. In some embodiments, index events may include regulatory filings which reveal relationship data within the service providing ecosystem. In some embodiments, information describing contractual arrangements between two or more parties in the service provider ecosystem is used to calculate implied cost/benefit received by each party. This information may facilitate pass through calculation and allow for "what if" scenario analysis resulting from changing economics associated with one or more of a given product, contractual relationship, or dynamic input referenced within the con-tract. The interconnected nature of this ecosystem, coupled with the high number of dimensions and nodes, creates the need for a tool to dynamically calculate aggregated impact of complex market conditions. The methods, systems, and medias described herein addresses these unmet needs by providing valuable transparency into the passive market and offers institutions a centralized database in which they can trace conflicts of inflicts throughout the infrastructure of the passive market.

Accordingly, in one aspect, disclosed herein are com-puter-implemented methods of providing passive data trans-parency in a distributed market comprising: aggregating index data for a plurality of indices; generating a first database, utilizing at least the index data, searchable to return passive activity data; applying, in a distributed par-allel computing architecture, a first algorithm utilizing a vectorized calculation over time series data to generate a multi-dimensional representation of relationship graphs including pass through variables between ETFs and assets; mapping relationship data between indices and ETFs; gen-erating a second database, using at least the relationship data, searchable by index to return linking ETFs; and providing an analytics layer to synthesize the first database, relationship graphs including pass through variables, and the second database to perform a task. In some embodiments, the method further comprises standardizing the index data. In some embodiments, the index data comprises one or more aspects of an index profile, one or more aspects of an index history, one or more aspects of an index event, or a combi-nation thereof. In some embodiments, aggregating index data comprises utilizing a web bot, a web crawler, a web scraper, or a combination thereof. In some embodiments, the aggregated index data comprises data from at least one of a database, website, API endpoint, document, or a combina-tion thereof. In some embodiments, the first database com-prises an information table and an event table. In some embodiments, the first database is searchable by one or more aspects of the relationship graph of an asset. The term graph as used here and throughout the application may refer to any mathematical, numerical, or visual representation of data, calculation, value, or information used to represent relation-ships between two objects (e.g., the relationship between ETFs and Assets, Secondary Markets and Primary Markets, etc.). In further embodiments, the first database returns passive activity data for the asset across global index pro-viders. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is presented on a display. In still further embodiments, the display is a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are stored in a memory.

In another aspect, disclosed herein are computer-implemented methods of providing passive data transparency in a distributed market comprising: aggregating ETF data for a plurality of ETFs; generating a first database, utilizing at least the ETF data, searchable to return passive activity data; applying, in a distributed parallel computing architecture, a first algorithm utilizing a vectorized calculation over time series data to generate a multi-dimensional representation of relationship graphs including pass through variables between ETFs and assets; mapping relationship data between the assets and ETFs; passing through fund level data to an individual asset and vice versa (i.e., passing through asset level data to a fund) based off of an relationship graph; generating a second database, using at least the ETF ownership data, searchable by asset to return linking ETFs (and searchable by ETF to return linking assets); and providing an analytics layer to synthesize the first database, relationship graphs including pass through variables, and the second database to perform a task. In some embodiments, the ETF data comprises one or more of ownership data, relationship data, or associated ETF service provider data, for the plurality of ETFs. In some embodiments, the method further comprises standardizing the ETF data. In some embodiments, the ETF data comprises one or more of ETF ownership data, ETF relationship data, associated ETF service provider data, or a combination thereof. In some embodiments, ETF data includes data related to the surrounding infrastructure (e.g., Authorized Participants (AP), market makers, creation/redemption data, AP buying/selling data, etc.) In some embodiments, aggregating ETF data comprises utilizing a web bot, a web crawler, a web scraper, or a combination thereof. In some embodiments, the aggregated ETF data comprises data from at least one of a database, website, API endpoint, document, vendor, or a combination thereof. In some embodiments, the first database comprises an information table and an event table. In some embodiments, the first database is searchable by one or more aspects of the relationship graph of an asset. In further embodiments, the first database returns passive activity data for the asset across global index providers. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is presented on a display. In still further embodiments, the display is a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are stored in a memory.

In another aspect, disclosed herein are computer-implemented methods of providing passive data transparency in a distributed market comprising: aggregating ETF data for a plurality of ETFs; generating a first database, utilizing at least the ETF data, searchable to return passive activity data; applying, in a distributed parallel computing architecture, a first algorithm utilizing a vectorized calculation over time series data to generate a multi-dimensional representation of relationship graphs including pass through variables between ETFs and assets; generate second database comprising a time series database based at least in part on the calculate pass though, to accurately portray the state of the Primary Market from the Secondary Market and vice versa (i.e., the state of the Secondary Market from the Primary Market). In some embodiments, the systems, methods and media described herein may be configured to track imbalances between supply and demand of ETF shares on the secondary market. The system, methods, and media may provide further analysis of the tracked imbalances and determine how the tracked data translates to creation and redemption on the primary market. In some embodiments, the system, methods, and media may further calculate the internalization of create redeem activity by broker dealers, operational shorting activity, or other activities down to the authorized participant level for a given ETF. In some embodiments, the method further comprises standardizing the ETF data. In some embodiments, the ETF data comprises one or more of ETF ownership data, ETF relationship data, associated ETF service provider data, or a combination thereof. In some embodiments, aggregating ETF data comprises utilizing a web bot, a web crawler, a web scraper, or a combination thereof. In some embodiments, the aggregated ETF data comprises data from at least one of a database, website, API endpoint, document, vendor, or a combination thereof. In some embodiments, the first database comprises an information table and an event table. In some embodiments, the first database is searchable by one or more aspects of the relationship graph of an asset. In further embodiments, the first database returns passive activity data for the asset across global index providers. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is presented on a display. In still further embodiments, the display is a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are stored in a memory. may be configured to calculate pass though flows and generate a time series database, based at least in part on said calculated pass through flows, to accurately portray the state of the Primary Market from the Secondary Market and vice versa (i.e., the state of the Secondary Market from the Primary Market). In some embodiments, the systems, methods and media described herein may be configured to track imbalances between supply and demand of ETF shares, short interest, option exposure, or derivate exposure on the secondary market. The system, methods, and media may provide further analysis of the tracked imbalances and determine how the tracked data translates to creation and redemption on the primary market. In some embodiments, the system, methods, and media may further calculate the internalization of create redeem activity by broker dealers, operational shorting activity, or other activities down to the authorized participant level for a given ETF.

In another aspect, disclosed herein are computer-implemented systems comprising at least one processor, a memory, and instructions executable by the at least one processor to cause the at least one processor to perform operations for providing passive data transparency in a distributed market, the operations comprising: aggregating index data for a plurality of indices; generating a first database, utilizing at least the index data, searchable to return passive activity data; applying, in a distributed parallel computing architecture, a first algorithm utilizing a vectorized calculation over time series data to generate a multi-dimensional representation of relationship graphs including pass through variables between ETFs and assets; mapping relationship data between indices and ETFs; generating a second database using at least the relationship data, searchable by index to return linking ETFs; and providing an analytics layer synthesizing the first database, relationship graphs including pass through variables, and the second database to perform a task. In some embodiments, the operations further comprise standardizing the index data. In some embodiments, the index data comprises one or more aspects of an index profile, one or more aspects of an index history, one or more aspects of an index event, or a combination thereof. In some embodiments, aggregating index data comprises utilizing a web bot, a web crawler, a web scraper, or a combination thereof. In some embodiments, the aggregated index data comprises data from at least one of a database, website, API endpoint, document, or a combination thereof. In some embodiments, the first database comprises an information table and an event table. In some embodiments, the first database is configured to be searchable by one or more aspects of the relationship graph of an asset. In still further embodiments, the first database returns passive activity data for the asset across global index providers. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In still further embodiments, the pass through flows are bidirectional. In still further embodiments, the pass through flows comprise an integer input, a function, or a combination thereof. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In still further embodiments, the generated visual interface is configured to be presented on a display. In still further embodiments, the display is configured to be a touch screen. In still further embodiments, the generated visual interface comprises a three-dimensional element presented on an augmented reality display or a virtual reality display. In some embodiments, the task comprises applying a second algorithm to rank, sort, and/or quantify the influence of pass through variables. In still further embodiments, the second algorithm comprises a machine learning algorithm. In some embodiments, the generated first database and second database are configured to be stored in a memory.

In some embodiments, disclosed herein are computer-implemented systems comprising at least one processor, a memory, and instructions executable by the at least one processor to cause the at least one processor to perform operations for providing passive data transparency in a distributed market comprising: aggregating ETF data for a plurality of ETFs; generating a first database, utilizing at least the ETF data, searchable to return passive activity data; applying, in a distributed parallel computing architecture, a first algorithm utilizing a vectorized calculation over time series data to generate a multi-dimensional representation of relationship graphs including pass through variables between ETFs and assets; mapping relationship data between the assets and ETFs; passing through fund level data to an individual asset and vice versa (i.e., passing through asset level data to a fund) based off of an relationship graph; generating a second database, using at least the ETF ownership data, searchable by asset to return linking ETFs; and providing an analytics layer synthesizing the first database, relationship graphs including pass through variables, and the second database to perform a task. In some embodiments, the ETF data comprises one or more of ownership data, relationship data, or associated ETF service provider data, for the plurality of ETFs. In some embodiments, the operations further comprise standardizing the ETF data. In some embodiments, the ETF data comprises one or more of ETF ownership data, ETF relationship data, associated ETF service provider data, or a combination thereof. In some embodiments, ETF data includes data related to the surrounding infrastructure (e.g., Authorized Participants (AP), market makers, creation/redemption data, AP buying/selling data, etc.). In some embodiments, aggregating ETF data comprises utilizing a web bot, a web crawler, a web scraper, or a combination thereof. In some embodiments, the aggregated ETF data comprises data from at least one of a database, website, API endpoint, document, vendor, or a combination thereof. In some embodiments, the first database comprises an information table and an event table. In some embodiments, the first database is searchable by one or more aspects of the relationship graph of an asset. In further embodiments, the first database returns passive activity data for the asset across global index providers. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is configured to be presented on a display. In still further embodiments, the display is configured to be a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are configured to be stored in a memory.

In another aspect, disclosed herein are computer-implemented methods of providing passive data transparency in a distributed market comprising: aggregating ETF data for a plurality of ETFs; generating a first database, utilizing at least the ETF data, searchable to return passive activity data; applying, in a distributed parallel computing architecture, a first algorithm utilizing a vectorized calculation over time series data to generate a multi-dimensional representation of relationship graphs including pass through variables between ETFs and assets; generate second database comprising a time series database based at a least in part on the calculate pass though, to accurately portray the state of the Primary Market from the Secondary Market and vice versa (i.e., the state of the Secondary Market from the Primary Market). In some embodiments, the systems, methods and media described herein may be configured to track imbalances between supply and demand of ETF shares on the secondary market. The system, methods, and media may provide further analysis of the tracked imbalances and determine how the tracked data translates to creation and redemption on the primary market. In some embodiments, the system, methods, and media may further calculate the internalization of create redeem activity by broker dealers, operational shorting activity, or other activities down to the authorized participant level for a given ETF. In some embodiments, the method further comprises standardizing the ETF data. In some embodiments, the ETF data comprises one or more of ETF ownership data, ETF relationship data, associated ETF service provider data, or a combination thereof. In some embodiments, ETF data includes data related to the surrounding infrastructure (e.g., Authorized Participants (AP), market makers, creation/redemption data, AP buying/selling data, etc.). In some embodiments, method further comprises aggregating asset data and ETF data to generate the first database. In some embodiments, aggregating ETF data comprises utilizing a web bot, a web crawler, a web scraper, or a combination thereof. In some embodiments, the aggregated ETF data comprises data from at least one of a database, website, API endpoint, document, vendor, or a combination thereof. In some embodiments, the first database comprises an information table and an event table. In some embodiments, the first database is searchable by one or more aspects of the relationship graph of an asset. In further embodiments, the first database returns passive activity data for the asset across global index providers. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, the "pass though flows" may include but are not limited to passing through, information flows, capital flows, fund flows, flow of risk or derivative/swap exposure, synthetic exposure, flow of reported transactional data, or any other flow of information or data between two or more of indices, ETFs, assets, Primary Markets, Secondary Markets, market maker, market participants, authorized participants, exchanges, market centers, regulatory bodies, geographic markets, currency classes, public ledgers, asset classes or the like. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is configured to be presented on a display. In still further embodiments, the display is configured to be a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are configured to be stored in a memory. In some embodiments, the systems, methods and media described herein are configured to track imbalances between supply and demand of ETF shares on the secondary market. The system, methods, and media may provide further analysis of the tracked imbalances and determine how the tracked data translates to creation and redemption on the primary market. In some embodiments, the system, methods, and media may further calculate the internalization of create redeem activity by broker dealers, operational shorting activity, or other activities down to the authorized participant level for a given ETF.

In another aspect, disclosed herein are non-transitory computer-readable storage medias encoded with instructions executable by one or more processors to provide a passive data transparency application comprising: a software module configured to aggregate index data for a plurality of indices; a software module configured to generate a first database, utilizing at least the index data, searchable to return passive activity data; a software module configured to apply, in a distributed parallel computing architecture, a first algorithm utilizing a vectorized calculation over time series data to generate a multi-dimensional representation of relationship graphs including pass through variables between ETFs and assets; a software module configured to map relationship data between indices and ETFs; a software module configured to generate a second database, using at least the relationship data, searchable by index to return linking ETFs; and a software module configured to provide an analytics layer for synthesizing the first database, relationship graphs including pass through variables, and the second database to perform a task. In some embodiments, the application further comprises a software module configured to standardize the index data. In some embodiments, the index data comprises one or more aspects of an index profile, one or more aspects of an index history, one or more aspects of an index event, or a combination thereof. In some embodiments, the software module is configured to aggregate index data utilizes a web bot, a web crawler, a web scraper, or a combination thereof. In some embodiments, the aggregated index data comprises data from at least one of a database, website, API endpoint, document, or a combination thereof. In some embodiments, the first database comprises an information table and an event table. In some embodiments, the first database is configured to be searchable by one or more aspects of the relationship graph of an asset. In still further embodiments, the first database returns passive activity data for the asset across global index providers. In some embodiments, a time series data comprises calendar time series data. In some embodiments, a time series data comprises relative time series data. In some embodiments, the software module is configured to apply the first algorithm is automated. In some embodiments, the first algorithm comprises a machine learning algorithm. In some embodiments, the pass through variables comprise pass through flows. In still further embodiments, the pass through flows are bidirectional. In still further embodiments, the pass through flows comprise an integer input, a function, or a combination thereof. In some embodiments, the "pass though flows" may include but are not limited to passing through, information flows, capital flows, fund flows, flow of risk or derivative/swap exposure, synthetic exposure, flow of reported transactional data, or any other flow of information or data between two or more of indices, ETFs, assets, Primary Markets, Secondary Markets, market maker, market participants, authorized participants, or the like. In some embodiments, the software module configured to map relationship data between indices and ETFs utilizes a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In still further embodiments, the generated visual interface is configured to be presented on a display. In still further embodiments, the display is configured to be a touch screen. In still further embodiments, the generated visual interface comprises a three-dimensional element presented on an augmented reality display or a virtual reality display. In some embodiments, the task comprises applying a second algorithm to rank, sort, and/or quantify the influence of pass through variables. In still further embodiments, the second algorithm comprises a machine learning algorithm. In some embodiments, the generated first database and second database are configured to be stored in a memory.

In some embodiments, disclosed herein are non-transitory computer-readable storage medias encoded with instructions executable by one or more processors to provide a passive data transparency application comprising: a software module configured to aggregate ETF data for a plurality of ETFs; a software module configured to generate a first database, utilizing at least the ETF data, searchable to return passive activity data; a software module configured to apply, in a distributed parallel computing architecture, a first algorithm utilizing a vectorized calculation over time series data to generate a multi-dimensional representation of relationship graphs including pass through variables between ETFs and assets; a software module configured to map relationship data between the assets and ETFs; passing through fund level data to an individual asset and vice versa (i.e., passing through asset level data to a fund) based off of an relationship graph; a software module configured to generate a second database, using at least the ETF ownership data, searchable by asset to return linking ETFs; and a software module configured to provide an analytics layer for synthesizing the first database, relationship graphs including pass through variables, and the second database to perform a task. In some embodiments, the ETF data comprises one or more of ETF ownership data, ETF relationship data, associated ETF service provider data, or a combination thereof, for the plurality of ETFs. In some embodiments, ETF data includes data related to the surrounding infrastructure (e.g., Authorized Participants (AP), market makers, creation/redemption data, AP buying/selling data, etc.). In some embodiments, the application further comprises a software module configured to standardize the ETF data. In some embodiments, the non-transitory computer readable media may further comprise a software module configured to aggregate asset. The first data base may be generated utilizing at least the ETF data and the asset data. In some embodiments, the software module is configured to aggregate ETF data utilizing a web bot, a web crawler, a web scraper, or a combination thereof. In some embodiments, the aggregated ETF data comprises data from at least one of a database, website, API endpoint, document, vendor, or a combination thereof. In some embodiments, the first database comprises an information table and an event table. In some embodiments, the first database is configured to be searchable by one or more aspects of the relationship graph of an asset. In further embodiments, the first database returns passive activity data for the asset across global index providers. In some embodiments, the time series data comprises calendar time series data. In some embodiments, the time series data comprises relative time series data. In some embodiments, the software module is configured to automatically apply the first algorithm. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, the "pass though flows" may include but are not limited to passing through, information flows, capital flows, fund flows, flow of risk or derivative/swap exposure, synthetic exposure, flow of reported transactional data, or any other flow of information or data between two or more of indices, ETFs, assets, Primary Markets, Secondary Markets, market maker, market participants, authorized participants, or the like. In some embodiments, the software module configured to map relationship data between indices and ETFs utilizes a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is configured to be presented on a display. In still further embodiments, the display is configured to be a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are configured to be stored in a memory.

In another aspect, disclosed herein are non-transitory computer-readable storage medias encoded with instructions executable by one or more processors to provide a passive data transparency application comprising: a software module configured to aggregate ETF data for a plurality of ETFs; a software module configured to generate a first database, utilizing at least the ETF data, searchable to return passive activity data; a software module configured to apply, in a distributed parallel computing architecture, a first algorithm utilizing a vectorized calculation over time series data to generate a multi-dimensional representation of relationship graphs including pass through variables between ETFs and assets; a software module configured to generate a second database comprising a time series database based at a least in part on the calculate pass though, to accurately portray the state of the Primary Market from the Secondary Market and vice versa (i.e., the state of the Secondary Market from the Primary Market). In some embodiments, the non-transitory computer-readable described herein may comprises a software module configured to track imbalances between supply and demand of ETF shares on the secondary market. In some embodiments, the non-transitory computer-readable storage medias further comprises a software module configured to provide analysis of the tracked imbalances and determine how the tracked data translates to creation and redemption on the primary market. In some embodiments, the non-transitory computer-readable storage medias further comprises a software module configured to calculate the internalization of create redeem activity by broker dealers, operational shorting activity, or other activities down to the authorized participant level for a given ETF. In some embodiments, the non-transitory computer-readable described herein may comprises a software module configured to standardize the ETF data. In some embodiments, the ETF data comprises one or more of ETF ownership data, ETF relationship data, associated ETF service provider data, or a combination thereof. In some embodiments, ETF data includes data related to the surrounding infrastructure (e.g., Authorized Participants (AP), market makers, creation/redemption data, AP buying/selling data, RegSho data, etc.). In some embodiments, aggregating ETF data comprises utilizing a web bot, a web crawler, a web scraper, or a combination thereof. In some embodiments, the aggregated ETF data comprises data from at least one of a database, website, API endpoint, document, vendor, or a combination thereof. In some embodiments, the first database comprises an information table and an event table. In some embodiments, the first database is searchable by one or more aspects of the relationship graph of an asset. In further embodiments, the first database returns passive activity data for the asset across global index providers. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, the pass though flows may include but are not limited to passing through, information flows, capital flows, fund flows, flow of risk or derivative/swap exposure, synthetic exposure, flow of reported transactional data, or any other flow of information or data between two or more of indices, ETFs, assets, Primary Markets, Secondary Markets, market maker, market participants, authorized participants, or the like. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is configured to be presented on a display. In still further embodiments, the display is configured to be a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are configured to be stored in a memory. In some embodiments, non-transitory computer-readable storage medias encoded with instructions executable by one or more processors described herein comprise a software module configured to track imbalances between supply and demand of ETF shares on the secondary market. In some embodiments, non-transitory computer-readable storage medias encoded with instructions executable by one or more processors described herein may further comprise a software module configured to provide analysis of the tracked imbalances and determine how the tracked data translates to creation and redemption on the primary market. In some embodiments, non-transitory computer-readable storage medias encoded with instructions executable by one or more processors described herein may further comprise a software module configured to calculate the internalization of create redeem activity by broker dealers, operational shorting activity, or other activities down to the authorized participant level for a given ETF.

The claims and embodiment described herein are configured to solve the problems as described above.

Embodiment 1. A computer-implemented method of providing passive data transparency in a distributed market comprising:

a) aggregating index data for a plurality of indices;

b) generating a first database, utilizing at least the index data, searchable to return passive activity data;

c) applying, in a distributed parallel computing architecture, a first algorithm utilizing a vectorized calculation over time series data to generate a multi-dimensional representation of ownership graphs including pass through variables between ETFs and assets;

d) mapping relationship data between indices and ETFs;

e) generating a second database, using at least the relationship data, searchable by index to return linking ETFs; and f) providing an analytics layer for synthesizing the first database, ownership graphs including pass through variables, and the second database to perform a task.

Embodiment 2. The method of Embodiment 1, further comprising standardizing the index data.

Embodiment 3. The method of any one of Embodiments 1 or 2, wherein the index data comprises one or more aspects of an index profile, one or more aspects of an index history, one or more aspects of an index event, or a combination thereof.

Embodiment 4. The method of any one of Embodiments 1 to 3, wherein aggregating index data comprises utilizing a web bot, a web crawler, a web scraper, or a combination thereof.

Embodiment 5. The method of any one of Embodiments 1 to 4, wherein the aggregated index data comprises data from at least one of a database, website, document, or a combination thereof.

Embodiment 6. The method of any one of Embodiments 1 to 5, wherein the first database comprises an information table and an event table.

Embodiment 7. The method of any one of Embodiments 1 to 6, wherein the first database is searchable by one or more aspects of the ownership graph of an asset.

Embodiment 8. The method of Embodiment 7, wherein the first database returns passive activity data for the asset across global index providers.

Embodiment 9. The method of any one of Embodiments 1 to 8, wherein the time series data comprises calendar time series data.

Embodiment 10. The method of any one of Embodiments 1 to 9, wherein the time series data comprises relative time series data.

Embodiment 11. The method of any one of Embodiments 1 to 10, wherein applying the first algorithm is automated.

Embodiment 12. The method of any one of Embodiments 1 to 11, wherein the first algorithm comprises a machine learning algorithm.

Embodiment 13. The method of any one of Embodiments 1 to 12, wherein the pass through variables comprise pass through flows.

Embodiment 14. The method of Embodiment 13, wherein the pass through flows are bidirectional.

Embodiment 15. The method of Embodiment 13, wherein the pass through flows comprise an integer input, a function, or a combination thereof.

Embodiment 16. The method of any one of Embodiments 1 to 15, wherein mapping relationship data comprises utilizing a web bot, a web crawler, a web scraper, or a combination thereof.

Embodiment 17. The method of any one of Embodiments 1 to 16, wherein the task comprises analyzing passive market activity, performing portfolio risk monitoring, performing direct indexing, or a combination thereof.

Embodiment 18. The method of any one of Embodiments 1 to 17, wherein the task comprises generating an actionable recommendation.

Embodiment 19. The method of any one of Embodiments 1 to 18, wherein the task comprises making a prediction.

Embodiment 20. The method of any one of Embodiments 1 to 19, wherein the task comprises generating a visual interface.

Embodiment 21. The method of Embodiment 20, wherein the generated visual interface is presented on a display.

Embodiment 22. The method of Embodiment 21, wherein the display is a touch screen.

Embodiment 23. The method of Embodiment 20, wherein the generated visual interface comprises a three-dimensional element presented on an augmented reality display or a virtual reality display.

Embodiment 24. The method of any one of Embodiments 1 to 23, wherein the task comprises applying a second algorithm to rank, sort, and/or quantify the influence of pass through variables.

Embodiment 25. The method of Embodiment 24, wherein the second algorithm comprises a machine learning algorithm.

Embodiment 26. The method of any one of Embodiments 1 to 25, wherein the generated first database and second database are stored in a memory.

Embodiment 26a. The method of any one of Embodiments 1 to 26, wherein the aggregated index data comprises mutual fund data and ETF data and the task comprises tracking one or more mutual fund to ETF conversions.

Embodiment 27. A computer-implemented system comprising at least one processor, a memory, and instructions executable by the at least one processor to cause the at least one processor to perform operations for providing passive data transparency in a distributed market, the operations comprising:

a) aggregating index data for a plurality of indices;

b) generating a first database, utilizing at least the index data, searchable to return passive activity data;

c) applying, in a distributed parallel computing architecture, a first algorithm utilizing a vectorized calculation over time series data to generate a multi-dimensional representation of ownership graphs including pass through variables between ETFs and assets;

d) mapping relationship data between indices and ETFs;

f) generating a second database, using at least the relationship data, searchable by index to return linking ETFs; and g) providing an analytics layer for synthesizing the first database, ownership graphs including pass through variables, and the second database to perform a task.

Embodiment 28. The system of Embodiment 27, further comprising standardizing the index data.

Embodiment 29. The system of any one of Embodiments 27 or 28, wherein the index data comprises one or more aspects of an index profile, one or more aspects of an index history, one or more aspects of an index event, or a combination thereof.

Embodiment 30. The system of any one of Embodiments 27 to 29, wherein aggregating index data comprises utilizing a web bot, a web crawler, a web scraper, or a combination thereof.

Embodiment 31. The system of any one of Embodiments 27 to 30, wherein the aggregated index data comprises data from at least one of a database, website, document, or a combination thereof.

Embodiment 32. The system of any one of Embodiments 27 to 31, wherein the first database comprises an information table and an event table.

Embodiment 33. The system of any one of Embodiments 27 to 32, wherein the first database is searchable by one or more aspects of the ownership graph of an asset.

Embodiment 34. The system of Embodiment 34, wherein the first database returns passive activity data for the asset across global index providers.

Embodiment 35. The system of any one of Embodiments 27 to 34, wherein the time series data comprises calendar time series data.

Embodiment 36. The system of any one of Embodiments 27 to 35, wherein the time series data comprises relative time series data.

Embodiment 37. The system of any one of Embodiments 27 to 36, wherein applying the first algorithm is automated.

Embodiment 38. The system of any one of Embodiments 27 to 37, wherein the first algorithm comprises a machine learning algorithm.

Embodiment 39. The system of any one of Embodiments 27 to 38, wherein the pass through variables comprise pass through flows.

Embodiment 40. The system of Embodiment 39, wherein the pass through flows are bidirectional.

Embodiment 41. The system of Embodiment 39, wherein the pass through flows comprise an integer input, a function, or a combination thereof.

Embodiment 42. The system of any one of Embodiments 27 to 41, wherein mapping relationship data comprises utilizing a web bot, a web crawler, a web scraper, or a combination thereof.

Embodiment 43. The system of any one of Embodiments 27 to 42, wherein the task comprises analyzing passive market activity, performing portfolio risk monitoring, performing direct indexing, or a combination thereof.

Embodiment 44. The system of any one of Embodiments 27 to 43, wherein the task comprises generating an actionable recommendation.

Embodiment 45. The system of any one of Embodiments 27 to 44, wherein the task comprises making a prediction.

Embodiment 46. The system of any one of Embodiments 27 to 45, wherein the task comprises generating a visual interface.

Embodiment 47. The system of Embodiment 46, wherein the generated visual interface is presented on a display.

Embodiment 48. The system of Embodiment 47, wherein the display is a touch screen.

Embodiment 49. The system of Embodiment 46, wherein the generated visual interface comprises a three-dimensional element presented on an augmented reality display or a virtual reality display.

Embodiment 50. The system of any one of Embodiments 27 to 49, wherein the task comprises applying a second algorithm to rank, sort, and/or quantify the influence of pass through variables.

Embodiment 51. The system of Embodiment 50, wherein the second algorithm comprises a machine learning algorithm.

Embodiment 52. The system of any one of Embodiments 27 to 51, wherein the generated first database and second database are stored in a memory.

Embodiment 53. The system of any one of Embodiments 27 to 52, wherein the aggregated index data comprises mutual fund data and ETF data and the task comprises tracking one or more mutual fund to ETF conversions.

Embodiment 54. A Non-transitory computer-readable storage media encoded with instructions executable by one or more processors provide a passive data transparency application, comprising:

a) a software module configured to aggregate index data for multiple indices;

b) a software module configured to generate a first database, using at least the index data, which is searchable to return passive activity data;

c) a software module configured to apply, within a distributed parallel computing architecture, a first algorithm using a vectorized calculation over time series data to generate a multi-dimensional representation of relationship graphs, including pass through variables between ETFs and assets;

d) a software module configured to map relationship data between indices and ETFs;

e) a software module configured to generate a second database, using at least the relationship data, which is searchable by index to return linking ETFs; and f) a software module configured to provide an analytics layer to synthesize the first database, relationship graphs including pass through variables, and the second database to perform a task.

Embodiment 55. The non-transitory computer-readable storage media of Embodiment 54, wherein the application further comprises a software module configured to standardize the index data.

Embodiment 56. The non-transitory computer-readable storage media of any one of Embodiments 54 or 55, wherein the index data comprises one or more aspects of an index profile, one or more aspects of an index history, one or more aspects of an index event, or a combination thereof.

Embodiment 57. The non-transitory computer-readable storage media of any one of Embodiments 54 to 56, wherein the software module configured to aggregate index data utilizes a web bot, a web crawler, a web scraper, or a combination thereof.

Embodiment 58. The non-transitory computer-readable storage media of any one of Embodiments 54 to 57, wherein the aggregated index data comprises data from at least one of a database, website, document, or a combination thereof.

Embodiment 59. In the non-transitory computer-readable storage media of any one of Embodiments 54 to 58, wherein the first database comprises an information table and an event table.

Embodiment 60. The non-transitory computer-readable storage media, of any one of Embodiments 54 to 59, wherein the first database is searchable by one or more aspects of the relationship graph of an asset.

Embodiment 61. The non-transitory computer-readable storage media of Embodiment 60, wherein the first database returns passive activity data for the asset across global index providers.

Embodiment 62. In the non-transitory computer-readable storage media of any one of Embodiments 54 to 61, wherein the time series data comprises calendar time series data.

Embodiment 63. In the non-transitory computer-readable storage media of any one of Embodiments 54 to 62, wherein the time series data comprises relative time series data.

Embodiment 64. The non-transitory computer-readable storage media of any one of Embodiments 54 to 63, wherein the software module configured to apply the first algorithm is automated.

Embodiment 65. The non-transitory computer-readable storage media described in Embodiments 54 to 64, wherein the first algorithm comprises a machine learning algorithm.

Embodiment 66. The non-transitory computer-readable storage media d of any one of Embodiments 54 to 65, wherein the pass through variables comprise pass through flows.

Embodiment 67. The non-transitory computer-readable storage media of any one of Embodiments 54 to 66, wherein the pass through flows are bidirectional.

Embodiment 68. The non-transitory computer-readable storage media of any one of Embodiments 54 to 67, wherein the pass through flows comprise an integer input, a function, or a combination thereof.

Embodiment 69. In the non-transitory computer-readable storage media of any one of Embodiments 54 to 68, wherein the software module configured to map relationship data between indices and ETFs utilizes a web bot, a web crawler, a web scraper, or a combination thereof.

Embodiment 70. The non-transitory computer-readable storage media of any one of Embodiments 54 to 69, wherein the task comprises analyzing passive market activity, performing portfolio risk monitoring, performing direct indexing, or a combination thereof.

Embodiment 71. The non-transitory computer-readable storage media of any one of Embodiments 54 to 70, wherein the task comprises generating an actionable recommendation.

Embodiment 72. The non-transitory computer-readable storage media of any one of Embodiments 54 to 71, wherein the task comprises making a prediction.

Embodiment 73. The non-transitory computer-readable storage media of any one of Embodiments 54 to 72, wherein the task comprises generating a visual interface.

Embodiment 74. In the non-transitory computer-readable storage media of Embodiment 73, wherein the generated visual interface is presented on a display.

Embodiment 75. The non-transitory computer-readable storage media of Embodiment 74, wherein the display is a touch screen.

Embodiment 76. The non-transitory computer-readable storage media of Embodiment 73, wherein the generated visual interface comprises a three-dimensional element presented on an augmented reality display or a virtual reality display.

Embodiment 77. The non-transitory computer-readable storage media, of any one of Embodiments 54 to 76, wherein the task comprises applying a second algorithm to rank, sort, and/or quantify the influence of pass through variables.

Embodiment 78. The non-transitory computer-readable storage media of Embodiment 77, wherein the second algorithm comprises a machine learning algorithm.

Embodiment 79. In the non-transitory computer-readable storage media of any one of Embodiments 54 to 78, wherein the generated first database and second database are stored in a memory.

Embodiment 80. The non-transitory computer-readable storage media of any one of Embodiments 54 to 79, wherein the aggregated index data comprises mutual fund data and ETF data and the task comprises tracking one or more mutual fund to ETF conversions.

Embodiment 81. A computer-implemented method of providing passive data transparency in a distributed market comprising:

a) aggregating ownership, relationship, or associated ETF service provider data for a plurality of ETFs;

b) aggregating index data for numerous indices;

c) applying, in a distributed parallel computing architecture, a first algorithm that uses a vectorized calculation over time series data to generate a multi-dimensional representation of relationship graphs, including pass-through variables between Primary Markets and Secondary Markets;

d) mapping relationship data between assets, ETFs, and indices;

e) creating a database, using at least the ownership data, which is searchable by asset to return linking ETFs; and f) providing an analytics layer to synthesize the relationship graphs including pass-through variables, and the database to perform a task.

Embodiment 82. The method of Embodiment 81, wherein the ETF data comprises one or more of ownership data, relationship data, or associated ETF service provider data, for the multitude of ETFs.

Embodiment 83. The method of any one of Embodiments 81 or 82, wherein the ETF data includes one or more data related to Authorized Participants (AP), market makers, creation/redemption data, AP buying/selling data, or a combination thereof.

Embodiment 84. The method of any one of Embodiments 81 to 83, further comprises standardizing the ETF data.

Embodiment 85. The method of any one of Embodiments 81 to 84, wherein aggregating ETF data comprises utilizing a web bot, a web crawler, a web scraper, a vendor or a combination thereof.

Embodiment 86. The method of any one of Embodiments 81 to 85, wherein the database is searchable by one or more aspects of the relationship graph of an asset.

Embodiment 87. The method of any one of Embodiments 81 to 86, wherein the database returns passive activity data for the asset across global index providers, ETFs, or Fund Issuers.

Embodiment 88. The method of any one of Embodiments 81 to 87, wherein the time series data comprises calendar time series data.

Embodiment 89. The method of any one of Embodiments 81 to 88, wherein the time series data comprises relative time series data.

Embodiment 90. The method of any one of Embodiments 81 to 89, wherein applying the first algorithm is automated.

Embodiment 91. The method of any one of Embodiments 81 to 90, wherein the first algorithm comprises a machine learning algorithm.

Embodiment 92. The method of any one of Embodiments 81 to 91, wherein the pass through variables comprise pass through flows, and optionally, wherein the pass through flows comprise information flows, capital flows, or a combination thereof.

Embodiment 93. The method of Embodiment 92, wherein the pass through flows are bidirectional.

Embodiment 94. The method of Embodiment 93, wherein the bidirectional flow comprises information flow, capital flow, or data flow between authorized participants and ETF issuers, authorized participants and ETF investors, authorized participants and underlying investors, or a combination thereof.

Embodiment 95. The method of Embodiment 94, wherein the bidirectional flow between the authorized participants and the ETF issuers comprises at least creation and redemption variables.

Embodiment 96. The method of Embodiment 94, wherein the bidirectional flow between the authorized participants and the ETF investor or underlying investor comprises at least AP selling and buying variables.

Embodiment 97. The method of Embodiment 93, wherein the pass through flows comprise an integer input, a function, or a combination thereof.

Embodiment 98. The method of any one of Embodiments 81 to 97, wherein the task comprises analyzing passive market activity, performing portfolio risk monitoring, performing direct indexing, performing compliance monitoring, performing conflict monitoring, or a combination thereof.

Embodiment 99. The method of any one of Embodiments 81 to 97, wherein the task comprises generating an actionable recommendation.

Embodiment 100. The method of any one of Embodiments 81 to 97, wherein the task comprises making a prediction.

Embodiment 101. The method of any one of Embodiments 81 to 97, wherein the task comprises generating a visual interface.

Embodiment 102. The method of Embodiment 101, wherein the generated visual interface is presented on a display.

Embodiment 103. The method of Embodiment 102, wherein the display is a touch screen.

Embodiment 104. The method of Embodiment 101, wherein the generated visual interface comprises a three-dimensional element presented on an augmented reality display or a virtual reality display.

Embodiment 105. The method of any one of Embodiments 81 to 104, wherein the task comprises applying a second algorithm to rank, sort, and/or quantify the influence of pass through variables.

Embodiment 106. The method of any one of Embodiments 81 to 105, wherein the second algorithm comprises a machine learning algorithm.

Embodiment 107. The method of any one of Embodiments 81 to 106, wherein the aggregated ETF data, the aggregated Index data and the database are stored in a memory.

Embodiment 108. The method of any one of Embodiments 81 to 107, wherein the aggregated ETF data comprises mutual fund data and ETF data and the task comprises tracking one or more mutual fund to ETF conversions.

Embodiment 109. A computer-implemented system comprising at least one processor, a memory, and instructions executable by the at least one processor to cause the at least one processor to perform operations for providing passive data transparency in a distributed market, the operations comprising:

a) aggregating ownership, relationship, or associated ETF service provider data for a plurality of ETFs;

b) aggregating index data for a plurality of indices;

c) applying, in a distributed parallel computing architecture, a first algorithm utilizing a vectorized calculation over time series data to generate a multi-dimensional representation of relationship graphs including pass through variables between Primary Markets and Secondary Markets;

d) mapping relationship data between assets ETFs, and indices;

e) generating a database, using at least the ownership data, searchable by asset to return linking ETFs; and f) providing an analytics layer for synthesizing the database, relationship graphs including pass through variables, and user interface to perform a task.

Embodiment 110. A non-transitory computer-readable storage media encoded with instructions executable by one or more processors provide a passive data transparency application, comprising:

a) a software module configured to aggregate ownership, relationship, or associated ETF service provider data for a plurality of ETFs;

b) a software module configured to aggregate index data for a plurality of indices;

c) a software module configured to apply, in a distributed parallel computing architecture, a first algorithm utilizing a vectorized calculation over time series data to generate a multi-dimensional representation of relationship graphs including pass through variables between Primary Markets and Secondary Markets;

d) a software module configured to map relationship data between assets, ETFs, and indices;

e) a software module configured to generate a database, using at least the ownership data, searchable by asset to return linking ETFs; and f) a software module configured to provide an analytics layer for synthesizing the database, relationship graphs including pass through variables, and user interface to perform a task.

Embodiment 111. A computer-implemented method of providing passive data transparency in a distributed market comprising:

aggregating or using aggregated ETF data at least including ownership data to generate a first database;

applying, in a distributed parallel computing architecture, a first algorithm utilizing a vectorized calculation over time series data to generate a multi-dimensional representation of relationship graphs including pass through variables between nodes within or across the Primary Markets and Secondary Markets;

generating a database, searchable by any dimension of the calculated data or any component of the relationship graph; and providing an analytics layer for synthesizing any component of the relationship graph including pass through variables, and the database to perform a task.

Embodiment 112. The method of Embodiment 111 wherein the ETF data comprises one or more of ownership data, relationship data, or associated ETF service provider data, for the plurality of ETFs.

Embodiment 113. The method, according to Embodiment 111 or 112, wherein step a) further aggregating or using aggregated asset data to generate a first database.

Embodiment 114. The method, of any one of Embodiments 111 to 113, wherein the ETF data comprises one or more of data related to Authorized Participants (AP), market makers, creation/redemption data, AP buying/selling data, or a combination thereof.

Embodiment 115. The method, of any one of Embodiments 111 to 114, further comprises standardizing the ETF data.

Embodiment 116. The method, of any one of Embodiments 111 to 115, wherein the database returns passive activity data for a searched asset across global index providers, ETFs, or Fund Issuers.

Embodiment 117. The method, of any one of Embodiments 111 to 116, wherein the time series data comprises calendar time series data.

Embodiment 118. The method, of any one of Embodiments 111 to 117, wherein the time series data comprises relative time series data.

Embodiment 119. The method, of any one of Embodiments 111 to 118, wherein applying the first algorithm is automated.

Embodiment 120. The method, of any one of Embodiments 111 to 119, wherein the first algorithm comprises a machine learning algorithm.

Embodiment 121. The method, of any one of Embodiments 111 to 120, wherein the pass through variables comprise pass through flows.

Embodiment 122. The method, of Embodiment 121, wherein the pass through flows are bidirectional.

Embodiment 123. The method, of Embodiment 122, wherein the bidirectional flow comprises one or more of information flow, capital flow, or data flow between authorized participants and ETF issuers, authorized participants and ETF investors, authorized participants and underlying investors, or a combination thereof.

Embodiment 124. The method, of Embodiment 123, wherein the bidirectional flow between the authorized participants and the ETF issuers comprises at least creation and redemption variables.

Embodiment 125. The method, of Embodiment 123, wherein the bidirectional flow between the authorized participants and the ETF investor or underlying investor comprises at least AP selling and buying variables.

Embodiment 126. The method, of Embodiment 121, wherein the pass through flows comprise an integer input, a function, or a combination thereof.

Embodiment 127. The method, of any one of Embodiments 111 to 127, wherein the task comprises analyzing passive market activity, performing portfolio risk monitoring, performing direct indexing, performing compliance monitoring, performing conflict monitoring, or a combination thereof.

Embodiment 128. The method, of any one of Embodiments 111 to 128, wherein the task comprises at least one of generating an actionable recommendation or making a prediction.

Embodiment 129. The method, of any one of Embodiments 111 to 128, wherein the task comprises generating a visual interface configured to be presented on a display.

Embodiment 130. The method, of any one of Embodiments 111 to 129, wherein the task comprises applying a second algorithm to rank, sort, and/or quantify the influence of pass through variables.

Embodiment 131. The method, of Embodiment 130, wherein the second algorithm comprises a machine learning algorithm.

Embodiment 132. The method, of any one of Embodiments 111 to 131, wherein the aggregated ETF data, the aggregated Index data and the database are stored in a memory.

Embodiment 133. The method, of any one of Embodiments 111 to 132, wherein the aggregated ETF data comprises mutual fund data and ETF data and the task comprises tracking one or more mutual fund to ETF conversions.

Embodiment 134. The method, of any one of Embodiments 111 to 133, wherein the second database comprises relational information.

Embodiment 135. The method, of any one of Embodiments 111 to 134, wherein time series information such as price, market capitalization, shares outstanding, volume, and other market or publicly reported data on the ETF or asset level is included.

Embodiment 136. The method, of any one of Embodiments 111 to 135, wherein the pass through data comprises calculated data from the generated relationship graphs.

Embodiment 137. The method, of any one of Embodiments 111 to 136, wherein the task comprises calculating predicted price slippage caused by passive activity.

Embodiment 138. The method, of any one of Embodiments 111 to 137, wherein the second database is utilized to train a machine learning algorithm or model.

Embodiment 139. A computer-implemented system comprising at least one processor, a memory, and instructions executable by the at least one processor to cause the at least one processor to perform operations for providing passive data transparency in a distributed market, the operations comprising:

a) aggregating or using aggregated ETF data at least including ownership data to generate a first database;

b) applying, in a distributed parallel computing architecture, a first algorithm utilizing a vectorized calculation over time series data to generate a multi-dimensional representation of relationship graphs including pass through variables between nodes within or across the Primary Markets and Secondary Markets;

c) generating a database, searchable by any dimension of the calculated data or any component of the relationship graph; and d) providing an analytics layer for synthesizing any component of the relationship graph including pass through variables, and the database to perform a task Embodiment 140. A non-transitory computer-readable storage media encoded with instructions executable by one or more processors to provide a passive data transparency application comprising:

a) a software module configured to aggregate aggregated ETF data at least including ownership data to generate a first database;

b) a software module configured to apply, in a distributed parallel computing architecture, a first algorithm utilizing a vectorized calculation over time series data to generate a multi-dimensional representation of relationship graphs including pass through variables between nodes within or across the Primary Markets and Secondary Markets;

c) a software module configured to generate a database, searchable by any dimension of the calculated data or any component of the relationship graph; and d) a software module configured to an analytics layer for synthesizing any component of the relationship graph including pass through variables, and the database to perform a task.

Embodiment 141. Any one of Embodiments 81 to 140, wherein a) further comprises aggregating asset data to generate the database.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
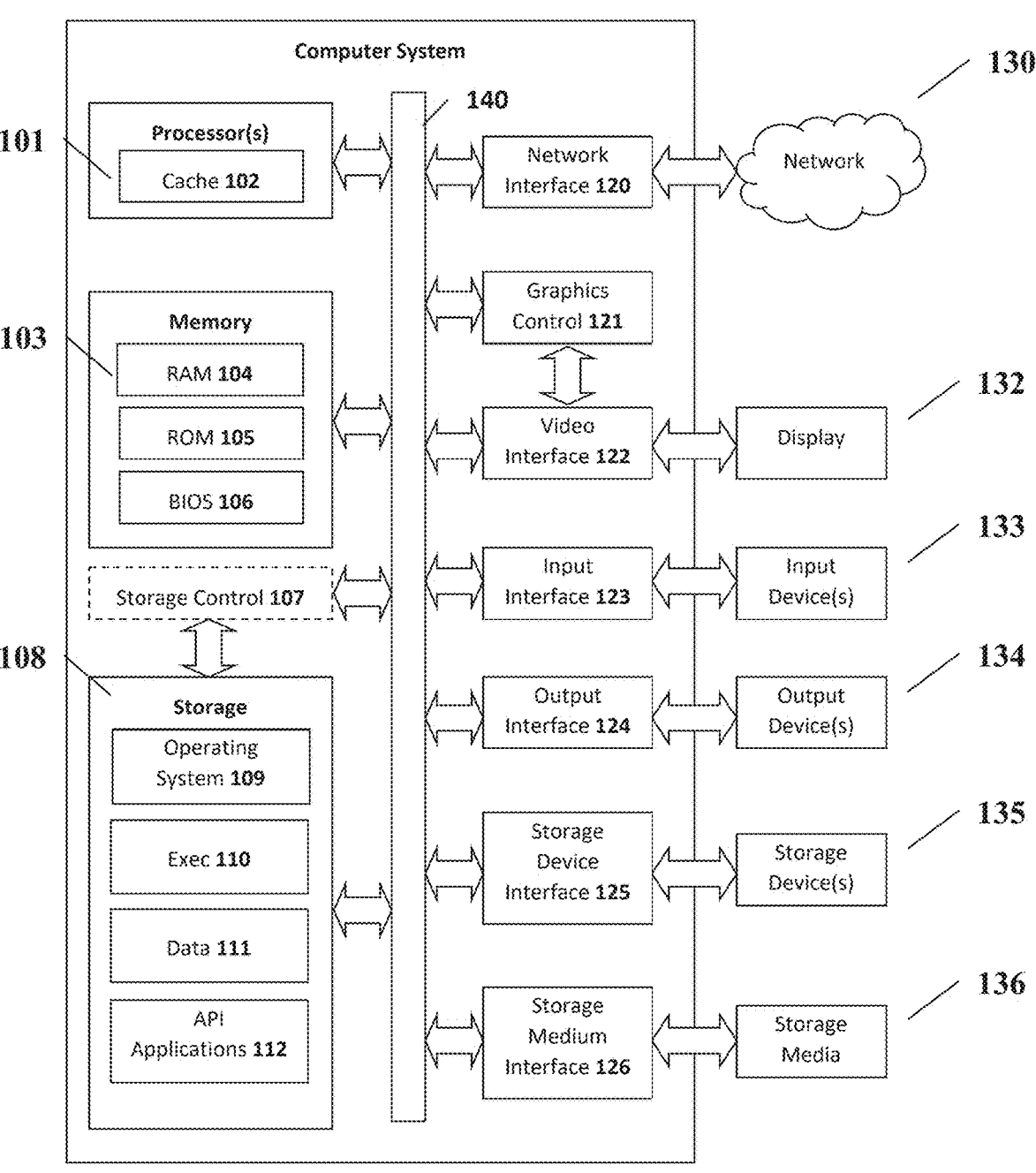
FIG. 1 shows a non-limiting example of a computing device; in this case, a device with one or more processors, memory, storage, and a network interface.

Described herein, in certain embodiments, are computer-implemented methods of providing passive data transparency in a distributed market comprising: aggregating or using aggregated ETF data at least including ownership data to generate a first database; applying, in a distributed parallel computing architecture, a first algorithm utilizing a vectorized calculation over time series data to generate a multi-dimensional representation of relationship graphs including pass through variables between nodes within or across the Primary Markets and Secondary Markets; generating a database, searchable by any dimension of the calculated data or any component of the relationship graph; providing an analytics layer for synthesizing any component of the relationship graph including pass through variables, and the database to perform a task.

Other embodiments described herein are directed to, computer-implemented methods of providing passive data transparency in a distributed market comprising: aggregating index data for a plurality of indices; generating a first database, utilizing at least the index data, searchable to return passive activity data; applying, in a distributed parallel computing architecture, a first algorithm utilizing a vectorized calculation over time series data to generate a multi-dimensional representation of relationship graphs including pass through variables between ETFs and assets; mapping relationship data between indices and ETFs; generating a second database, using at least the relationship data, searchable by index to return linking ETFs; and providing an analytics layer to synthesize the first database, relationship graphs including pass through variables, and the second database to perform a task.

Other embodiments described herein are directed to, computer-implemented methods of providing passive data transparency in a distributed market comprising: aggregating ETF data for a plurality of ETFs; generating a first database, utilizing at least the ETF data, searchable to return passive activity data; applying, in a distributed parallel computing architecture, a first algorithm utilizing a vectorized calculation over time series data to generate a multi-dimensional representation of relationship graphs including pass through variables between ETFs and assets; mapping relationship data between the assets and ETFs; passing through fund level data to an individual asset and vice versa (i.e., passing through asset level data to a fund) based off of an relationship graph; generating a second database, using at least the ETF ownership data, searchable by asset to return linking ETFs; and providing an analytics layer synthesizing the first database, relationship graphs including pass through variables, and the second database to perform a task. In some embodiments, the ETF data comprises one or more of ownership data, relationship data, or associated ETF service provider data, for the plurality of ETFs. In some embodiments, ETF data includes data related to the surrounding infrastructure (e.g., Authorized Participants (AP), market makers, creation/redemption data, AP buying/selling data, RegSho data, order flow, etc.).

Other embodiments described herein are directed to, computer-implemented methods of providing passive data transparency in a distributed market comprising: calculating pass though flows and generating a time series database, based at least in part on said calculated pass through flows, to accurately portray the state of the Primary Market from the Secondary Market and vice versa (i.e., the state of the Secondary Market from the Primary Market). In some embodiments, the method may further comprise tracking imbalances between supply and demand of ETF shares on the secondary market. In some embodiments, the method further comprises providing analysis of the tracked imbalances and determine how the tracked data translates to creation and redemption on the primary market. In some embodiments, the method further comprises calculating the internalization of create redeem activity by broker dealers, operational shorting activity, or other activities down to the authorized participant level for a given ETF.

In some embodiments, the method further comprises standardizing the index data. In some embodiments, the index data comprises one or more aspects of an index profile, one or more aspects of an index history, one or more aspects of an index event, or a combination thereof. In some embodiments, aggregating index data comprises utilizing a web bot, a web crawler, a web scraper, or a combination thereof. In some embodiments, the aggregated index data comprises data from at least one of a database, website, API endpoint, document, or a combination thereof. In some embodiments, the first database comprises an information table and an event table. In some embodiments, the first database is searchable by one or more aspects of the relationship graph of an asset. In further embodiments, the first database returns passive activity data for the asset across global index providers. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is presented on a display. In still further embodiments, the display is a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are stored in a memory.

In another aspect, disclosed herein are computer-implemented systems comprising at least one processor, a memory, and instructions executable by the at least one processor to cause the at least one processor to perform operations for providing passive data transparency in a distributed market, the operations comprising: aggregating index data for a plurality of indices; generating a first database, utilizing at least the index data, searchable to return passive activity data; applying, in a distributed parallel computing architecture, a first algorithm utilizing a vectorized calculation over time series data to generate a multi-dimensional representation of relationship graphs including pass through variables between ETFs and assets; mapping relationship data between indices and ETFs; generating a second database using at least the relationship data, searchable by index to return linking ETFs; and providing an analytics layer synthesizing the first database, relationship graphs including pass through variables, and the second database to perform a task. In some embodiments, the operations further comprise standardizing the index data. In some embodiments, the index data comprises one or more aspects of an index profile, one or more aspects of an index history, one or more aspects of an index event, or a combination thereof. In some embodiments, aggregating index data comprises utilizing a web bot, a web crawler, a web scraper, or a combination thereof. In some embodiments, the aggregated index data comprises data from at least one of a database, website, API endpoint, document, or a combination thereof. In some embodiments, the first database comprises an information table and an event table. In some embodiments, the first database is configured to be searchable by one or more aspects of the relationship graph of an asset. In still further embodiments, the first database returns passive activity data for the asset across global index providers. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In still further embodiments, the pass through flows are bidirectional. In still further embodiments, the pass through flows comprise an integer input, a function, or a combination thereof. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In still further embodiments, the generated visual interface is configured to be presented on a display. In still further embodiments, the display is configured to be a touch screen. In still further embodiments, the generated visual interface comprises a three-dimensional element presented on an augmented reality display or a virtual reality display. In some embodiments, the task comprises applying a second algorithm to rank, sort, and/or quantify the influence of pass through variables. In still further embodiments, the second algorithm comprises a machine learning algorithm. In some embodiments, the generated first database and second database are configured to be stored in a memory.

In some embodiments, disclosed herein are computer-implemented systems comprising at least one processor, a memory, and instructions executable by the at least one processor to cause the at least one processor to perform operations for providing passive data transparency in a distributed market comprising: aggregating ETF data for a plurality of ETFs; generating a first database, utilizing at least the ETF data, searchable to return passive activity data; applying, in a distributed parallel computing architecture, a first algorithm utilizing a vectorized calculation over time series data to generate a multi-dimensional representation of relationship graphs including pass through variables between ETFs and assets; mapping relationship data between the assets and ETFs; passing through fund level data to an individual asset and vice versa (i.e., passing through asset level data to a fund) based off of an relationship graph; generating a second database, using at least the ETF ownership data, searchable by asset to return linking ETFs; and providing an analytics layer synthesizing the first database, relationship graphs including pass through variables, and the second database to perform a task. In some embodiments, the ETF data comprises one or more of ETF ownership data, ETF relationship data, associated ETF service provider data, or a combination thereof, for the plurality of ETFs. In some embodiments, ETF data includes data related to the surrounding infrastructure (e.g., Authorized Participants (AP), market makers, creation/redemption data, AP buying/selling data, etc.). In some embodiments, the operations further comprise standardizing the ETF data. In some embodiments, aggregating ETF data comprises utilizing a web bot, a web crawler, a web scraper, or a combination thereof. In some embodiments, the aggregated ETF data comprises data from at least one of a database, website, API endpoint, document, vendor, or a combination thereof. In some embodiments, the first database comprises an information table and an event table. In some embodiments, the first database is searchable by one or more aspects of the relationship graph of an asset. In further embodiments, the first database returns passive activity data for the asset across global index providers. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is configured to be presented on a display. In still further embodiments, the display is configured to be a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are configured to be stored in a memory.

In another aspect, disclosed herein are computer-implemented methods of providing passive data transparency in a distributed market comprising: aggregating ETF data for a plurality of ETFs; generating a first database, utilizing at least the ETF data, searchable to return passive activity data; applying, in a distributed parallel computing architecture, a first algorithm utilizing a vectorized calculation over time series data to generate a multi-dimensional representation of relationship graphs including pass through variables between ETFs and assets; generate second database comprising a time series database based at least in part on the calculate pass though, to accurately portray the state of the Primary Market from the Secondary Market and vice versa (i.e., the state of the Secondary Market from the Primary Market). In some embodiments, the systems, methods and media described herein may be configured to track imbalances between supply and demand of ETF shares on the secondary market. The system, methods, and media may provide further analysis of the tracked imbalances and determine how the tracked data translates to creation and redemption on the primary market. In some embodiments, the system, methods, and media may further calculate the internalization of create redeem activity by broker dealers, operational shorting activity, or other activities down to the authorized participant level for a given ETF. In some embodiments, the method further comprises standardizing the ETF data. In some embodiments, the ETF data comprises one or more of ETF ownership data, ETF relationship data, associated ETF service provider data, or a combination thereof, for the plurality of ETFs. In some embodiments, ETF data includes data related to the surrounding infrastructure (e.g., Authorized Participants (AP), market makers, creation/redemption data, AP buying/selling data, etc.). In some embodiments, aggregating ETF data comprises utilizing a web bot, a web crawler, a web scraper, or a combination thereof. In some embodiments, the aggregated ETF data comprises data from at least one of a database, website, API endpoint, document, vendor, or a combination thereof. In some embodiments, the first database comprises an information table and an event table. In some embodiments, the first database is searchable by one or more aspects of the relationship graph of an asset. In further embodiments, the first database returns passive activity data for the asset across global index providers. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is configured to be presented on a display. In still further embodiments, the display is configured to be a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are configured to be stored in a memory. In some embodiments, the systems, methods and media described herein are configured to track imbalances between supply and demand of ETF shares on the secondary market. The system, methods, and media may provide further analysis of the tracked imbalances and determine how the tracked data translates to creation and redemption on the primary market. In some embodiments, the system, methods, and media may further calculate the internalization of create redeem activity by broker dealers, operational shorting activity, or other activities down to the authorized participant level for a given ETF.

In another aspect, disclosed herein are non-transitory computer-readable storage medias encoded with instructions executable by one or more processors to provide a passive data transparency application comprising: a software module configured to aggregate index data for a plurality of indices; a software module configured to generate a first database, utilizing at least the index data, searchable to return passive activity data; a software module configured to apply, in a distributed parallel computing architecture, a first algorithm utilizing a vectorized calculation over time series data to generate a multi-dimensional representation of relationship graphs including pass through variables between ETFs and assets; a software module configured to map relationship data between indices and ETFs; a software module configured to generate a second database, using at least the relationship data, searchable by index to return linking ETFs; and a software module configured to provide an analytics layer for synthesizing the first database, relationship graphs including pass through variables, and the second database to perform a task. In some embodiments, the application further comprises a software module configured to standardize the index data. In some embodiments, the index data comprises one or more aspects of an index profile, one or more aspects of an index history, one or more aspects of an index event, or a combination thereof. In some embodiments, the software module is configured to aggregate index data utilizes a web bot, a web crawler, a web scraper, or a combination thereof. In some embodiments, the aggregated index data comprises data from at least one of a database, website, API endpoint, document, or a combination thereof. In some embodiments, the first database comprises an information table and an event table. In some embodiments, the first database is configured to be searchable by one or more aspects of the relationship graph of an asset. In still further embodiments, the first database returns passive activity data for the asset across global index providers. In some embodiments, a time series data comprises calendar time series data. In some embodiments, a time series data comprises relative time series data. In some embodiments, the software module is configured to apply the first algorithm is automated. In some embodiments, the first algorithm comprises a machine learning algorithm. In some embodiments, the pass through variables comprise pass through flows. In still further embodiments, the pass through flows are bidirectional. In still further embodiments, the pass through flows comprise an integer input, a function, or a combination thereof. In some embodiments, the software module configured to map relationship data between indices and ETFs utilizes a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In still further embodiments, the generated visual interface is configured to be presented on a display. In still further embodiments, the display is configured to be a touch screen. In still further embodiments, the generated visual interface comprises a three-dimensional element presented on an augmented reality display or a virtual reality display. In some embodiments, the task comprises applying a second algorithm to rank, sort, and/or quantify the influence of pass through variables. In still further embodiments, the second algorithm comprises a machine learning algorithm. In some embodiments, the generated first database and second database are configured to be stored in a memory.

In some embodiments, disclosed herein are non-transitory computer-readable storage medias encoded with instructions executable by one or more processors to provide a passive data transparency application comprising: a software module configured to aggregate ETF data for a plurality of ETFs; a software module configured to generate a first database, utilizing at least the ETF data, searchable to return passive activity data; a software module configured to apply, in a distributed parallel computing architecture, a first algorithm utilizing a vectorized calculation over time series data to generate a multi-dimensional representation of relationship graphs including pass through variables between ETFs and assets; a software module configured to map relationship data between the assets and ETFs; passing through fund level data to an individual asset and vice versa (i.e., passing through asset level data to a fund) based off of an relationship graph; a software module configured to generate a second database, using at least the ETF ownership data, searchable by asset to return linking ETFs; and a software module configured to provide an analytics layer for synthesizing the first database, relationship graphs including pass through variables, and the second database to perform a task In some embodiments, the ETF data comprises one or more of ETF ownership data, ETF relationship data, associated ETF service provider data, or a combination thereof, for the plurality of ETFs. In some embodiments, ETF data includes data related to the surrounding infrastructure (e.g., Authorized Participants (AP), market makers, creation/redemption data, AP buying/selling data, etc.). In some embodiments, the application further comprises a software module configured to standardize the ETF data. In some embodiments, the software module is configured to aggregate ETF data utilizing a web bot, a web crawler, a web scraper, or a combination thereof. In some embodiments, the aggregated ETF data comprises data from at least one of a database, website, API endpoint, document, vendor, or a combination thereof. In some embodiments, the first database comprises an information table and an event table. In some embodiments, the first database is configured to be searchable by one or more aspects of the relationship graph of an asset. In further embodiments, the first database returns passive activity data for the asset across global index providers. In some embodiments, the time series data comprises calendar time series data. In some embodiments, the time series data comprises relative time series data. In some embodiments, the software module is configured to automatically apply the first algorithm. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, the software module configured to map relationship data between indices and ETFs utilizes a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is configured to be presented on a display. In still further embodiments, the display is configured to be a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are configured to be stored in a memory.

In another aspect, disclosed herein are non-transitory computer-readable storage medias encoded with instructions executable by one or more processors to provide a passive data transparency application comprising: a software module configured to aggregate ETF data for a plurality of ETFs; a software module configured to generate a first database, utilizing at least the ETF data, searchable to return passive activity data; a software module configured to apply, in a distributed parallel computing architecture, a first algorithm utilizing a vectorized calculation over time series data to generate a multi-dimensional representation of relationship graphs including pass through variables between ETFs and assets; a software module configured to generate a second database comprising a time series database based at a least in part on the calculate pass though, to accurately portray the state of the Primary Market from the Secondary Market and vice versa (i.e., the state of the Secondary Market from the Primary Market). In some embodiments, the non-transitory computer-readable described herein may comprises a software module configured to track imbalances between supply and demand of ETF shares on the secondary market. In some embodiments, the non-transitory computer-readable storage medias further comprises a software module configured to provide analysis of the tracked imbalances and determine how the tracked data translates to creation and redemption on the primary market. In some embodiments, the non-transitory computer-readable storage medias further comprises a software module configured to calculate the internalization of create redeem activity by broker dealers, operational shorting activity, or other activities down to the authorized participant level for a given ETF. In some embodiments, the non-transitory computer-readable described herein may comprises a software module configured to standardize the ETF data. In some embodiments, the ETF data comprises one or more of ETF ownership data, ETF relationship data, associated ETF service provider data, or a combination thereof, for the plurality of ETFs. In some embodiments, ETF data includes data related to the surrounding infrastructure (e.g., Authorized Participants (AP), market makers, creation/redemption data, AP buying/selling data, etc.). In some embodiments, aggregating ETF data comprises utilizing a web bot, a web crawler, a web scraper, or a combination thereof. In some embodiments, the aggregated ETF data comprises data from at least one of a database, website, API endpoint, document, vendor, or a combination thereof. In some embodiments, the first database comprises an information table and an event table. In some embodiments, the first database is searchable by one or more aspects of the relationship graph of an asset. In further embodiments, the first database returns passive activity data for the asset across global index providers. In some embodiments, the time series data comprises calendar time series data. In some embodiments, the time series data comprises relative time series data. In some embodiments, applying the first algorithm is automated. In some embodiments, the first algorithm comprises a machine learning algorithm. In some embodiments, the pass through variables comprise pass through flows. In further embodiments, the pass through flows are bidirectional. In still further embodiments, the pass through flows comprise an integer input, a function, or a combination thereof. In some embodiments, mapping relationship data comprises utilizing a web bot, a web crawler, a web scraper, or a combination thereof. In some embodiments, the task comprises analyzing passive market activity, performing portfolio risk monitoring, performing direct indexing, or a combination thereof. In some embodiments, the task comprises an analysis of a fund's ecosystem and holdings for conflicts of interest and flags any concerned items. In some embodiments, the task comprises passing through flows related to the service providers of the ETF and not the ETF itself. In some embodiments, the task comprises generating an actionable recommendation. In some embodiments, the task comprises making a prediction. In some embodiments, the task comprises generating a visual interface. In further embodiments, the generated visual interface is configured to be presented on a display. In still further embodiments, the display is configured to be a touch screen. In further embodiments, the generated visual interface comprises a three-dimensional element presented on an augmented reality display or a virtual reality display. In some embodiments, the task comprises applying a second algorithm to rank, sort, and/or quantify the influence of pass through variables. In further embodiments, the second algorithm comprises a machine learning algorithm. In some embodiments, the generated first database and second database are configured to be stored in a memory. In some embodiments, non-transitory computer-readable storage medias encoded with instructions executable by one or more processors described herein comprise a software module configured to track imbalances between supply and demand of ETF shares on the secondary market. In some embodiments, non-transitory computer-readable storage medias encoded with instructions executable by one or more processors described herein may further comprise a software module configured to provide analysis of the tracked imbalances and determine how the tracked data translates to creation and redemption on the primary market. In some embodiments, non-transitory computer-readable storage medias encoded with instructions executable by one or more processors described herein may further comprise a software module configured to calculate the internalization of create redeem activity by broker dealers, operational shorting activity, or other activities down to the authorized participant level for a given ETF.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the features, structures, or characteristics may be combined in any suitable manner in one or more embodiments.

As used here in the terms "passing through" and "pass through" refer to the act of providing an input or multiple of inputs into a calculation which aims to ascertain the effect that this input(s) will have on an output entity or multiple of output entities. An important attribute of "pass through" calculations is to calculate the influence an input has on an output over multiple, and not just one, points in time. This is particularly applicable to measuring the impact of an event or flow occurring at the parent or composite level (e.g., Index benchmark or Fund Owner), and measuring the downstream impact on the children, constituents, or holdings of the fund. This pass through can also be performed in the reverse direction (e.g., impact of asset price change on price of a composite or index which the asset is a member of).

As used herein, the terms "exchange-traded fund(s)" or "ETF(s)" refer to any type of fund or investment vehicle that is exchange traded and provides regularly reoccurring data disclosures. The data disclosures can be daily, weekly, monthly, quarterly, semi-annually, annually, continuously or any length of time wherein data disclosure occurs repeatedly, e.g., certain open-end management investment companies, index funds, open ended funds, money-market funds, exchange-traded funds, mutual funds, Undertakings for the Collective Investment in Transferable Securities (UCITS), and similar investment vehicles.

As used herein, the term "ETF ecosystem" or "ETF service providers" refers to any individual or entity who manages a process of investment flows, services, or regulation for an ETF issuer. This includes, but is not limited to, data vendors, index providers, legal, trustees, compliance, advisors, sub-advisors, securities lending agents, fund administrators (including accounting and custodians), authorized participants, market makers, broker dealers (including agency brokers, full-service brokers, and discount brokers) and similar persons or entities actively engaged in the functioning of an ETF.

Computing System

Referring to FIG. 1, a block diagram is shown depicting an exemplary machine that includes a computer system 100 (e.g., a processing or computing system) within which a set of instructions can execute for causing a device to perform or execute any one or more of the aspects and/or methodologies for static code scheduling of the present disclosure. The components in FIG. 1 are examples only and do not limit the scope of use or functionality of any hardware, software, embedded logic component, or a combination of two or more such components implementing particular embodiments.

Computer system 100 may include one or more processors 101, a memory 103, and a storage 108 that communicate with each other, and with other components, via a bus 140. The bus 140 may also link a display 132, one or more input devices 133 (which may, for example, include a keypad, a keyboard, a mouse, a stylus, etc.), one or more output devices 134, one or more storage devices 135, and various tangible storage media 136. All of these elements may interface directly or via one or more interfaces or adaptors to the bus 140. For instance, the various tangible storage media 136 can interface with the bus 140 via storage medium interface 126. Computer system 100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 100 includes one or more processor(s) 101 (e.g., central processing units (CPUs), general purpose graphics processing units (GPGPUs), or quantum processing units (QPUs)) that carry out functions. Processor(s) 101 optionally contains a cache memory unit 102 for temporary local storage of instructions, data, or computer addresses. Processor(s) 101 are configured to assist in execution of computer readable instructions. Computer system 100 may provide functionality for the components depicted in FIG. 1 as a result of the processor(s) 101 executing non-transitory, processor-executable instructions embodied in one or more tangible computer-readable storage media, such as memory 103, storage 108, storage devices 135, and/or storage medium 136. The computer-readable media may store software that implements particular embodiments, and processor(s) 101 may execute the software. Memory 103 may read the software from one or more other computer-readable media (such as mass storage device(s) 135, 136) or from one or more other sources through a suitable interface, such as network interface 120. The software may cause processor(s) 101 to carry out one or more processes or one or more steps of one or more processes described or illustrated herein. Carrying out such processes or steps may include defining data structures stored in memory 103 and modifying the data structures as directed by the software.

The memory 103 may include various components (e.g., machine readable media) including, but not limited to, a random access memory component (e.g., RAM 104) (e.g., static RAM (SRAM), dynamic RAM (DRAM), ferroelectric random access memory (FRAM), phase-change random access memory (PRAM), etc.), a read-only memory component (e.g., ROM 105), and any combinations thereof. ROM 105 may act to communicate data and instructions unidirectionally to processor(s) 101, and RAM 104 may act to communicate data and instructions bidirectionally with processor(s) 101. ROM 105 and RAM 104 may include any suitable tangible computer-readable media described below. In one example, a basic input/output system 106 (BIOS), including basic routines that help to transfer information between elements within computer system 100, such as during start-up, may be stored in the memory 103.

Fixed storage 108 is connected bidirectionally to processor(s) 101, optionally through storage control unit 107. Fixed storage 108 provides additional data storage capacity and may also include any suitable tangible computer-readable media described herein. Storage 108 may be used to store operating system 109, executable(s) 110, data 111, applications 112 (application programs), and the like. Storage 108 can also include an optical disk drive, a solid-state memory device (e.g., flash-based systems), or a combination of any of the above. Information in storage 108 may, in appropriate cases, be incorporated as virtual memory in memory 103.

In one example, storage device(s) 135 may be removably interfaced with computer system 100 (e.g., via an external port connector (not shown)) via a storage device interface 125. Particularly, storage device(s) 135 and an associated machine-readable medium may provide non-volatile and/or volatile storage of machine-readable instructions, data structures, program modules, and/or other data for the computer system 100. In one example, software may reside, completely or partially, within a machine-readable medium on storage device(s) 135. In another example, software may reside, completely or partially, within processor(s) 101.

Bus 140 connects a wide variety of subsystems. Herein, reference to a bus may encompass one or more digital signal lines serving a common function, where appropriate. Bus 140 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 100 may also include an input device 133. In one example, a user of computer system 100 may enter commands and/or other information into computer system 100 via input device(s) 133. Examples of an input device(s) 133 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 133 may be interfaced to bus 140 via any of a variety of input interfaces 123 (e.g., input interface 123) including, but not limited to, serial, parallel, game port, USB, FIREWIRE, THUNDERBOLT, or any combination of the above.

In particular embodiments, when computer system 100 is connected to network 130, computer system 100 may communicate with other devices, specifically mobile devices and enterprise systems, distributed computing systems, cloud storage systems, cloud computing systems, and the like, connected to network 130. Communications to and from computer system 100 may be sent through network interface 120. For example, network interface 120 may receive incoming communications (such as requests or responses from other devices) in the form of one or more packets (such as Internet Protocol (IP) packets) from network 130, and computer system 100 may store the incoming communications in memory 103 for processing. Computer system 100 may similarly store outgoing communications (such as requests or responses to other devices) in the form of one or more packets in memory 103 and communicated to network 130 from network interface 120. Processor(s) 101 may access these communication packets stored in memory 103 for processing.

Examples of the network interface 120 include, but are not limited to, a network interface card, a modem, and any combination thereof. Examples of a network 130 or network segment 130 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 130, may employ a wired and/or a wireless mode of communication. In general, any network topology may be used.

Information and data can be displayed through a display 132. Examples of a display 132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 132 can interface to the processor(s) 101, memory 103, and fixed storage 108, as well as other devices, such as input device(s) 133, via the bus 140. The display 132 is linked to the bus 140 via a video interface 122, and transport of data between the display 132 and the bus 140 can be controlled via the graphics control 121. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 132, computer system 100 may include one or more other peripheral output devices 134 including, but not limited to, an audio speaker, a printer, a storage device, and any combinations thereof. Such peripheral output devices may be connected to the bus 140 via an output interface 124. Examples of an output interface 124 include, but are not limited to, a serial port, a parallel connection, a USB port, a FIREWIRE port, a THUNDER-BOLT port, and any combinations thereof.

In addition, or as an alternative, computer system 100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, which perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion™, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java®, and Unity®.

Figure 2:
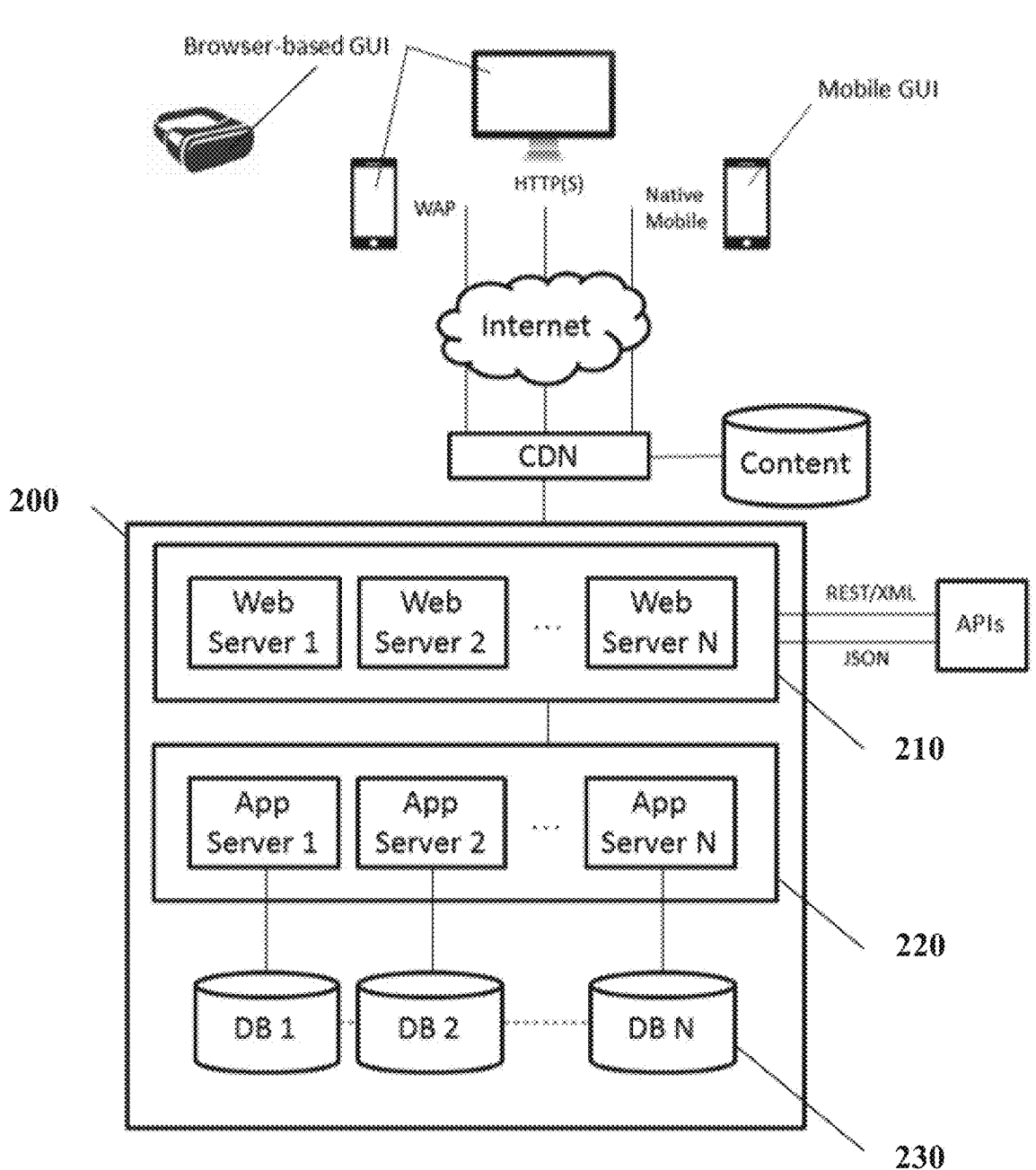
FIG. 2 shows a non-limiting example of a cloud-based web/mobile application provision system; in this case, a system comprising an elastically load balanced, auto-scaling web server and application server resources as well synchronously replicated databases.

Referring to FIG. 2, in a particular embodiment, an application provision system alternatively has a distributed, cloud-based architecture 200 and comprises elastically load balanced, auto-scaling web server resources 210 and application server resources 220 as well synchronously replicated databases 230.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and PhoneGap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of information. The information can comprise market data, ownership data, index data, event data, historical announcements, identifiers, relationship data, transactional data, dividend data, yield data, ESG data, share class data, shareholder report data, governance data (CEO/portfolio managers etc.), and any other relevant data. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

Passive Data Transparency

Figure 3:
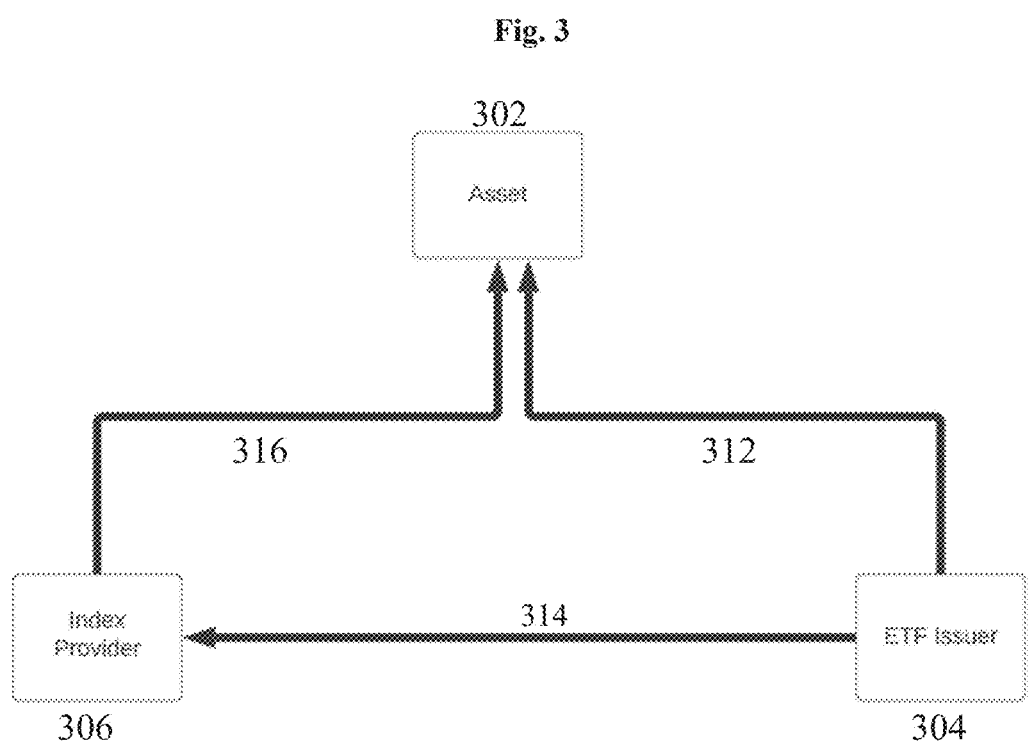
FIG. 3 shows a non-limiting example of an information flow structure; in this case, a flow structure illustrating the current one directional flow of information between Index Providers, ETF Issuers and Assets.

Currently the flow of financial information is asymmetric, creating widespread inefficiencies for market participants, particularly those with exposure at a single security level who lack visibility into the interactions occurring across the passive market. FIG. 3 illustrates the flawed one-directional flow of information that the current financial technology infrastructure provides investors. The first branch of information flow 316, illustrates how an Index provider 306 can see asset related data (time series, fundamental, etc.) from the asset level of the market 302, which may be used to calculate and construct many indices. The asymmetric information flow of this "one to many" relationship blocks the ability of a market participant to analyze which of the many indices are impacting the asset as navigating and processing distributed data across serval platforms is an impractical and time-consuming process using legacy infrastructure. Performing such a process and workflow manually or using current technologies is impractical. The second branch of information flow 312 illustrates how an ETF Issuer (or related ETF service provider) 304 can see the Asset 302 related data in order to track indices, manage securities lending, cash management, Primary market activity (create/ redeem), and reporting and operational exercises associated with fund operations. This provides another "one to many" relationship where participants lack transparency into the impact of the ETF market on the Asset market. The information asymmetry caused by this unmet need is expanding, as the number of ETFs, popularity of ETFs, public information on ETFs, and interactions caused by ETFs continues to grow globally. The combined impact of inefficient information flow makes in nearly impossible for a market participant to gain a full understanding of the passive market and overall market behavior, which consists of components and information flows that span primary/secondary markets, as well as multiple participants and reporting standards. While ETF holding/ownership data is somewhat available and ETFs publish daily holdings, the data is highly fragmented and siloed at the issuer level making it difficult to obtain and analyze the limited information that is available, especially in a repeatable and consistent fashion. The third branch of information flow 314 illustrates how the ETF Issuer, can see index related information for the specific index tracked by each given ETF. The composition, pricing, and rebalancing data of these indices are leveraged by ETF Issuers who often follow a mandate requiring them to track the index as closely as possible. The Index Provider 306 cannot see the ETF related data from the ETF Issuer 304, and there is currently no system capable of allowing the Index Providers 306 to effectively track ETFs and related ETF service providers following an Index. In some non-limiting embodiments, the index issuer is an ETF Issuer 304.

Figure 4:
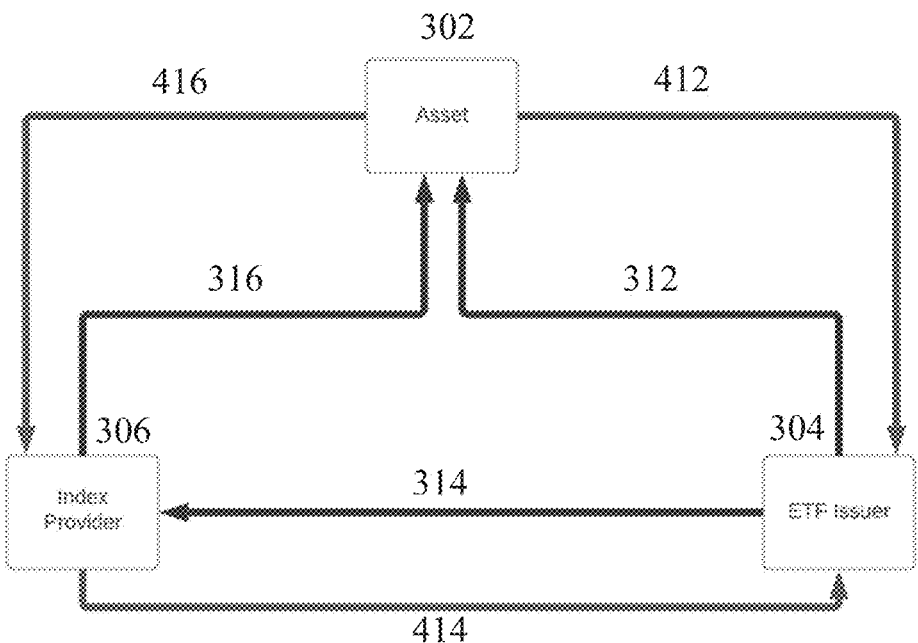
FIG. 4 shows a non-limiting example of an information flow structure; in this case, a flow structure illustrating an improved bi-directional flow of information between Index Providers, ETF Issuers and Assets.

In some embodiments, the platforms, systems, media, and methods disclosed herein address issues of passive data transparency. In some embodiments, the platforms, systems, media, and methods disclosed herein create a bidirectional information flow structure between Asset Investors, ETF issuers, and ETF Investors. FIG. 4 illustrates that in some embodiments, the bidirectional information flow structure creates additional branches of information flow, 412, 414, and 416 between each of the three nodes, to the existing structure illustrated in FIG. 3.

Figure 14:
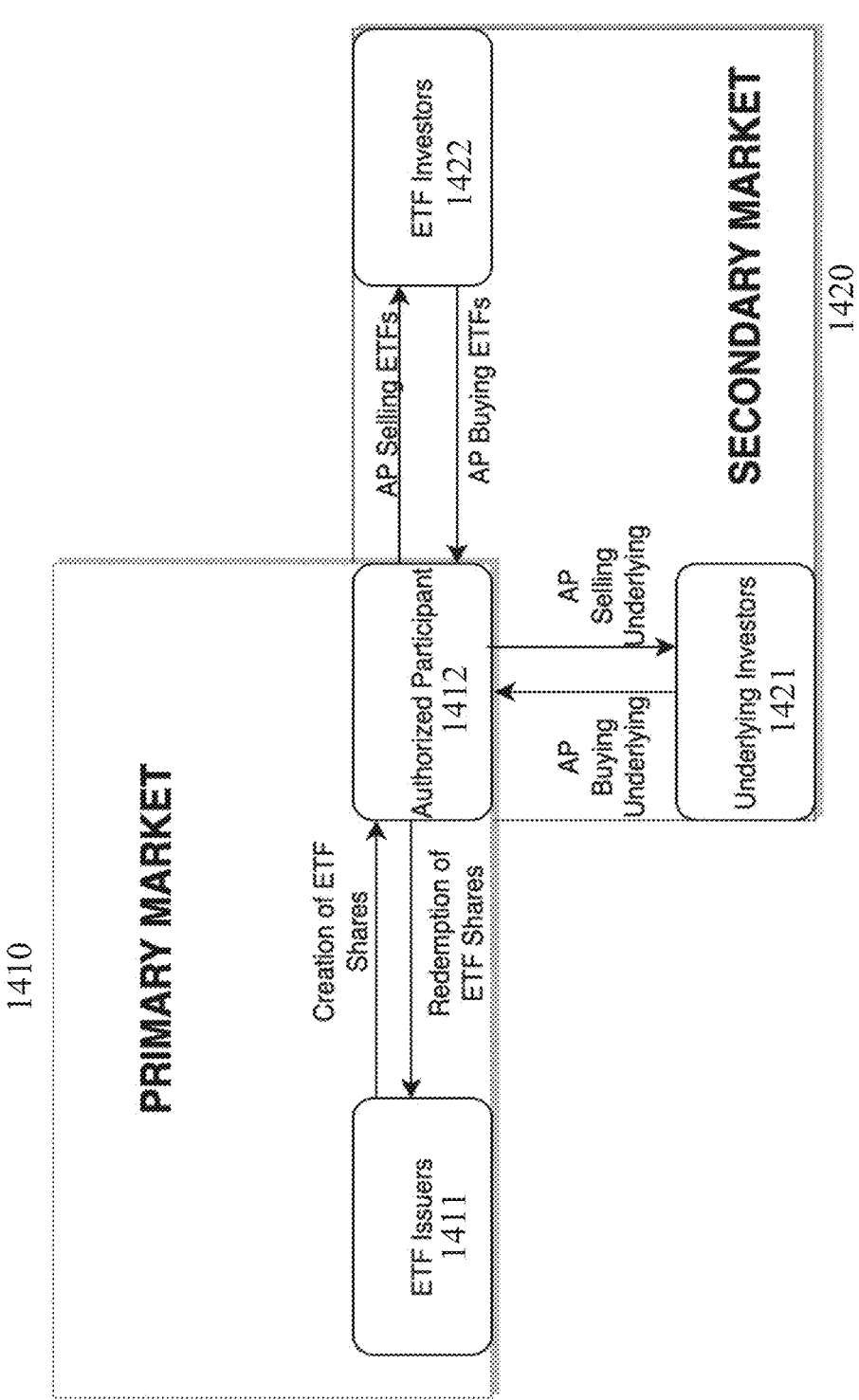
FIG. 14 shows a basic illustration of how an authorized participant sits in between (and thereby affects) the interaction between the primary and secondary market for ETFs.

In some embodiments, the platforms, systems, media, and methods disclosed herein address issues of passive data transparency. In some embodiments, the platforms, systems, media, and methods disclosed herein create a bidirectional information flow structure between Primary Markets 1410 and Secondary Markets 1420. In some embodiments, the platforms, systems, media, and methods disclosed herein create a bidirectional flow between ETF issuers 1411 and Authorized Participants 1412. In some embodiments, the bidirectional flow between the ETF issuers 1411 and Authorized Participants (AP) 1412 includes data and information related to the creation of shares and redemption of shares of ETFs. In some embodiments the platforms, systems, media, and methods may create a bidirectional flow between underlying investors 1421 and the Authorized Participants 1412. In some embodiments the platforms, systems, media, and methods may create a bidirectional flow between ETF investors 1422 and the Authorized Participants 1412. In some embodiments, the bidirectional flow between the Authorized Participants 1412 and the Underlying Investors 1421 and/or the ETF Investors 1422, includes data and information related to the AP buying shares of ETFs or underlyings, AP selling shares of ETFs or underlyings, or a combination thereof. FIG. 14 illustrates that in some embodiments, the bidirectional information flow structure creates bidirectional flow of information between, the Authorized Participants 1412 and ETF Issuers 1411, Underlying Investors 1421, and ETF investors 1422.

Figure 11:
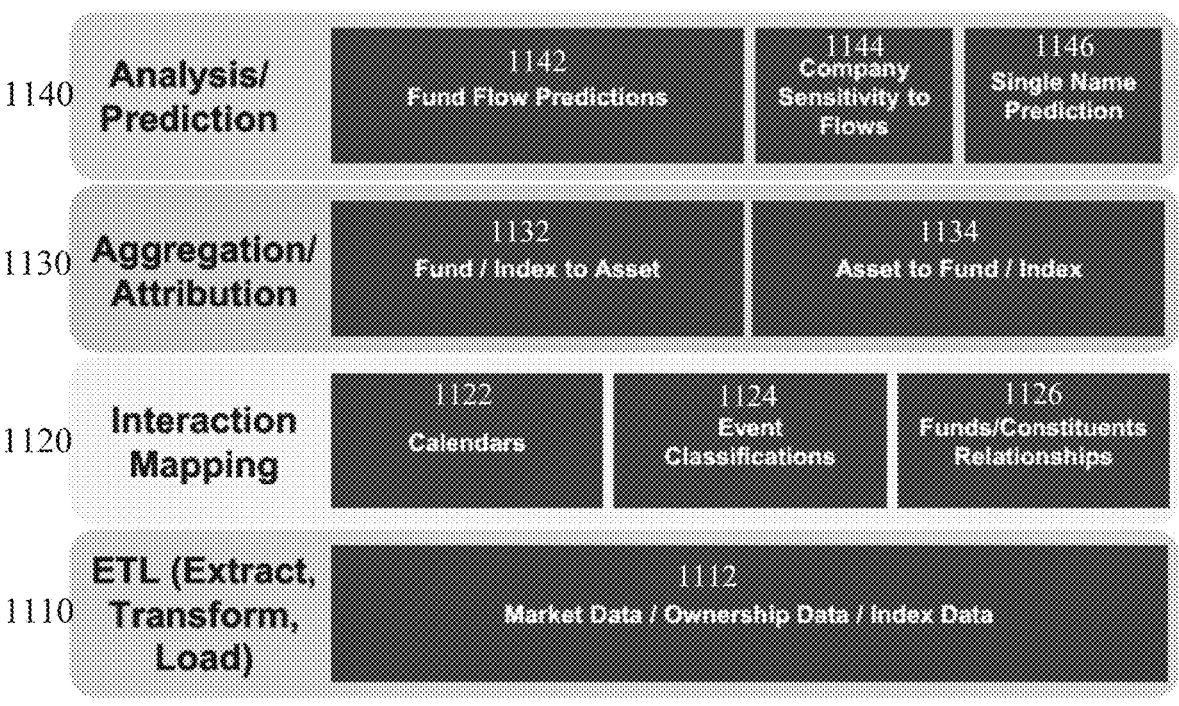
FIG. 11 shows a non-limiting example of a high-level architecture diagram; in this case, a high level architecture diagram for a passive market transparency platform.

FIG. 11 illustrates a high-level architecture diagram for a passive market transparency platform. In this embodiment, an ETL module 1110 extracts and transforms, market data, ownership data, and index data 1112 and loads it into a database. In this embodiment, an interaction mapping module 1120 collects calendar data 1122, event classification data 1124 and funds/constituent relationship data 1226 related to assets, indices and funds and map the relationships between assets, indices, and funds. In this embodiment an aggregation and attribution module 1130 aggregate and synthesize all the data and information, from the ETL module 1110 and interaction mapping module 1120, to generate a comprehensive passive market data platform comprising the data for and relationships between assets to indices/funds 1134, as well as from indices/funds to assets 1132. In this embodiment, an analysis and prediction module 1140 utilize the comprehensive passive market data platform to provide insight and predictions related to the passive market. In this embodiment, the analysis and prediction module 1140 provide at least compliance flags, fund flow predictions 1142, analysis of company sensitivity to flows 1144, and/or single name predictions 1146. In some embodiments, the analysis and prediction module 1140 may further provide relational mapping. In some embodiments, interaction mapping module 1120 may further map fund infrastructure relationships. In some embodiments, the ETL module 1110 may further extract and transform, SEC data and load it into the database.

Flow of Information Between Assets and Index Providers

In some embodiments, the platforms, systems, media, and methods disclosed herein, create a flow of information 416, in order to allow a market participant to obtain all the relevant historical (and predicted) index data for indices across all Index Provider families which include or have included a single (or more) asset.

Currently, the flow of information 316, prevents a market participant from obtaining all the relevant historical (and predicted) index data for indices across all Index Provider families which include or have included a single asset (Stock A). Someone would need to perform a complex and time consuming workflow as described herein, (1) Investor searches which ETFs hold large positions in stock A; (2) Investor picks an ETF to investigate and navigates to ETF issuers website and/or corresponding SEC filing; (3) Investor navigates to ETF issuers website and/or corresponding SEC filing to find that ETFs one pager or similar summary document; (4) Investor identifies which index this ETF is designed to track from the one pager or similar summary document; (5) Investor searches for the index providers website and/or corresponding SEC filing; (6) Investor locates the individual index that the ETF tracks; (7) Investor manually looks through the methodology of that index to identify rules that might affect underlying stock A; (8) Investor goes to index announcements area of index providers' website, to search through unstructured, nested PDFs or HTML pages, and identifies any historical announcements which involved stock A; (9) Investor goes to rebalance calendar on the index providers' website (many don't publicly publish this) to check for any potential impending rebalances; (10) Investor has to refer back to step 7 to ensure whether a rebalance would involve Stock A; (11) Investor goes back to Step 2 and repeats steps 3-10 (often having to navigate different issuers' and providers' websites) for every ETF stake holder.

In some embodiments, the platforms, systems, media, and methods disclosed herein, compresses the workflow above to create a flow of information 416 between Asset Investors 302 and Index Providers 306. In some embodiments, the platforms, systems, media, and methods disclosed herein, leverage a web scraping and cleaning method to amalgamate and synthesize index event data and index-related information into one queryable platform for a user to search by asset and receive aggregated information across the global index provider universe with links directly to the primary source documents.

Figure 6:
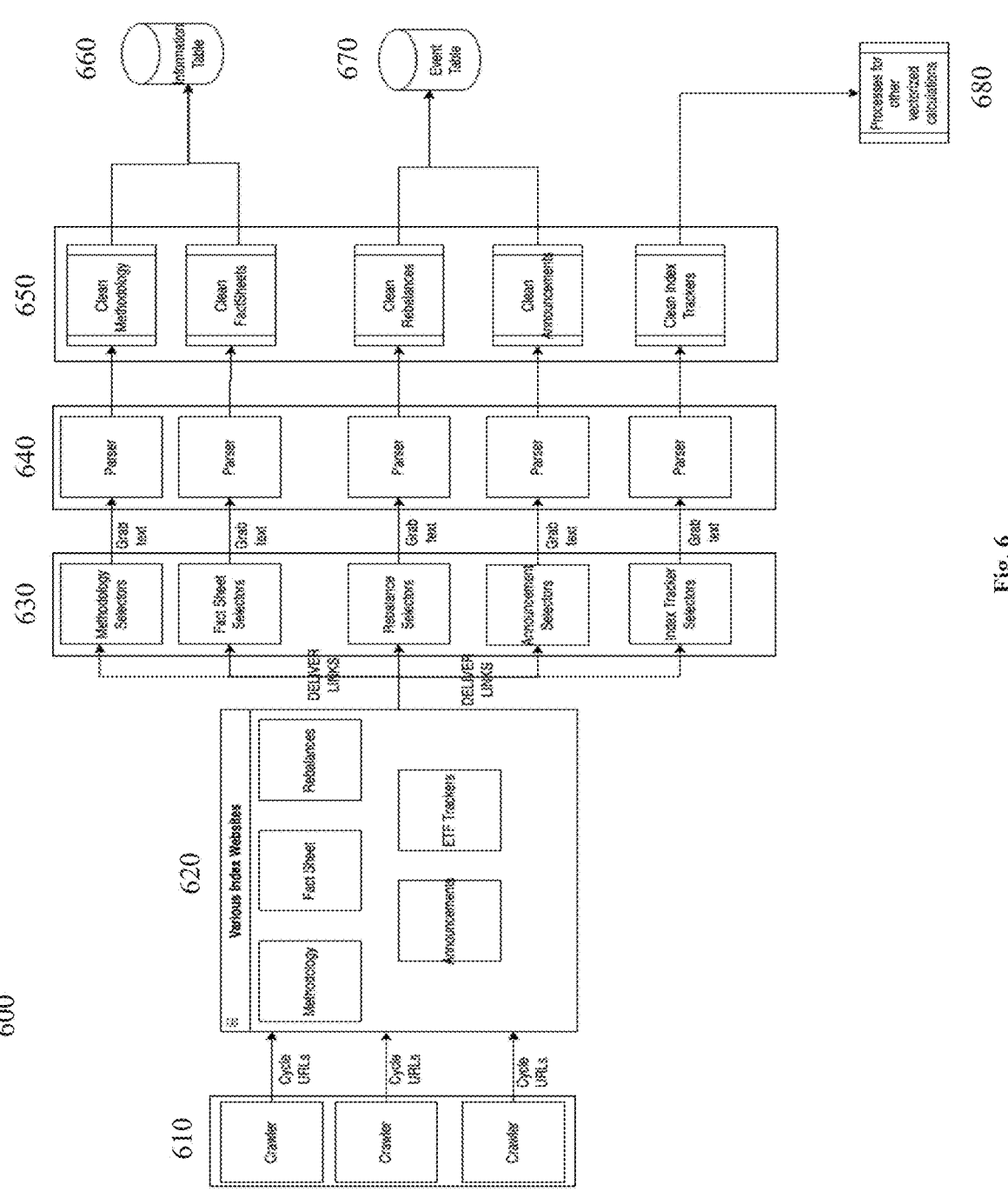
FIG. 6 shows a non-limiting example of an architecture diagram; in this case, an architecture for a system configured for crawling, scraping, parsing, and aggregating index provider data and mapping index related information back to any given asset.

Referring to FIG. 6, in some embodiments, the platforms, systems, comprise, and the methods utilize, a high level schematic architecture 600 comprising: one or more crawlers 610, configured for crawling one or more Various Index Websites 620, wherein the one or more websites Various Index Websites, wherein the websites contain information regarding Methodology, Fact Sheets, Rebalances, Announcements, ETF Trackers, etc.; selectors 630 for selecting relevant text and data from the one or more websites; parsers 640, configured to parse through the selected text and data and perform a cleaning process to analyze, extract, and group useful information from the data from the one or more websites, wherein the cleaned data is synthesized into a queryable platform comprising; an information table 660 and an event table 670, for a user to search by asset and receive aggregated index event data from the substantial majority of the index market. It will be obvious to one of ordinary skill in the art that other known methods and systems can be used to perform crawling, scraping, parsing, and aggregating information and data from online websites, databases, and the like.

Flow of Information Between Assets and ETF Issuers

In some embodiments, the platforms, systems, media, and methods disclosed herein, creates an information flow 412, in order to quantify the relationships between ETFs and assets.

Figure 7A:
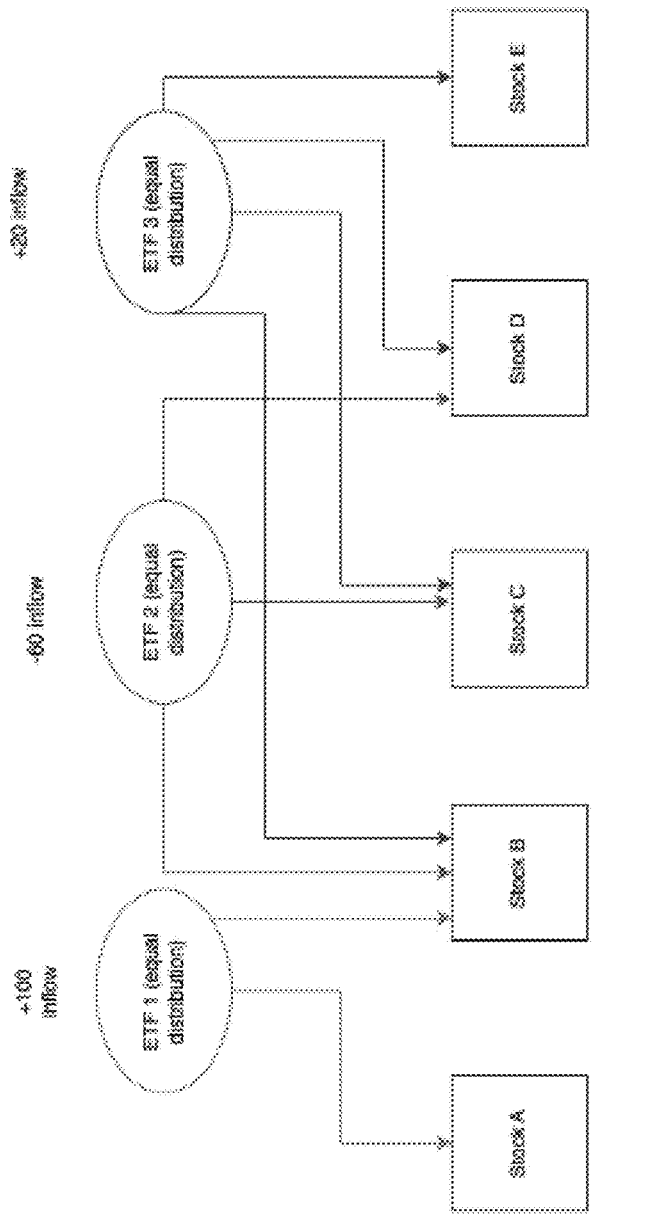
FIG. 7A shows a non-limiting example of a schematic process diagram; in this case, a process for calculating pass through flow involving an integer input.
Figure 7A:
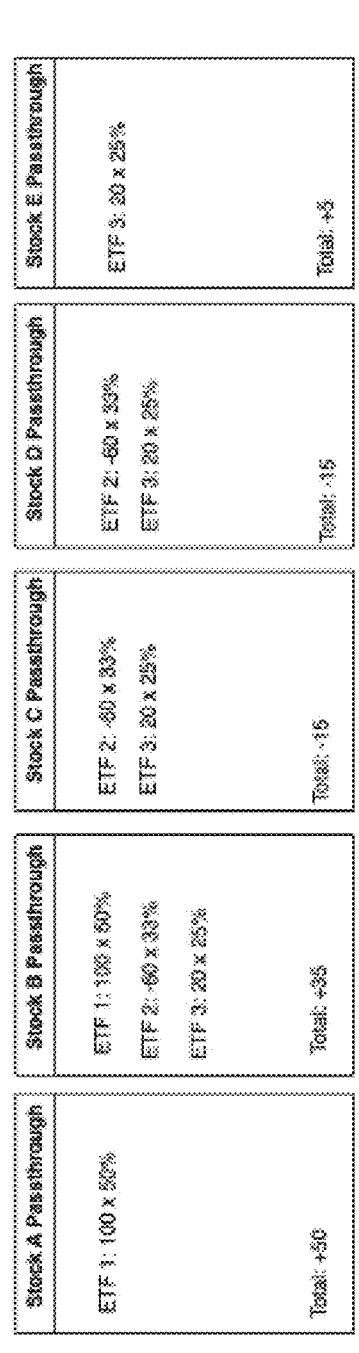
Figure 7B:
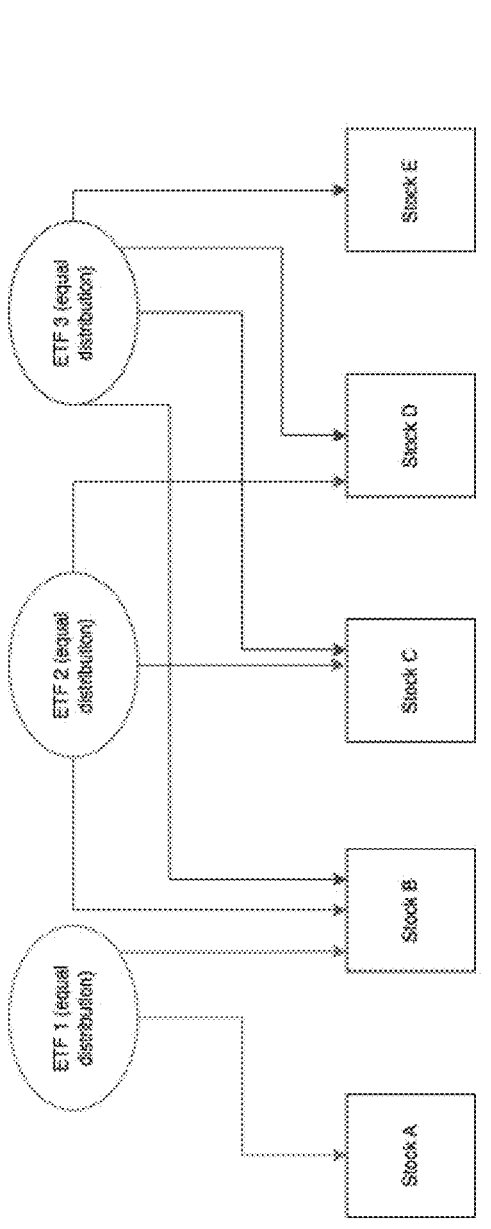
FIG. 7B shows a non-limiting example of a simplified algorithm diagram; in this case, an algorithm implementing a simple function for calculating pass through flow.
Figure 7B:
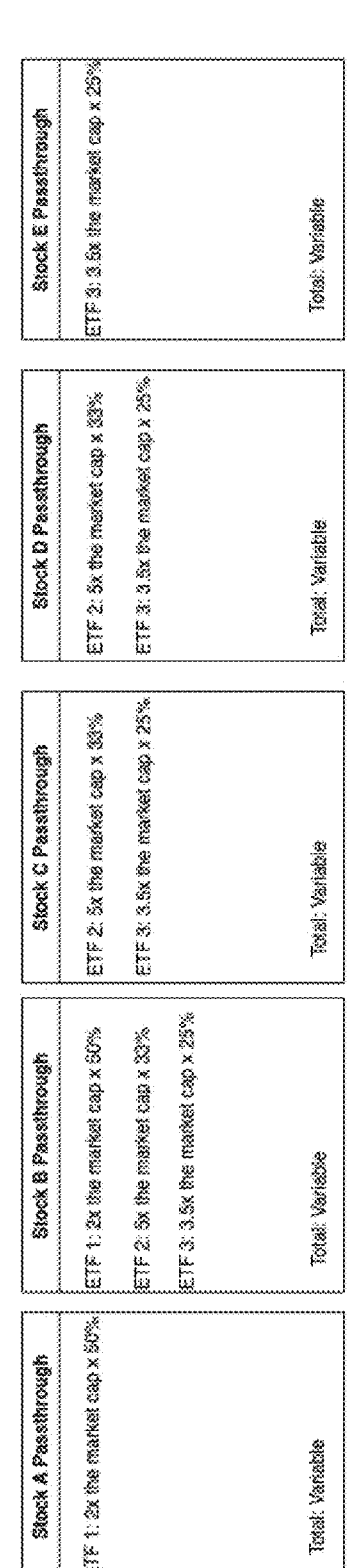

In some embodiments, the platforms, systems, media, and methods described herein, automate the calculation of "pass through flows" from ETFs and or ETF related service providers (parents) down to assets (children), and vice versa (asset to ETF). In some embodiments, the platforms, systems, media, and methods described herein, automate the calculation of "pass through flows" from Secondary Markets to Primary Markets, and vice versa (Primary Markets to Secondary Markets). In some embodiments, an algorithm is configured to enable a multi-dimensional representation of a network's evolution and "perform pass through" calculations. FIG. 7A, illustrates a non-limiting example of a simplistic pass through calculation comprising "passing through" an integer input. FIG. 7B, illustrates a non-limiting simplified example of a pass through algorithm performing calculation comprising "passing through" a function input. It will be clear to one of ordinary skill in the art that these calculations become complex and currently require a prohibitive amount of time and computing power to perform these at scale utilizing other technologies. In some embodiments, "pass though flows" may include but is not limited to passing through, information flows, capital flows, fund flows, flow of orders or changes to existing or latent order books, flow of consolidated trades and quotes, flow of price improvement or trade execution information, flow of distributions/dividends or equivalent yield information, flow of criteria determining qualified dividend income related information, flow of payments for order flow, flow of dark pool, hidden, or odd lot transactional information, flow of tax liability or tax related information, flow of proxy or shareholder votes, or any other flow of information or data between two or more of indices, ETFs, assets, Primary Markets, Secondary Markets, market makers, exchanges, market participants, authorized participants, or the like.

or any other flow of information or data between two or more of indices, ETFs, assets, Primary Markets, Secondary Markets, market maker, market participants, authorized participants, or the like.

In some embodiments, the pass through algorithm leverages the combination of ownership information (which describe the holdings of all ETFs), as well as time series data for both classes of nodes. The pass through algorithm may be configured to allow a user to pass through any variable or function from the ETF level (parent) down to the underlying holdings (children), in both directions.

Figure 7C:
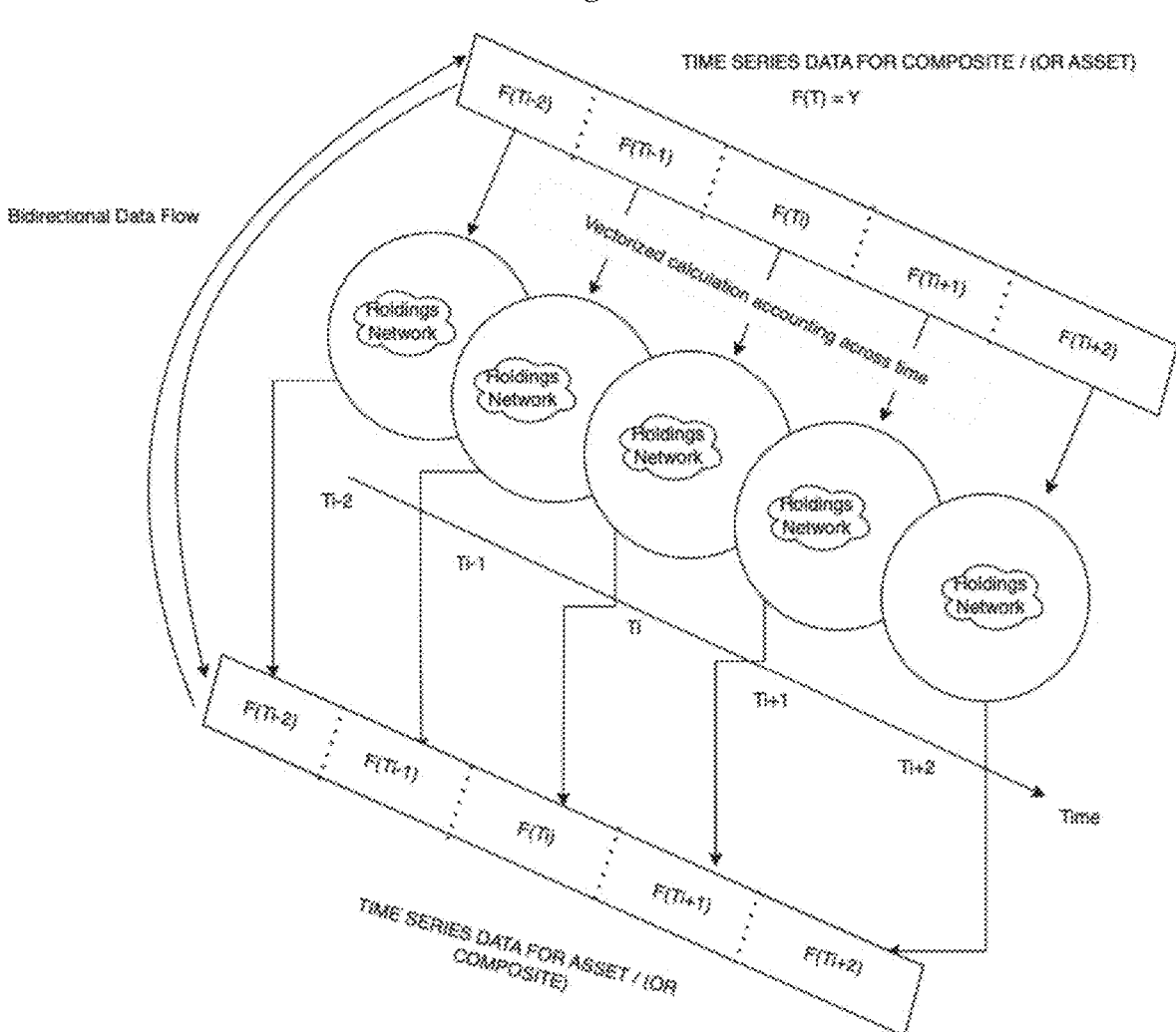
FIG. 7C shows a non-limiting example of a schematic process diagram; in this case, a process of "passing through" time series data through historical relationship graphs leveraging vectorized calculation code to captures both absolute and relative values.
Figure 8:
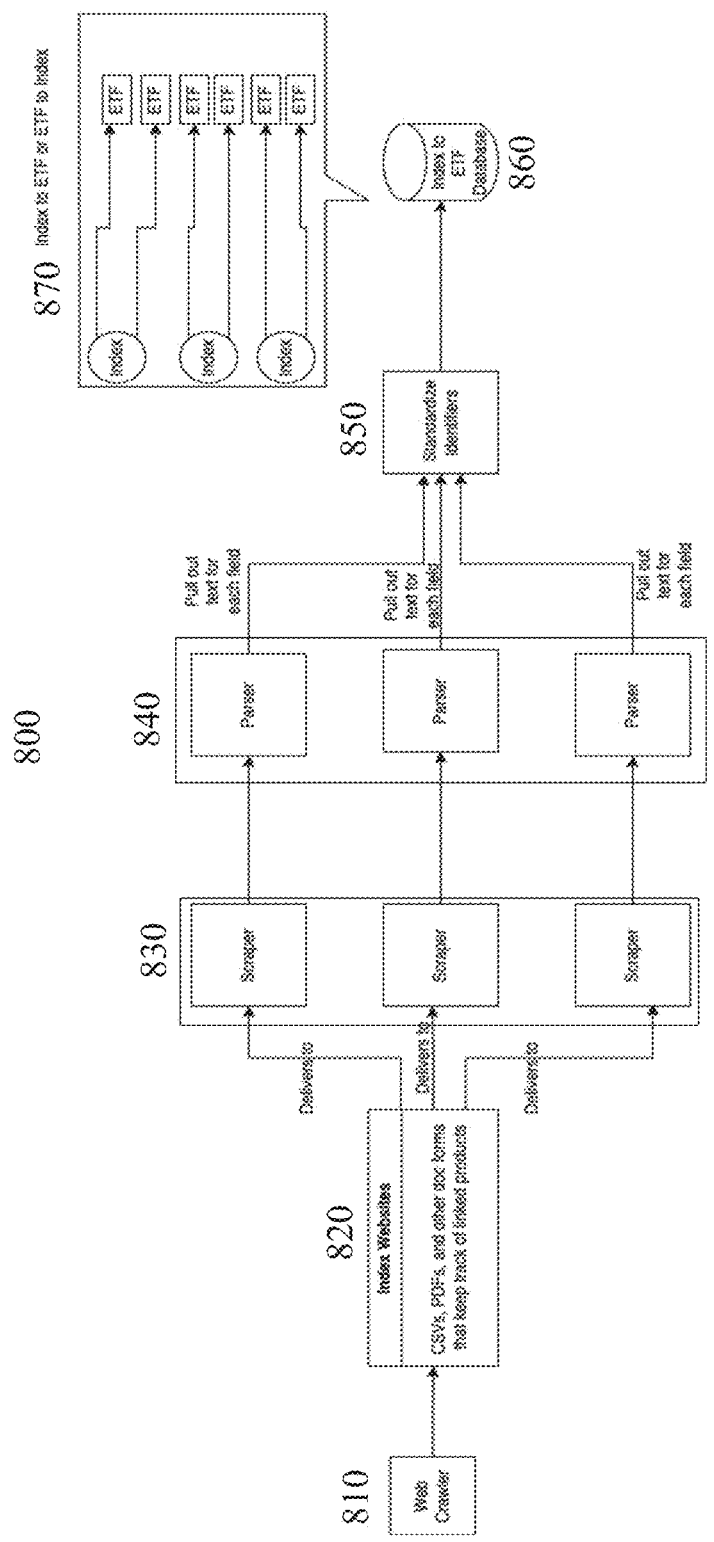
FIG. 8 shows a non-limiting example of an architecture diagram; in this case, an architecture of a system configured crawling, scraping, parsing, and aggregating indices and ETFs that track them into one database.

In some embodiments, per FIG. 7C, the pass through algorithm leverages vectorized and highly efficient parallel computing techniques, which enables functions too complicated, expensive, and difficult to be evaluated with legacy infrastructures to be calculated in a time and resource efficient manner. In some further embodiments the algorithm "passes through" time series data through historical relationship graphs. In some embodiments, the platforms, systems, media, and methods described herein, utilize multidimensional storage, which captures both absolute and relative values and leverages vectorized code to process a computation and memory expensive exercise at scale.

In some embodiments, the pass through algorithm leverages the combination of creation/redemption information in the primary market (which describes the shares of an ETF) and or order flow data in the secondary market to create pass through statistics describing states of both markets for an Authorized Participant of an ETF or combination of Authorized Participants of an ETF. This process can be configured for multiple Authorized Participants of multiple ETFs across multiple exchanges as well. This process can be configured to aggregate the states of many Authorized Participants into one variable and used to measure and model synthetic risk across participants in both primary and secondary markets.

In view of the disclosure herein, passive data may include information related market data, ownership data, index data, event data, historical announcements, relationship data, and transaction data of ETFs and the like.

Flow of Information Between Index Providers and ETF Issuers

In some embodiments, the platforms, systems, media, and methods disclosed herein, creates an information flow 414, in order allow a market participant to search an index and see all the ETFs (and related service providers) that are tracking the index.

Currently, it is difficult for a market participant to search for any given index and see all the ETFs tracking that index. The process to search for the ETFs that are tracking an index must be performed manually, and the information available depends on the index. Further, all of the information is fragmented and hard to locate, and the current infrastructure makes it difficult the ability to accurately identify an individual across the multiple information sources. This is because, some websites use company names, some websites use stock tickers, some websites use CUSIP identifiers, etc. This inconsistent and dissociated flow of information makes it nearly impossible to link the related, source data across the Index/ETF sources.

In some embodiments, the platforms, systems, media, and methods disclosed herein, compress and simplify the workflow described above, for a market participant to see all the ETFs that track a particular index and create a flow of information 414 between indices and ETFs. In Some embodiments, the platforms, systems, media, and methods described herein, leverage a web scraping and cleaning method which amalgamates indices and ETF data and synthesizes the data into one queryable look up table for an investor to search by an index and identify ETFs which link back to the index.

Figure 9:
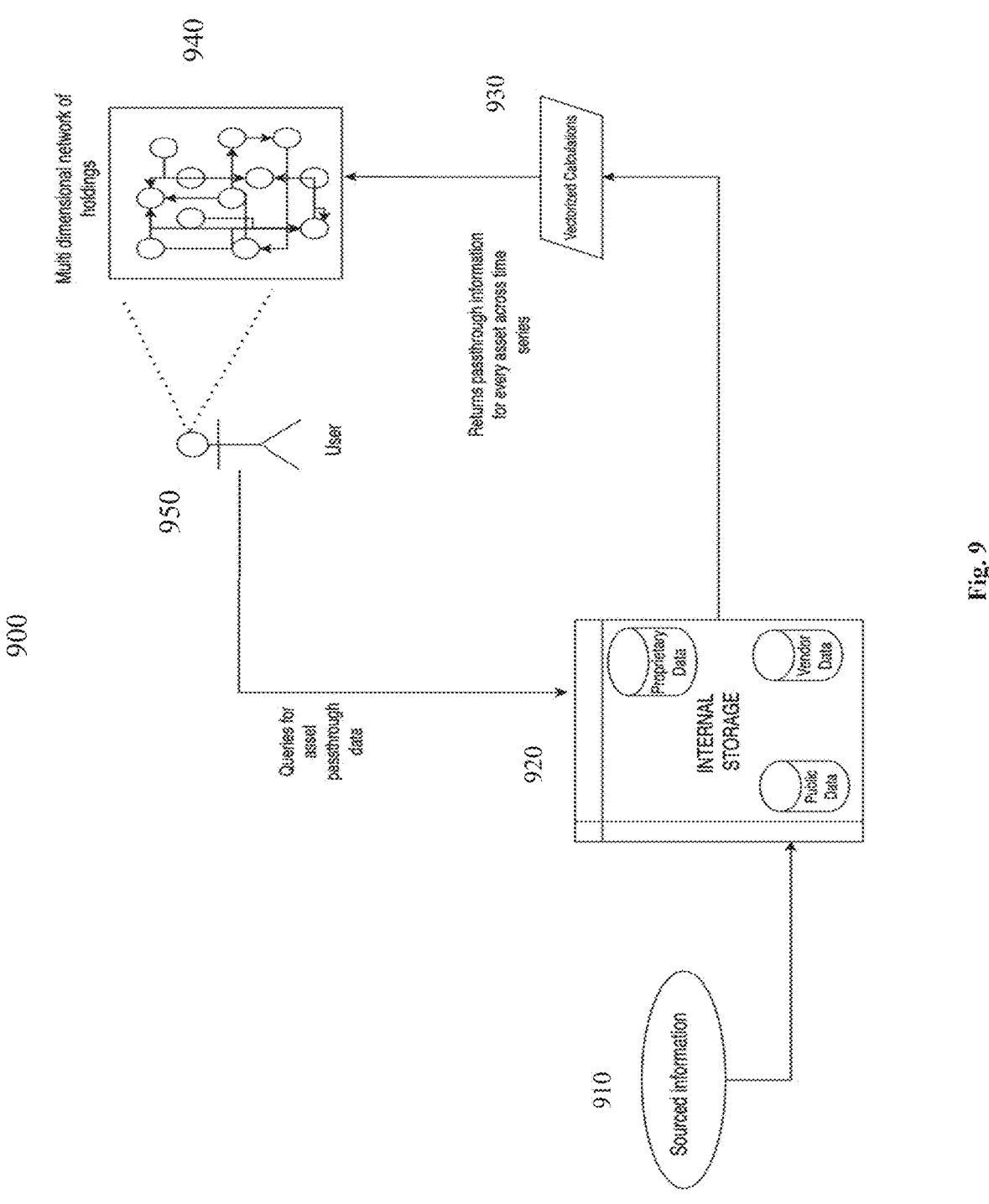
FIG. 9 shows a non-limiting example of an architecture diagram; in this case, an architecture diagram illustrating a system for generating a framework and analytics layer for a market participant to query, view, navigate, and analyze financial market information and analyze risk and passive market activity.

Referring to FIG. 9, in some embodiments, the platforms, systems, comprise, and the methods utilize, a high level process schematic of a multi-dimensional data fabric 900 comprising: a source 910 of aggregated financial information and retrieved by the platforms, systems, medias and methods described herein; an internal storge unit 920 comprising; one or more databases 922, 924, 926, 928 wherein the databases comprise passive market data and relationship mapping between assets, indices and ETFs; an analysis module 930 configured to run an algorithm to generate a framework and analytics layer 950 for a market participant 960 to view financial markets and analyze risk and passive stock market activity. In some embodiments the framework and analytics layer 950 leverages a page-rank like algorithm to offer operational and actionable insight which can be personalized to any portfolio or universe set. It will be obvious to one of ordinary skill in the art, the elements, functions, processes, and steps described above may be used in combination with each other. In some embodiments, one or more elements can be added excluded or repeated.

In some embodiments, index data comprises, ETF data, mutual fund data, foreign fund data, or a combination thereof. Data of other similar type funds may be used and included.

It is noted that ETFs are used as a non-limiting example for the use of the platforms, systems, media, and methods disclosed herein. In some embodiments, the platforms, systems, media, and methods disclosed herein, are configured to utilize, and provide passive market transparency for the ETFs and ETF data. In some embodiments, ETFs comprise exchange-traded funds, mutual funds, foreign fund data, or a combination thereof. Other similar funds may be used and included.

ETF Ecosystem

Figure 13A:
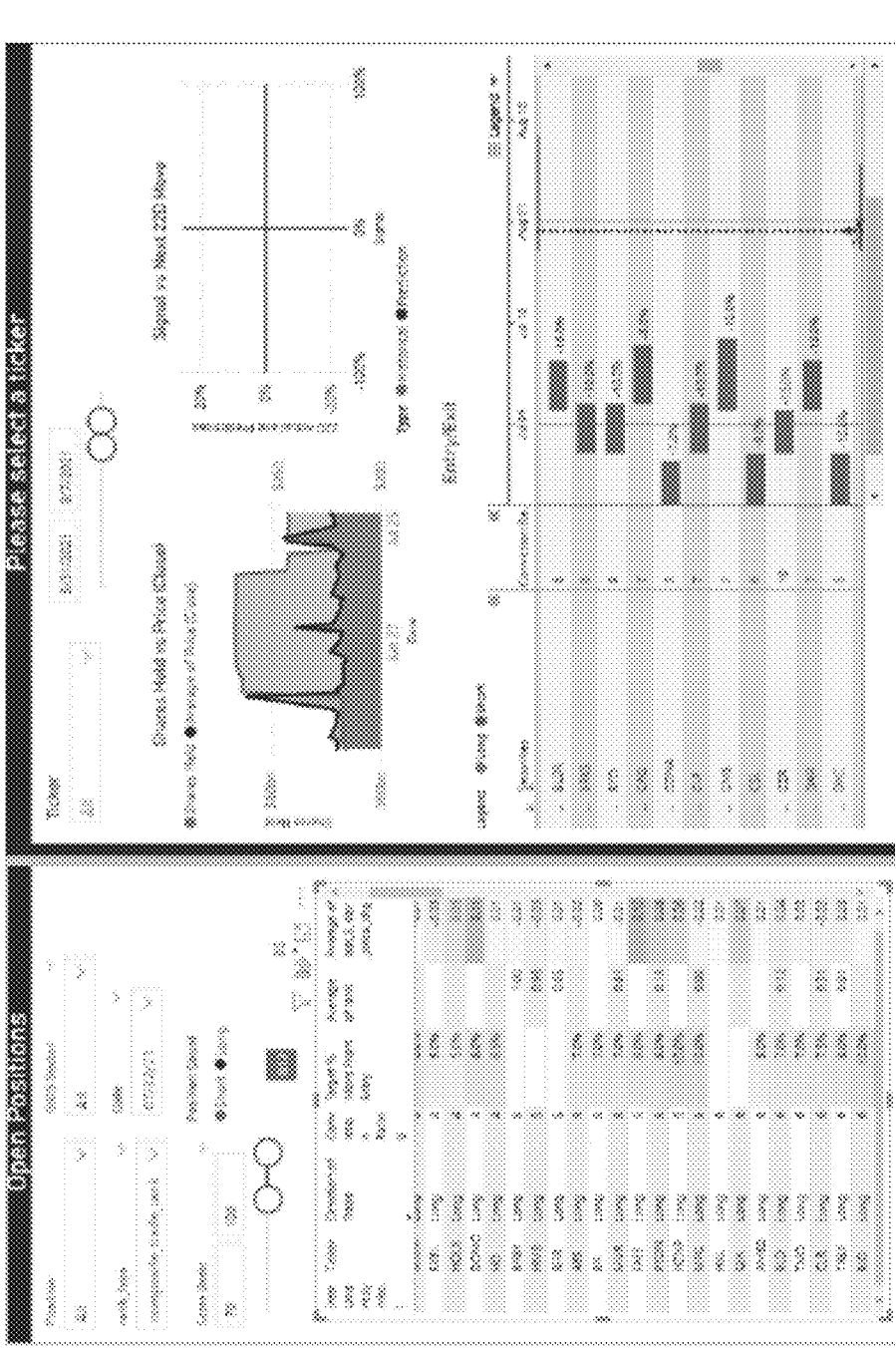
FIGS. 13A-13P show non-limiting examples of interfaces of a said platform as described herein; in this case, GUIs for non-limiting embodiments of a passive market transparency platform.
Figure 13B:
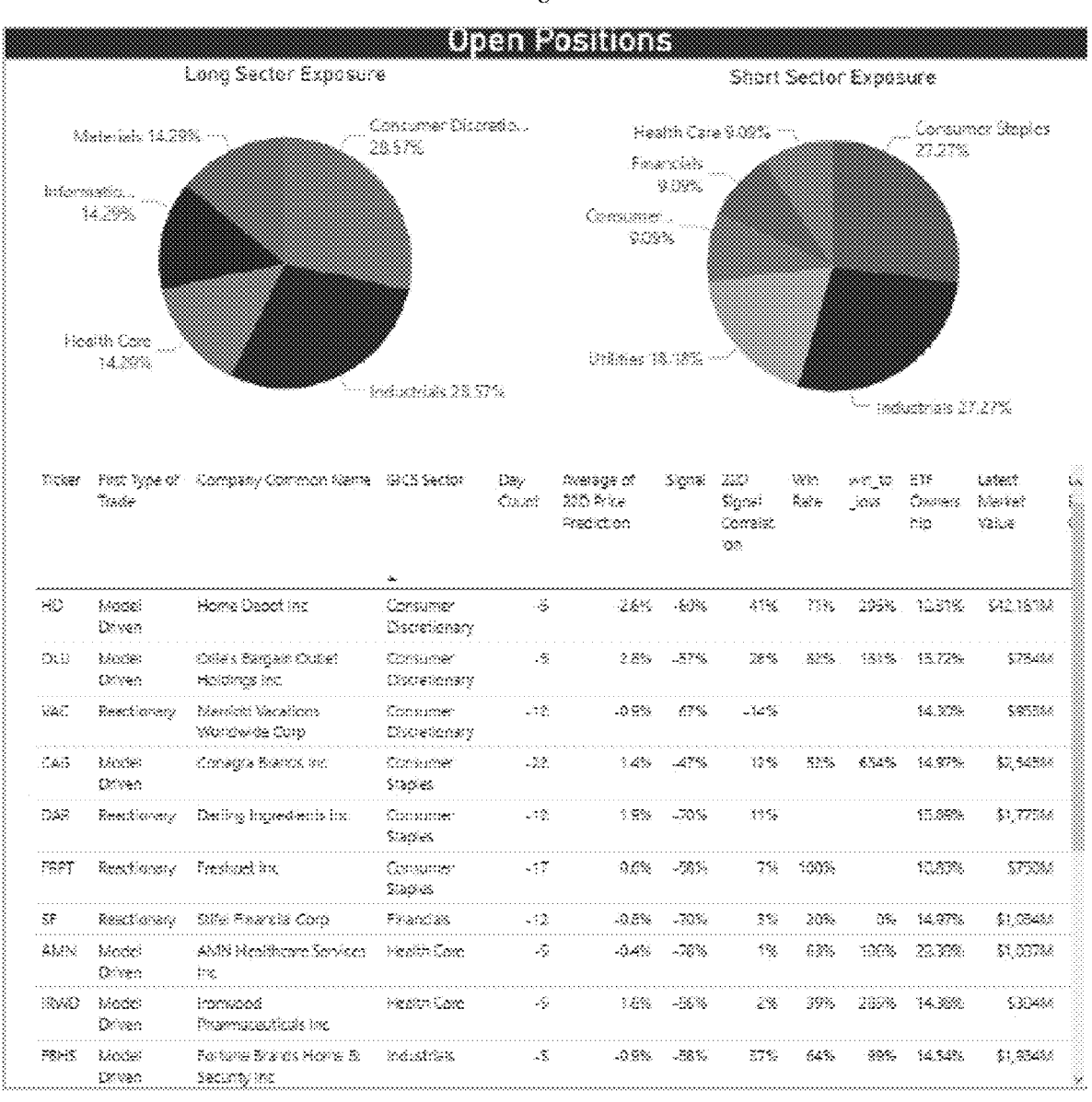
FIG. 13Q shows a non-limiting example of various service providers which take part in an ETF ecosystem.
Figure 13C:
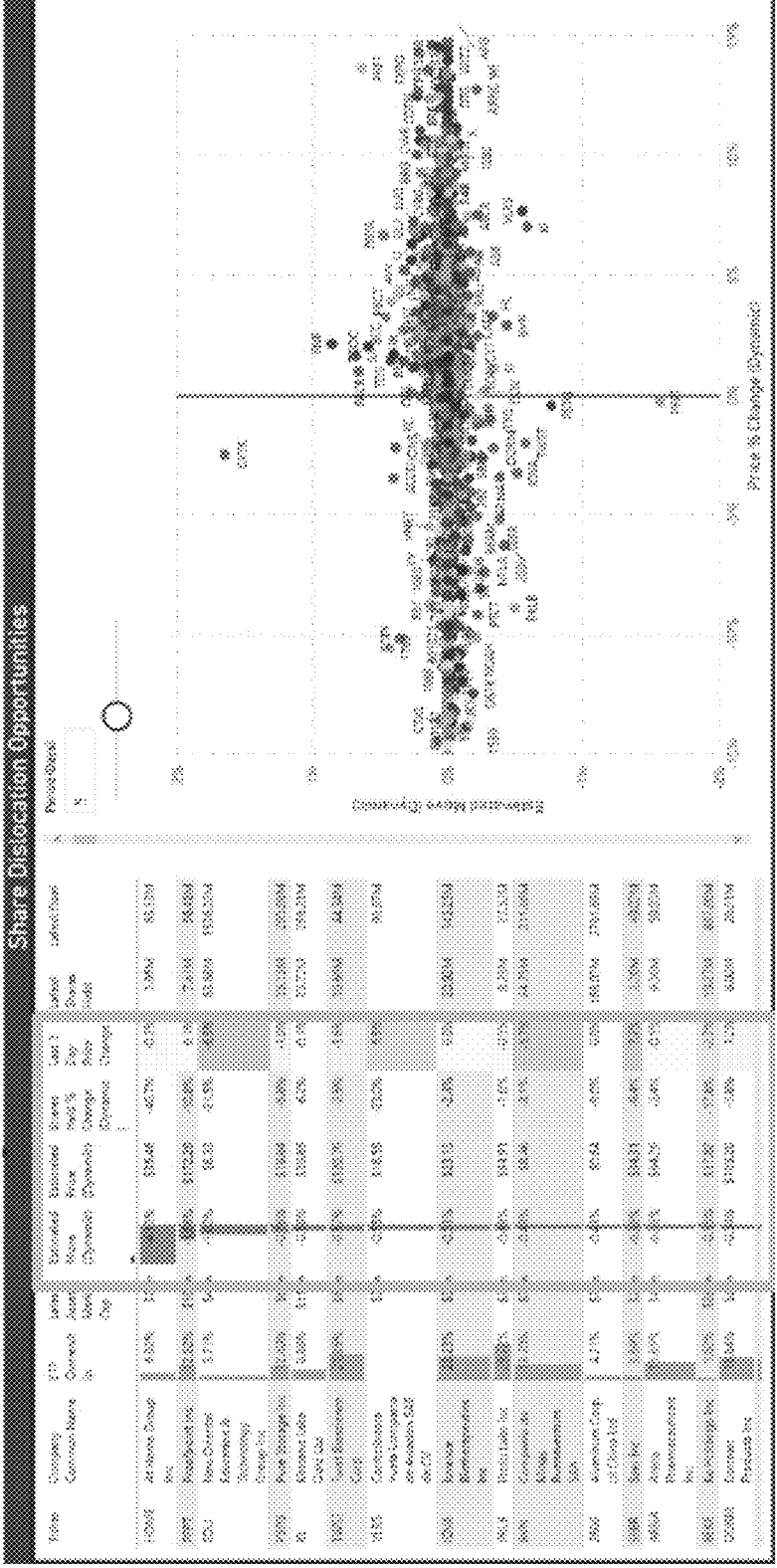
Figure 13D:
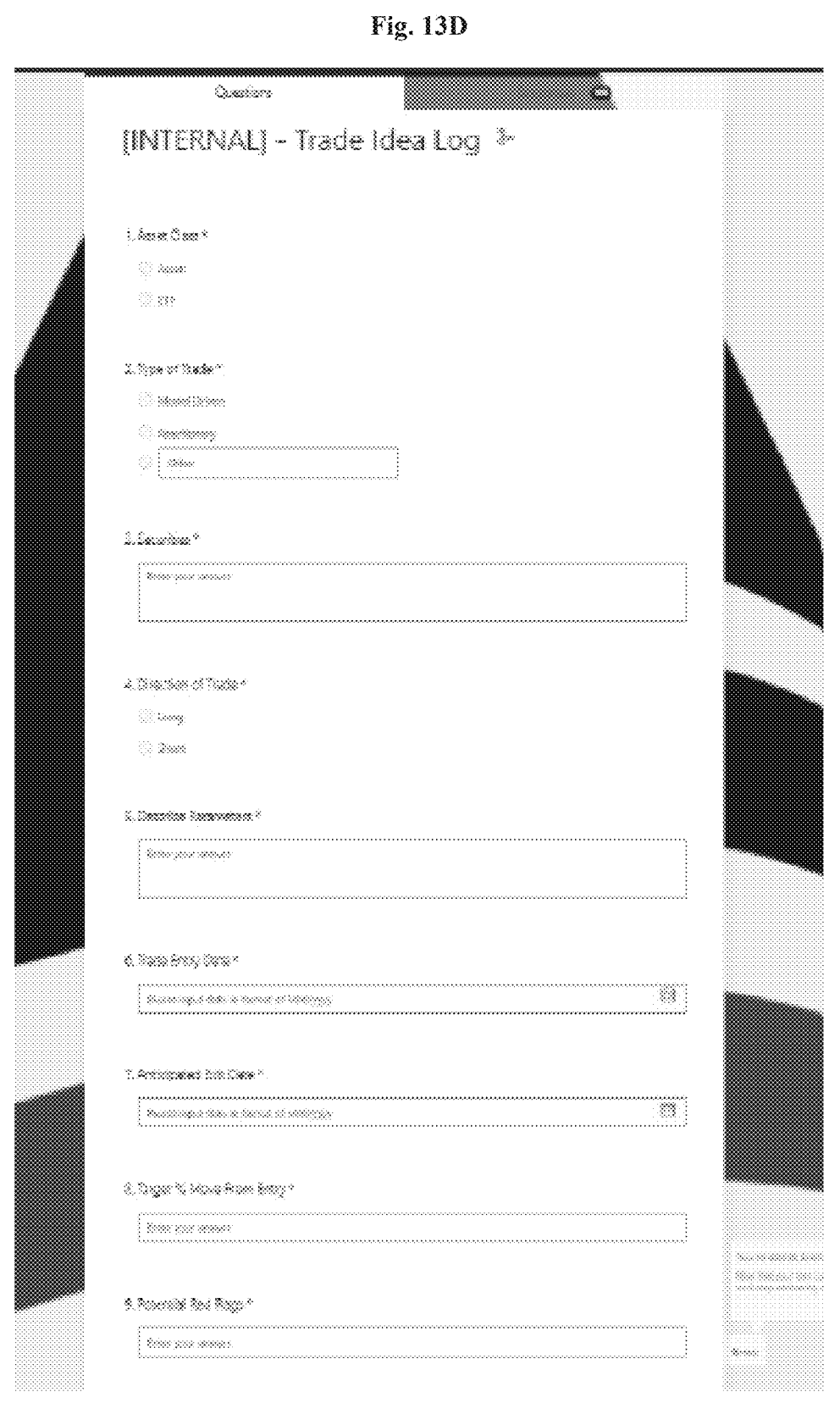
Figure 13E:
Figure 13G:
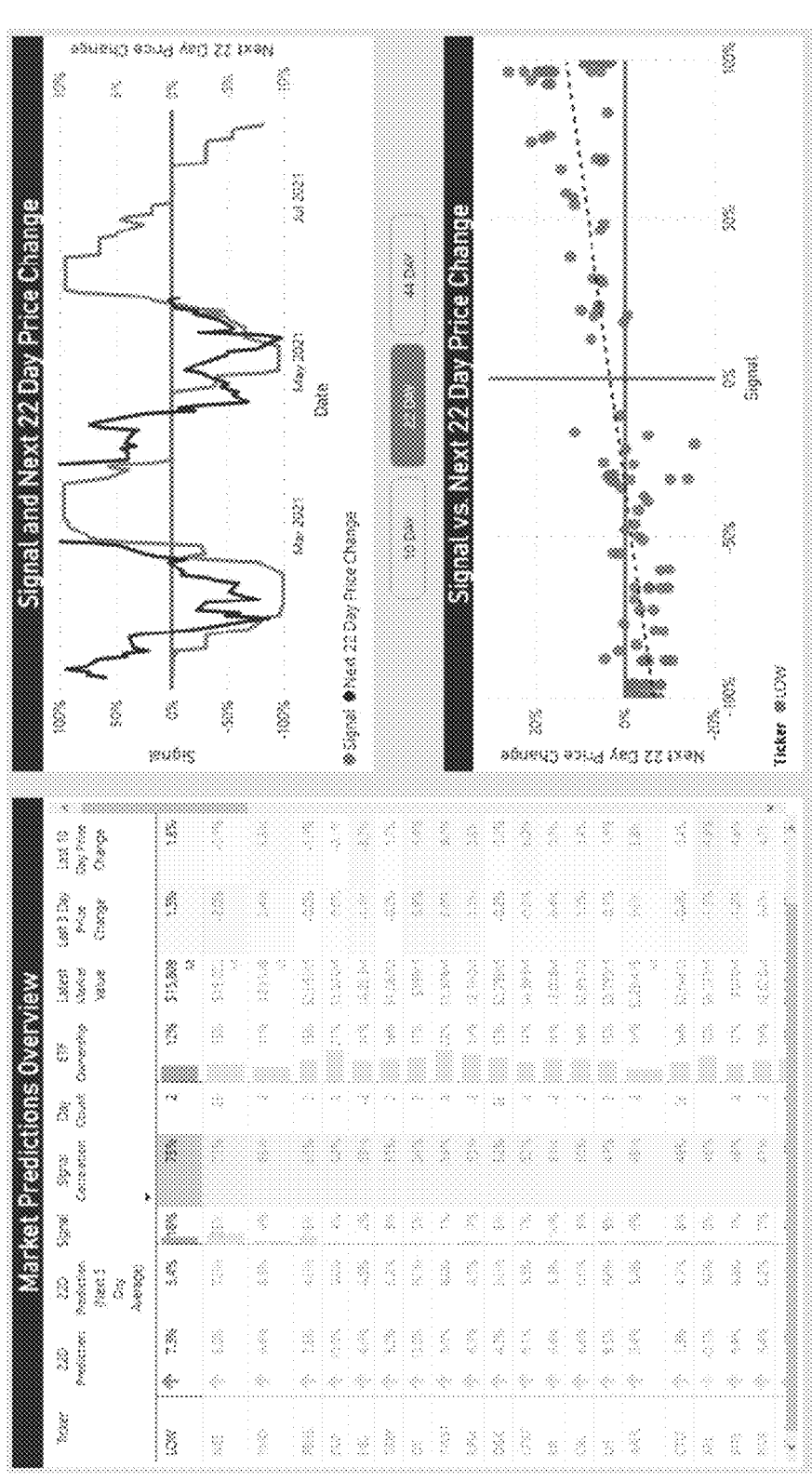
Figure 13H:
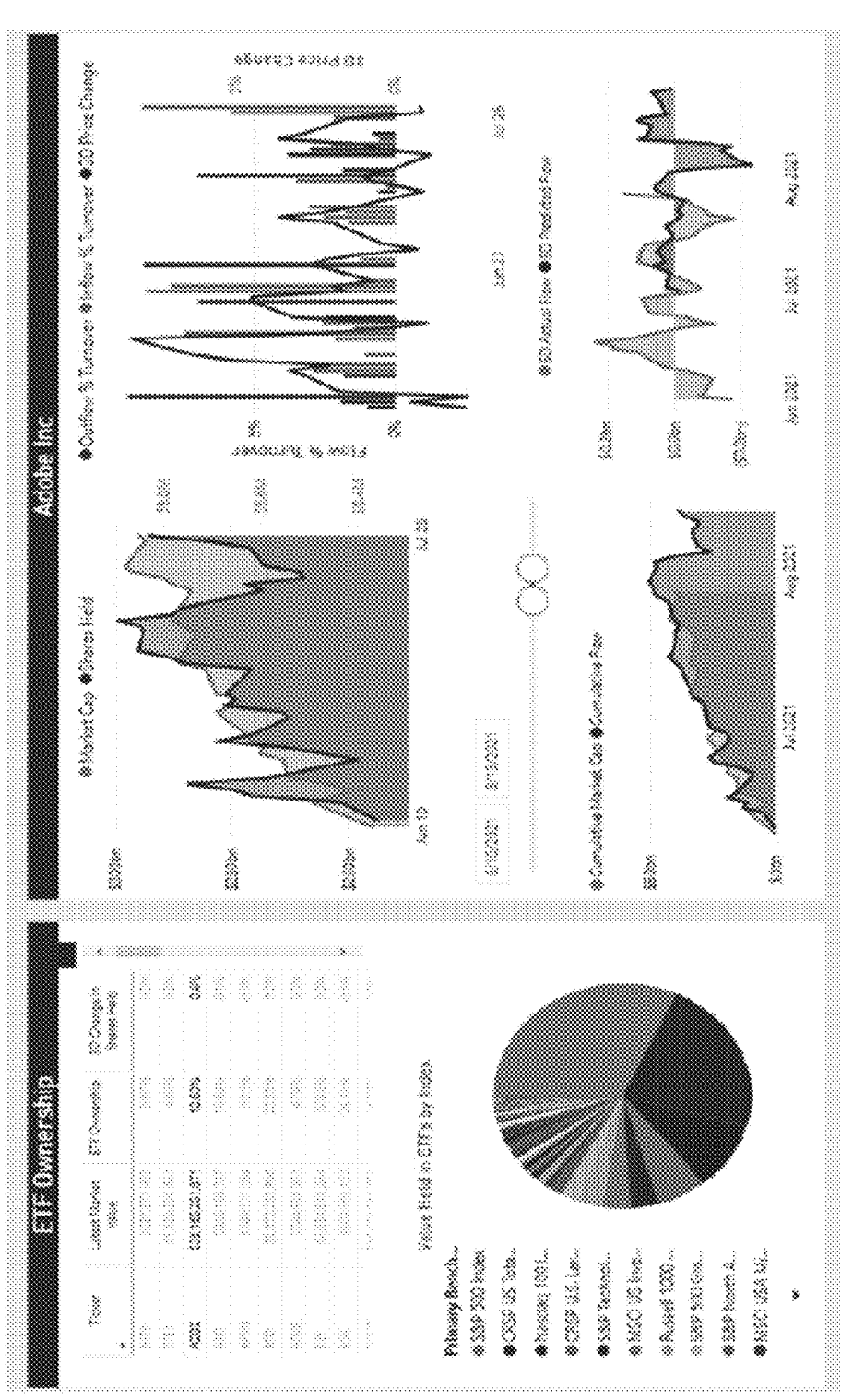
Figure 13I:
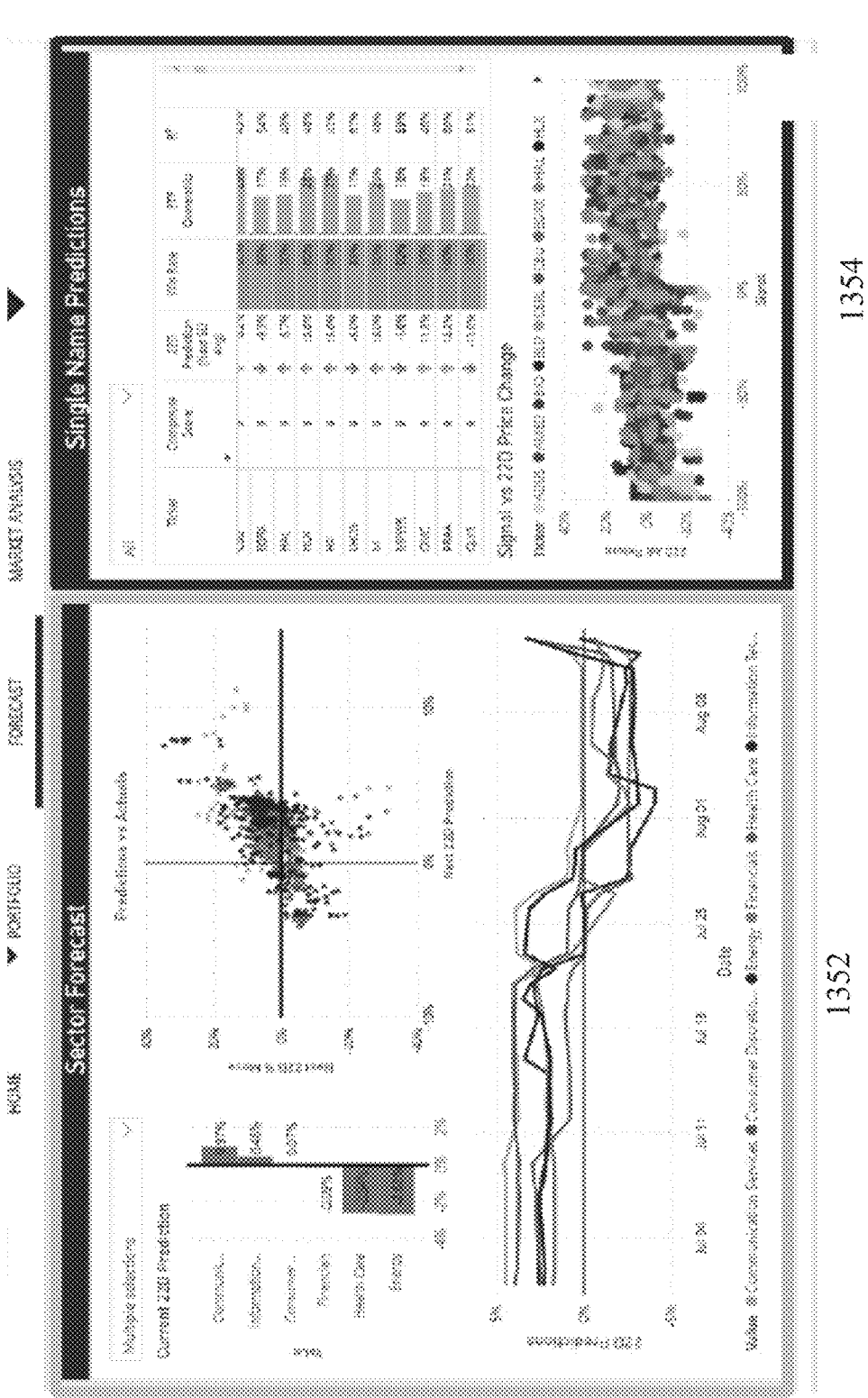
Figure 13J:
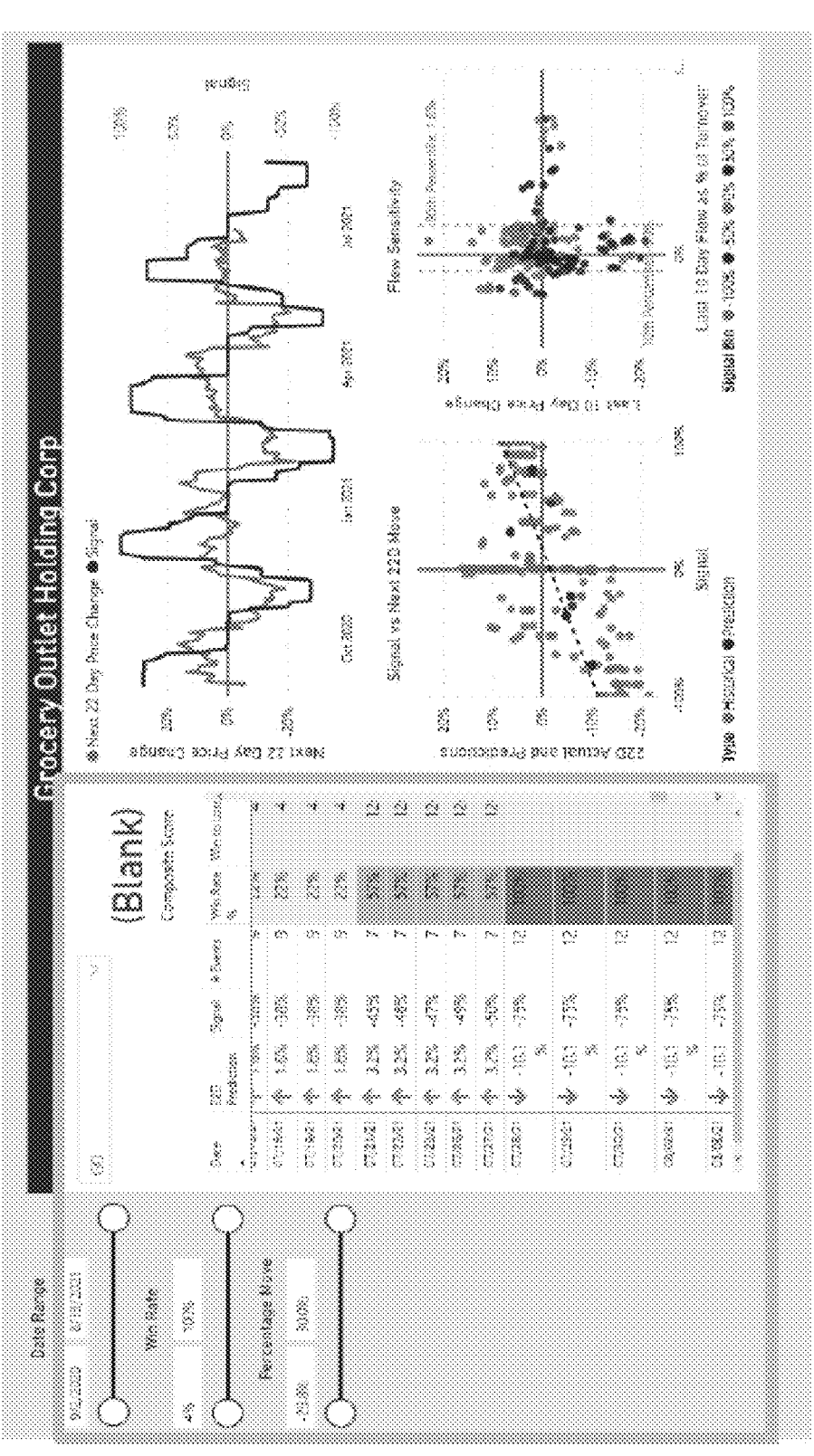
Figure 13K:
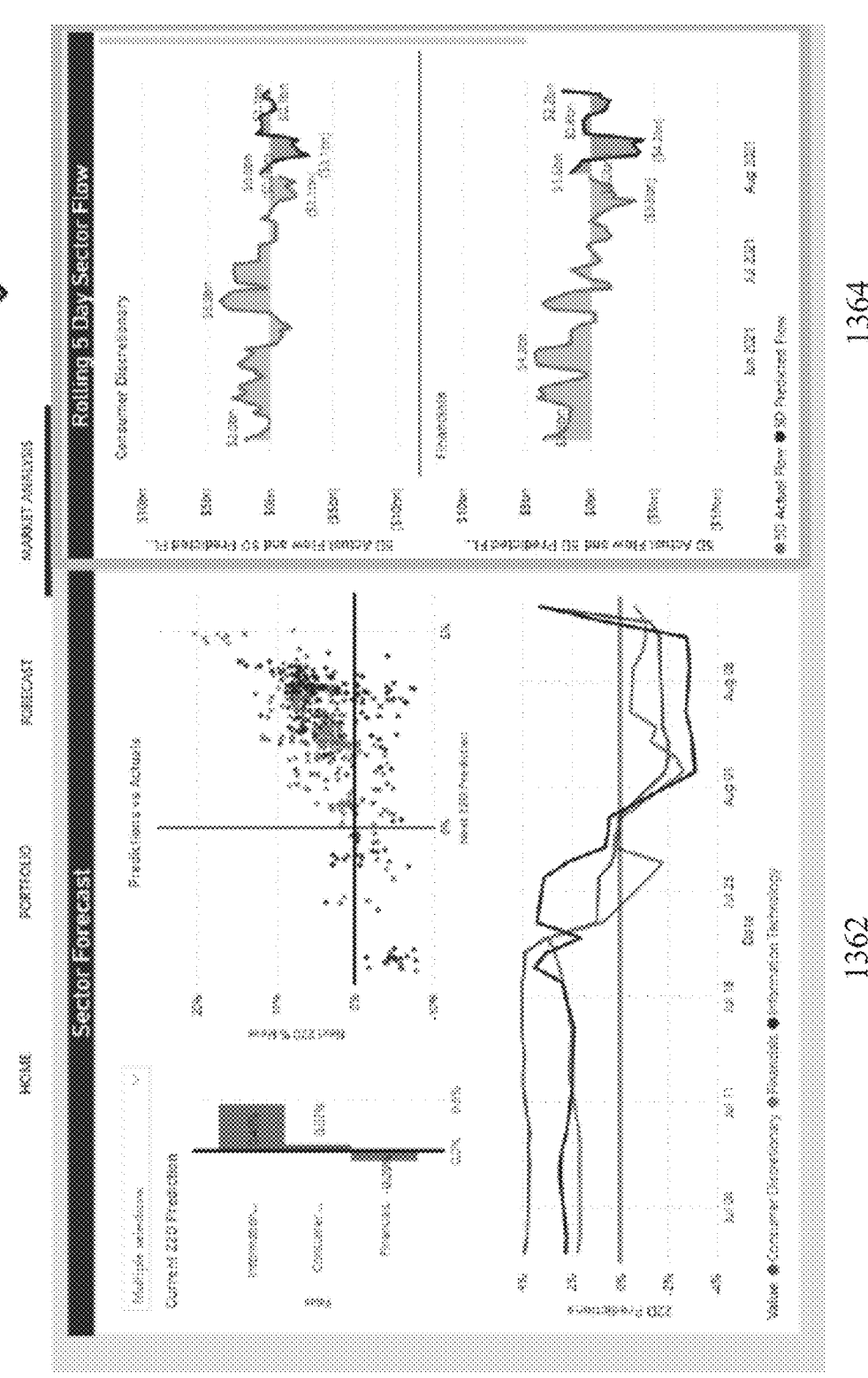
Figure 13L:
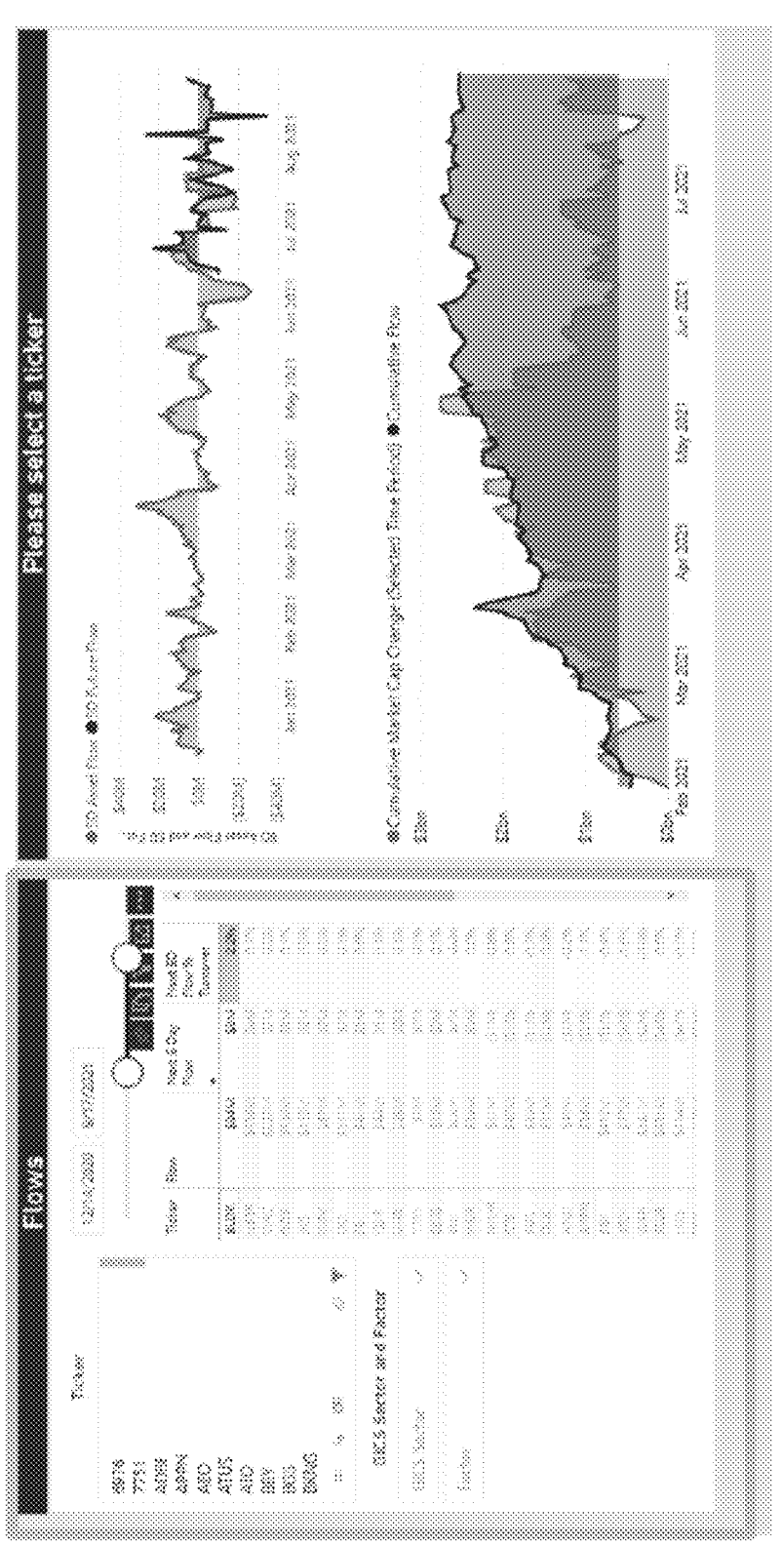
Figure 13M:
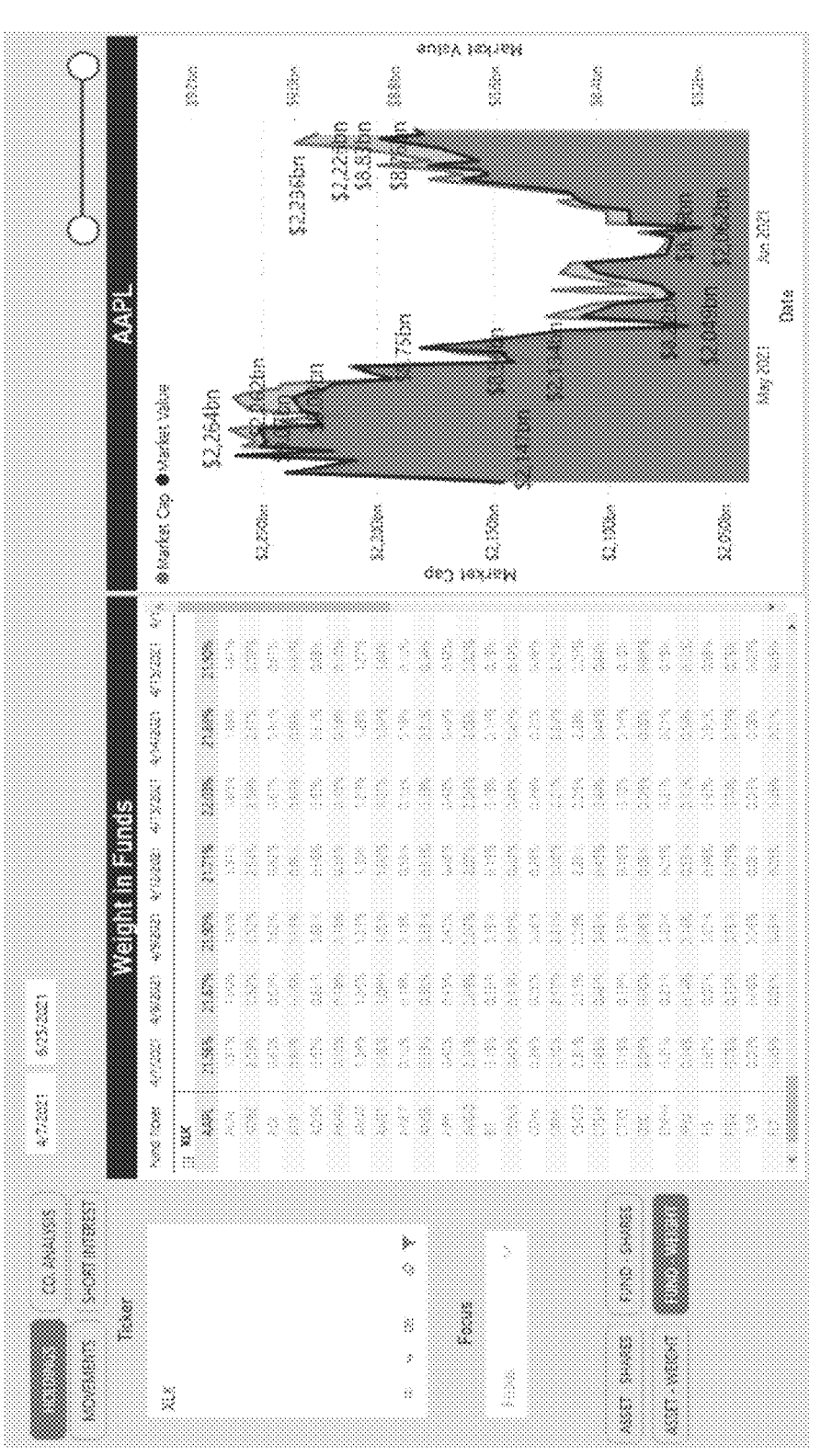
Figure 13N:
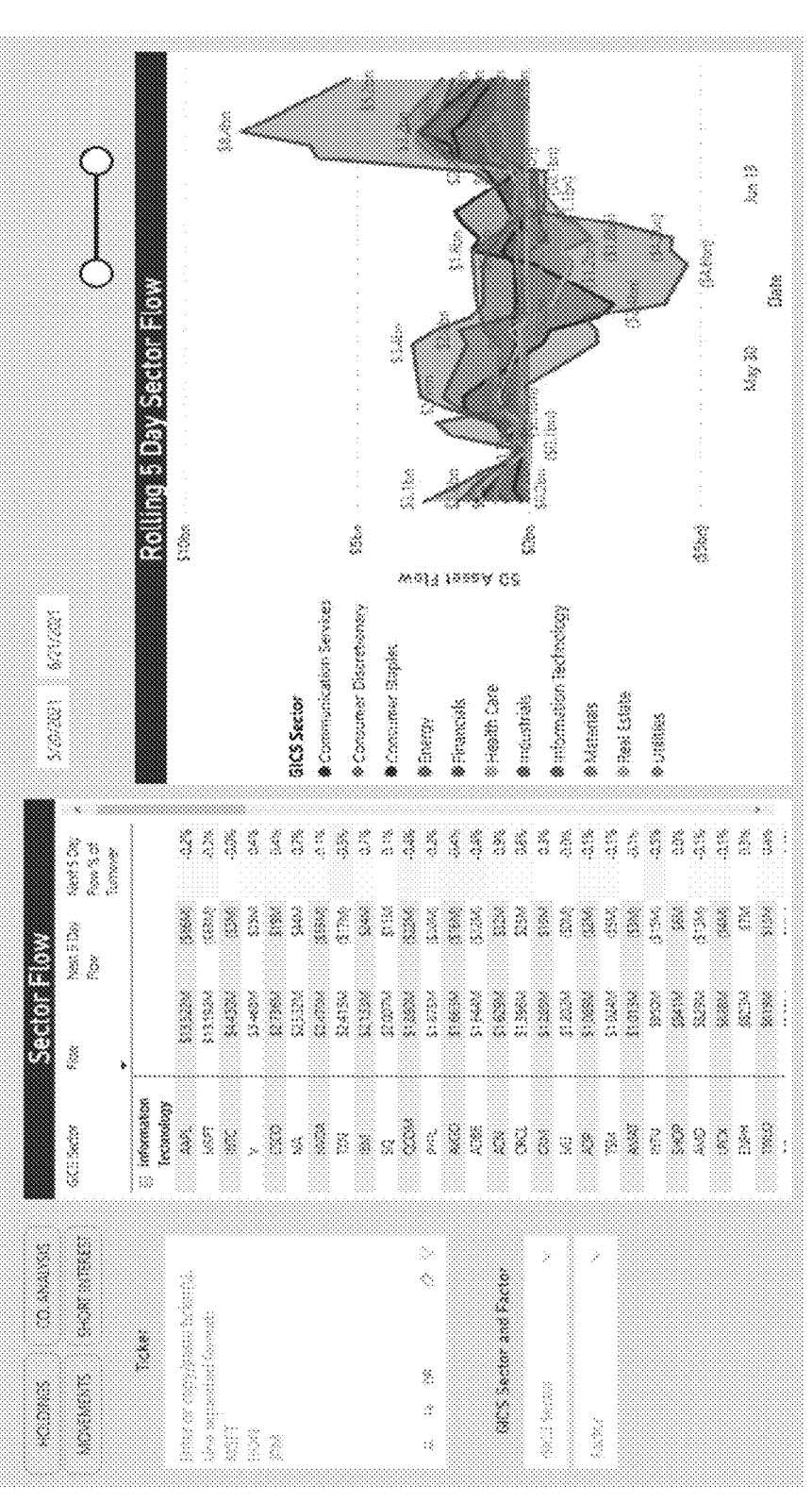
Figure 13O:
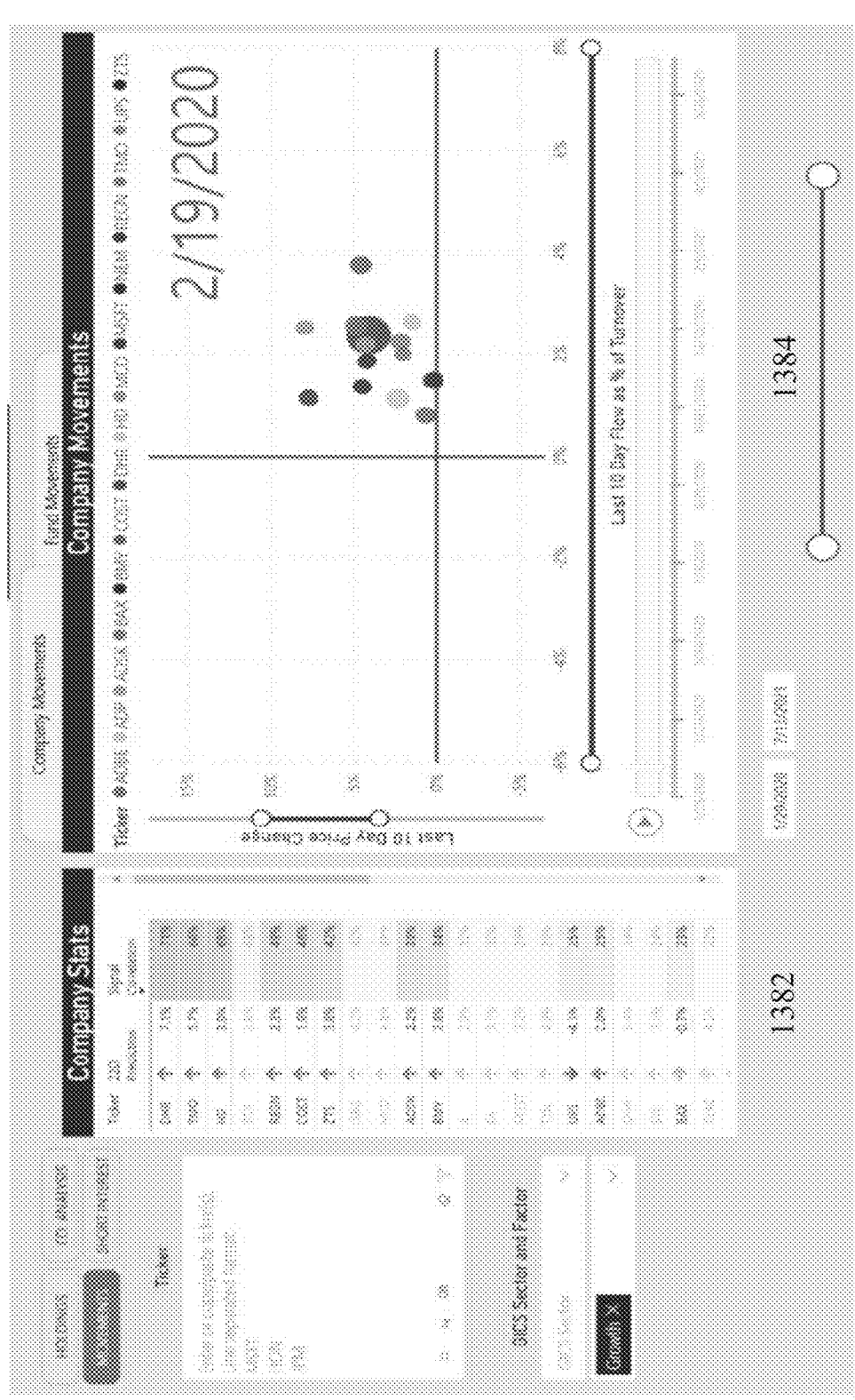
Figure 13P:
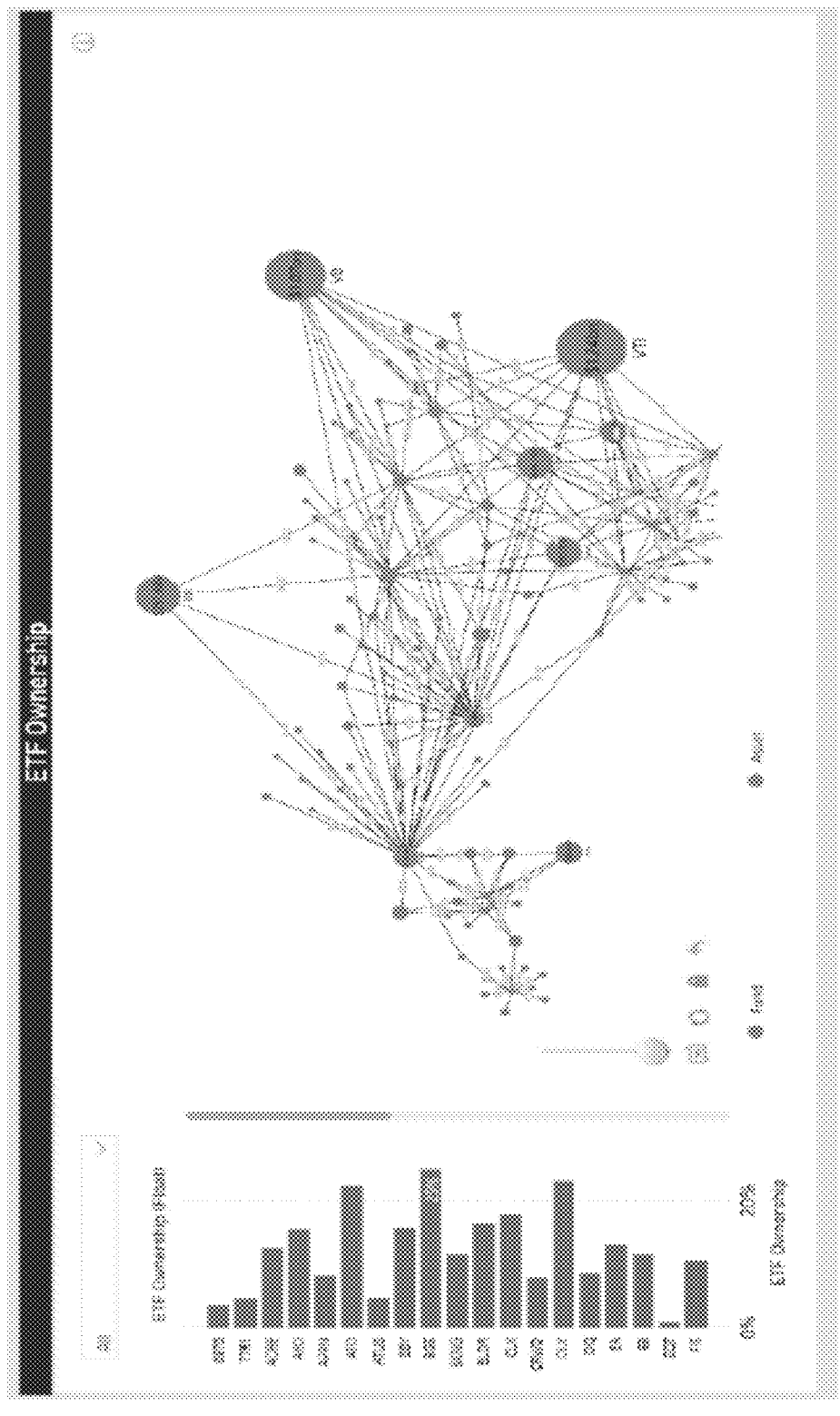
Figure 13Q:
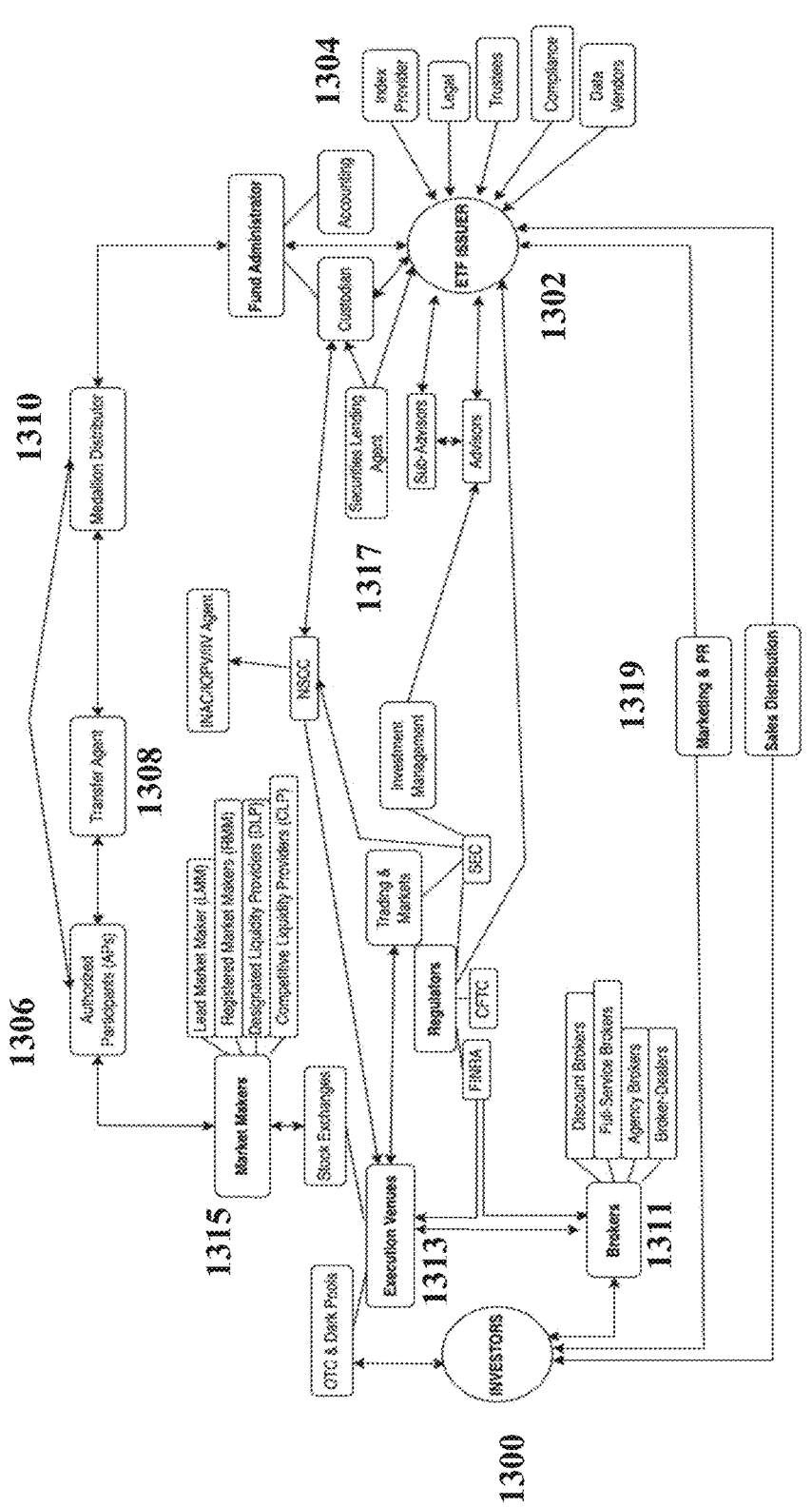

In some embodiments, the platforms, systems, media, and methods disclosed herein, creates a database providing a centralized picture of the ecosystem surrounding an ETF as described in FIG. 13Q. Currently, it is difficult for a market participant to search for any given ETF and understand all the relationships that are maintained in order for an ETF to function and be accessible to investors. As highlighted in the diagram, these buttressing service providers range from aforementioned index providers, other entities (e.g., exchanges), regulatory bodies, other institutions, other individuals whether employed by the same company or not (e.g., Authorized Participants) to other internal teams (e.g., Legal, Compliance), to other firms (e.g., accounting). While this is intended to be a non-limiting example, it gives an idea of the scope of the network which investors are typically blind to when buying an ETF. First, note the Index Provider 1304 who provides the day-to-day map of constituents for the ETF based off the index. The Authorized Participants 1306 engages with Market Makers 1315 in a two-sided interaction wherein the Authorized Participant transacts extra shares to the market through market participants while engaging in creation and redemption through a Transfer Agent 1308. This process also involves a Medallion Distributor 1310 who facilitates interactions between the trust, transfer agent, and the authorized participant in a type of regulatory oversight role. Another area of note is the Securities Lending Agent 1317 who manages the lending of underlying securities in the ETF basket. This lending activity generates revenue and is a profitable action typically. For the typical Retail Investors 1300, many really are only aware of Marketing & Public Relations 1319 which, if effective enough, inspires transacting of shares through Brokers 1311 who do so on Execution Venues 1313. As one can see, there are plenty of nodes throughout the transmission of an ETF share from investor to issuer (or vice versa) in which there might be relationships worth noting. Thus, a first database detailing this network compresses and simplifies the workflow for any market participant seeking to understand the conflicts of interest another market participant maintains when marketing or selling an ETF.

In some embodiments, the platforms, systems, media, and methods disclosed herein the various relationships of the ecosystem can be utilized by the pass through algorithm to pass through certain variables describing certain states of the nodes to other nodes.

Aggregating Data

In some embodiments, the platforms, systems, media, and methods disclosed herein, aggregate index data for a plurality of indices. In some embodiments, the index data comprises one or more aspects of an index profile, one or more aspects of an index history, one or more aspects of an index event, or a combination thereof. In some embodiments the index data is aggerated by utilizing crawler modules 610 configured to cycle across various webpages 620, website, databases, documents, and/or other information sources, to find relevant links for information and data related to assets, indices and ETFs, wherein one or more selector modules 630, select and groups links, from the webpages and documents identified by the crawlers, related to a desired subject or category (e.g., methodology, fact sheets, rebalance, announcements, index tracker, etc.), wherein a parser module 640, analyzes and extracts financial information text and data related to the subject or categories. In some embodiments, the parsed information text and data can be cleaned and organized by a clean module 650.

In some embodiments, the platforms, systems, media, and methods disclosed herein, aggregate ETF data and index data are aggerated by utilizing crawler modules 810 configured to search various website 820, databases, and/or other information source to find information and files, (e.g., CSVs, PDFs, and other documents and forms used for linked products), wherein one or more scraper modules 830, extract relevant links, texts, and data, from the webpages, documents, and other sources identified by the crawlers, wherein a parser module 840, breakdown, analyze and organize the extracted links, texts, and data. In some embodiments, the combined and cleaned text and data is used to generate a database 860. In some embodiments, the parsed information text and data can be standardized by a standardize module 850. In some embodiments the standardized data before it is aggregated and synthesized into a database 860. In some embodiments the crawler modules are configured to perform targeted crawling within one or more selected website, databases, and/or other information sources.

It is noted that ETFs are used as a non-limiting example for the use of the platforms, systems, media, and methods disclosed herein. In some embodiments, the platforms, systems, media, and methods disclosed herein, are configured to utilize, and provide passive market transparency for the ETFs and ETF data. In some embodiments, ETFs comprise exchange-traded funds, mutual funds, foreign funds, or a combination thereof. Other similar funds may be used and included.

First Database

In some embodiments, the platforms, systems, and the methods are configured to generate a first database. In some embodiments the database comprises index data for one or more indices. In some embodiments, the first database comprises aggregated and cleaned index data for a plurality of indices. In some embodiments, the index data comprises one or more aspects of an index profile, one or more aspects of an index history, one or more aspects of an index event, or a combination thereof. In some embodiments the database comprises ETF data for one or more ETFs. In some embodiments, the first database comprises aggregated and cleaned ETF data for a plurality of ETFs. In some embodiments, the ETF data comprises one or more of ETF ownership data, ETF relationship data, associated ETF service provider data, or a combination thereof, for the plurality of ETFs. In some embodiments, ETF data includes data related to the surrounding infrastructure (e.g., Authorized Participants (AP), market makers, creation/redemption data, AP buying/selling data, etc.). In some embodiments, the database comprises fundamentals data of various ETFs or assets. In some embodiments, the database comprises information regarding an ETFs ecosystem of service providers. In some embodiments, the database comprises at least an information table and/or an event table. In some embodiments the information table comprises rebalance data and announcement data. In some embodiments, the information table comprises methodology data and fact sheet data. In some embodiments, the database is searchable. In some embodiments the search query can be for one or more assets and/or one or more ETFs. In some embodiments the database is searchable by one or more aspects of a relationship graph of an asset. In some embodiments the database returns passive market activity data for an asset across global index providers in response to a search query.

It is noted that ETFs are used as a non-limiting example for the use of the platforms, systems, media, and methods disclosed herein. In some embodiments, the platforms, systems, media, and methods disclosed herein, are configured to utilize, and provide passive market transparency for the ETFs and ETF data. In some embodiments, ETFs comprise exchange-traded funds, mutual funds, foreign funds, or a combination thereof. Other similar funds may be used and included.

Relationship Mapping

In some embodiments, the platforms, systems, and the methods disclosed herein, are configured to determine relationships between ETFs (parents) and assets (children). In some embodiments, index tracker data is used to determine relationship data. In some embodiments an algorithm is configured to determine relationship data. In some embodiments, an algorithm is configured to perform "pass through" calculations for one or more ETFs (parents) and one or more assets (children). In some embodiments, the algorithm applies a distributed parallel computing architecture utilizing vectorized calculations over time series data, as illustrated in FIG. 7C, to generate a multi-dimensional representation of relationship graphs including pass through variables between assets (children) and ETFs (parents).

In some embodiments the time series data comprises calendar time series data. In some embodiments, the time series data comprises relative time series data. In some embodiments, the pass through variables comprise pass through flow. In some embodiments the pass through flows are bidirectional. In some embodiments, the pass through flows comprise an integer input, a function, or a combination thereof. In some embodiments, the algorithm is configured to calculate and simulate the impact of multidimensional fund flow as the supply shock (inflow/outflow) propagates through the ownership network. In some further embodiments ownership information describes the holdings of all ETFs. In some embodiments, the algorithm is configured to perform calculations involving bidirectional data flow between an asset and an ETF. In some embodiments the algorithm is automated. In some embodiments the algorithm is a machine leaning algorithm. In some embodiments, one or more users can provide feedback to train the machined leaning algorithm. In some embodiments, "pass through" calculations for one or more ETFs and one or more assets are used to generate relationship data. In some embodiments, the relationship data comprises relationship mapping between one or more Indices, one or more assets, and/or one or more ETFs.

In some embodiments, the ownership network refers to the network of membership/ownership wherein individual securities, pooled investment securities (such as ETFs), or funds with portfolios are members. In some embodiments, the ownership network is composed of different types of properties, including but not limited to tracking, membership, and ownership. An ownership network can be composed of these members and properties, as well as others, which can be used to help identify relationships on the individual security level to the "pooled" level and vice versa. In some embodiments, an asset is not a member of an index and held by an ETF. In some embodiments, an asset is a member of an index and held by an ETF. In some embodiments, a fund tracks an index and is composed of a basket of assets or funds. In some embodiments an index is a benchmark which is calculated using the funds and/or assets which compose the benchmark.

Figure 10:
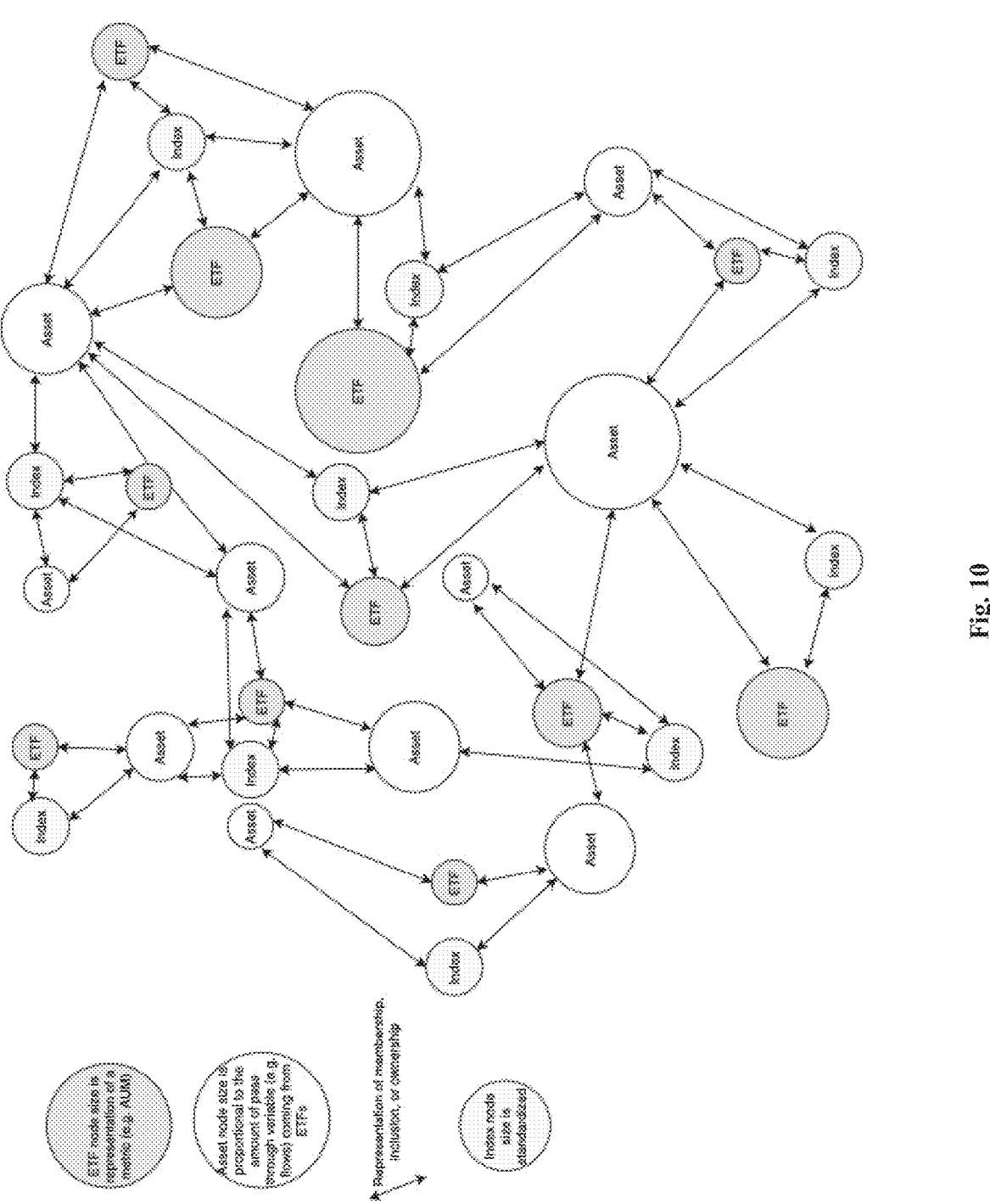
FIG. 10 shows a non-limiting example of a schematic output graph for a page rank as described herein; in this case, a schematic output graph of a relationship graph between assets and ETFs or providing passive market transparency.

FIG. 10 illustrates a non-limiting example, of data for one or more assets and one or more ETFs. In this embodiment, the relationship mapping data is displayed as a web graph. In this embodiment, the relationship mapping data is ranked, sorted and/or quantified by an algorithm, wherein the size of the bubbles for each ETF and asset represents the strength and/or impacts of the relationship between the assets and ETFs.

It is noted that ETFs are used as a non-limiting example for the use of the platforms, systems, media, and methods disclosed herein. In some embodiments, the platforms, systems, media, and methods disclosed herein, are configured to utilize, and provide passive market transparency for the ETFs and ETF data. In some embodiments, ETFs comprise exchange-traded funds, mutual funds, foreign funds, or a combination thereof. Other similar funds may be used and included.

Second Database

In some embodiments, the platforms, systems, comprise, and the methods are configured to generate a second database. In some embodiments, the second database comprises aggregated ETF data, asset data, index data, or a combination thereof. In further embodiments, the second database comprises relationship data. In some embodiments, the calculated date constitutes pass through data. In some embodiments, the second database comprises the pass through variables. In some embodiments, these pass through variables are combined with one or more standard market metrics. The one or more standard market metric may include but are not limited to open price, close price, shares outstanding, market capitalization, or a combination thereof. In some embodiments the aggregated data is standardized. In some embodiments, the platforms, systems, media, and methods disclosed herein, map relationships of one or more indices to one or more ETFs. In some embodiments, the database comprises Index to ETF relationship mapping 870. In some embodiments, the database is searchable. In some embodiments, the database is configured to return passive market activity data in response to a search query. In some embodiments the search query can be related to one or more indices, and/or one or more assets, and/or one or more ETFs. In some embodiments, the passive market activity data includes relationship maps. In some embodiments the database is searchable by one or more aspects of a relationship graph of an asset.

In some embodiments, the first database comprises data in the second database. In some embodiments, the second database comprises data in the first database.

It is noted that ETFs are used as a non-limiting example for the use of the platforms, systems, media, and methods disclosed herein. In some embodiments, the platforms, systems, media, and methods disclosed herein, are configured to utilize, and provide passive market transparency for the ETFs and ETF data. In some embodiments, ETFs comprise exchange-traded funds, mutual funds, foreign funds, or a combination thereof. Other similar funds may be used and included.

Analytics Layer

In some embodiments, the platforms, systems, media, and methods disclosed herein, provide an analytics layer configured to synthesize a first database; relationship graphs including pass through variables, and a second database, to perform a task. In some embodiments the first and second databases are generated as described above.

In some embodiments, the analytics layer is configured to aggregate one or more databases into or onto an internal storage module. In some embodiments, the one or more databases comprise one or more databased generated as described herein (such as the first data base and the second data base disclosed above), and one or more existing database. In some embodiments, the internal storage module is stored on a memory. In some embodiments, the internal storage module is searchable. In some embodiments, the internal storage module is configured to return passive market activity data in response to a search query. In some embodiments the search query can be related to one or more indices, and/or one or more assets, and/or one or more ETFs. In some embodiments, the passive market activity data includes relationship maps. In some embodiments, a search query for one or more assets pass through data returns pass through data for every asset across time series.

In some embodiments, the task can comprise providing information, analysis, recommendation, predictions, projections; and/or performing one or more actions to manage an investment portfolio or a combination thereof. In some embodiments the one or more action comprises, executing one or more trades and/or optimizing a portfolio. In some embodiments, the task comprises flagging regulatory concerns or suspicious activity. In some embodiments, the task comprises generating an actionable recommendation. In some embodiments, the task comprises making a predication. In some embodiments, the task comprises optimizing trade execution. In some embodiments, the task comprises identifying latent, hidden, or odd lot liquidity on exchange or off-exchange. In some embodiments, the task comprises generating a visual interface. In some embodiments, the visual interface is presented on a display. In some embodiments, the display is a touch screen. In some embodiments, the visual interface comprises a three-dimensional element presented on an augmented reality display or a virtual reality display. In some embodiments, the returned information is presented as text, graphs, charts, spreadsheets, images, or a combination thereof.

In some embodiments, the task comprises applying a second algorithm. In some embodiments the second algorithm determines a relative importance through calculations of asset to ETF relationship utilizing holdings and pass through data.

In some embodiments the second algorithm is a modified page-ranked algorithm. In some embodiments, the ranked, sorted and/or quantified data is displayed on a user interface. In some embodiments the ranked, sorted and/or quantified data is represented as text or a chart. In some embodiments the data and information is displayed as a list or spreadsheet. In some embodiments the data and information is displayed as a graph. In some embodiments, the graph is continuously updated and dynamic over time. In some embodiments the second algorithm is a machine learning algorithm. In some embodiments the algorithm is automated.

In some embodiments, the platforms, systems, media, and methods disclosed herein, the aggregated data and computations can be used to train generative AI models. In some embodiments, the generative AI models analyze and determine the impact and/or effect an event has had on an asset, index and/or ETF. In some embodiments, the generative AI models can analyze and predict the impact and/or effect an event will have on an asset, index and/or ETF. In some embodiments, the generative AI models can analyze and predict an event that will happen and its potential impact and/or effect on an asset, index and/or ETF.

In some embodiments, the platforms, systems, media, and methods disclosed herein comprise an analytics layer configured to advise and manage one or more portfolios.

In some embodiments, the platforms, systems, media, and methods disclosed herein, comprise an analytics layer configured to track mutual fund to ETF conversions. In some embodiments aggregated mutual fund data is used to track the flow into and out of one or more ETF. In some embodiments, relationship mapping data between one or more mutual funds and one or more ETFs. In some embodiments, the analytics layer uses aggregated ETF data to track one or more mutual funds. In some embodiments, ETF data is used to track the flow into and out of one or more ETFs. In some embodiments, ETF data is used to track the flow into and out of one or more mutual funds. In some embodiments, the platforms, systems, media, and methods disclosed herein, are configured to aggregated mutual fund data determined and calculated by an analytics layer. In some embodiments, the platforms, systems, media, and methods disclosed herein, are configured to perform a task, at least partially based on aggregated data comprising data determined or calculated by the analytics layer, as disclosed herein.

In some embodiments, the platforms, systems, and media disclosed herein, the analytics layer comprises a visualization module configured to generate a visualization of aggregated passive market data and information for one or more assets, indices, and ETFs, and the methods disclosed herein utilize the same. Many types of visualizations are suitable including, by way of non-limiting examples, infographics, graphs, charts, and other data visualizations, which may be static or animated. In particular embodiments, the visualization comprises a web graph. In further embodiments, the visualization comprises graphical representations of changes to and/or trends in the aggregated financial information and data for each topic in time series data.

FIG. 10 shows an embodiment of a web graph visualization of ranked, sorted and/or quantified ETF and asset relationship mappings. In this embodiment, a page-rank like algorithm is applied to ETF and asset data. In some embodiments, the web graph would be dynamic across time.

Referring to FIGS. 12A-12G, a series of GUIs are shown for an example of a user web-based application, which provides a front-end for an exemplary use case of the subject matter disclosed herein. In some embodiments it is a mobile-based application. In this use case, a user is presented with personalized and global market information, a user optionally provides a search query related to one or more indices, and/or one or more assets, and/or one or more ETFs and is presented financial market information related to the search query. In some embodiments, the platforms, systems, media, and methods disclosed herein, can provide market analysis or simulations or predictions; investment and/or portfolio recommendation and advice; or a combination thereof.

Figure 12A:
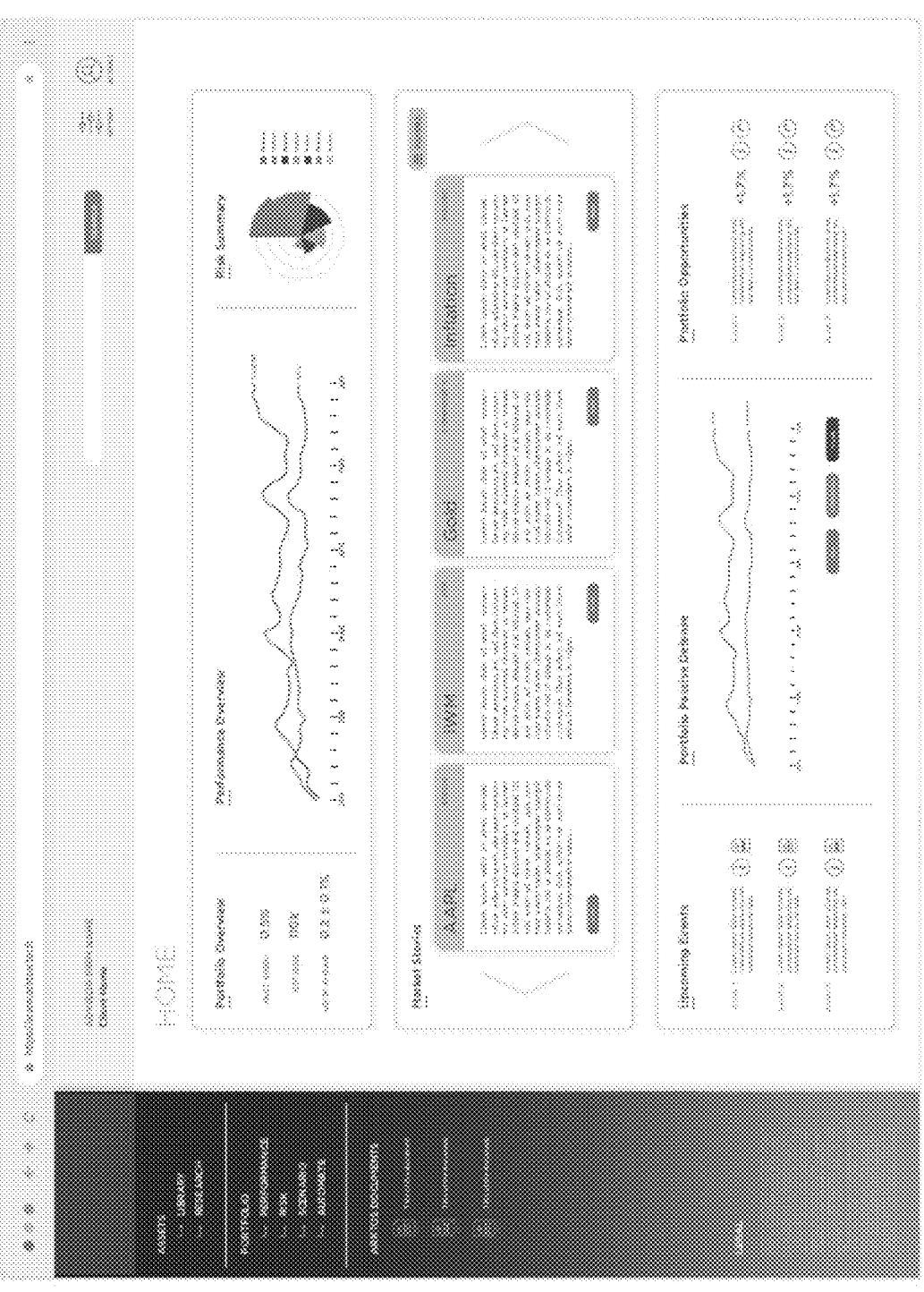
FIG. 12A shows a non-limiting example of a conceptual diagram; in this case, a conceptual diagram of a relationship mapping.

In some embodiments, the platforms, systems, media, and methods disclosed herein, providing graphical and textual passive market information to a user through a web-based user interface as illustrated in FIGS. 12A-12G. In some embodiments the user interface is a mobile application-based interface. FIG. 12A shows an embodiment, with visual and textual passive market information comprising; financial market news summaries and links; upcoming event links; a portfolio overview, performance charts, portfolio opportunity recommendations and analysis, risk summaries and graphs, passive defense graphs.

Figure 12B:
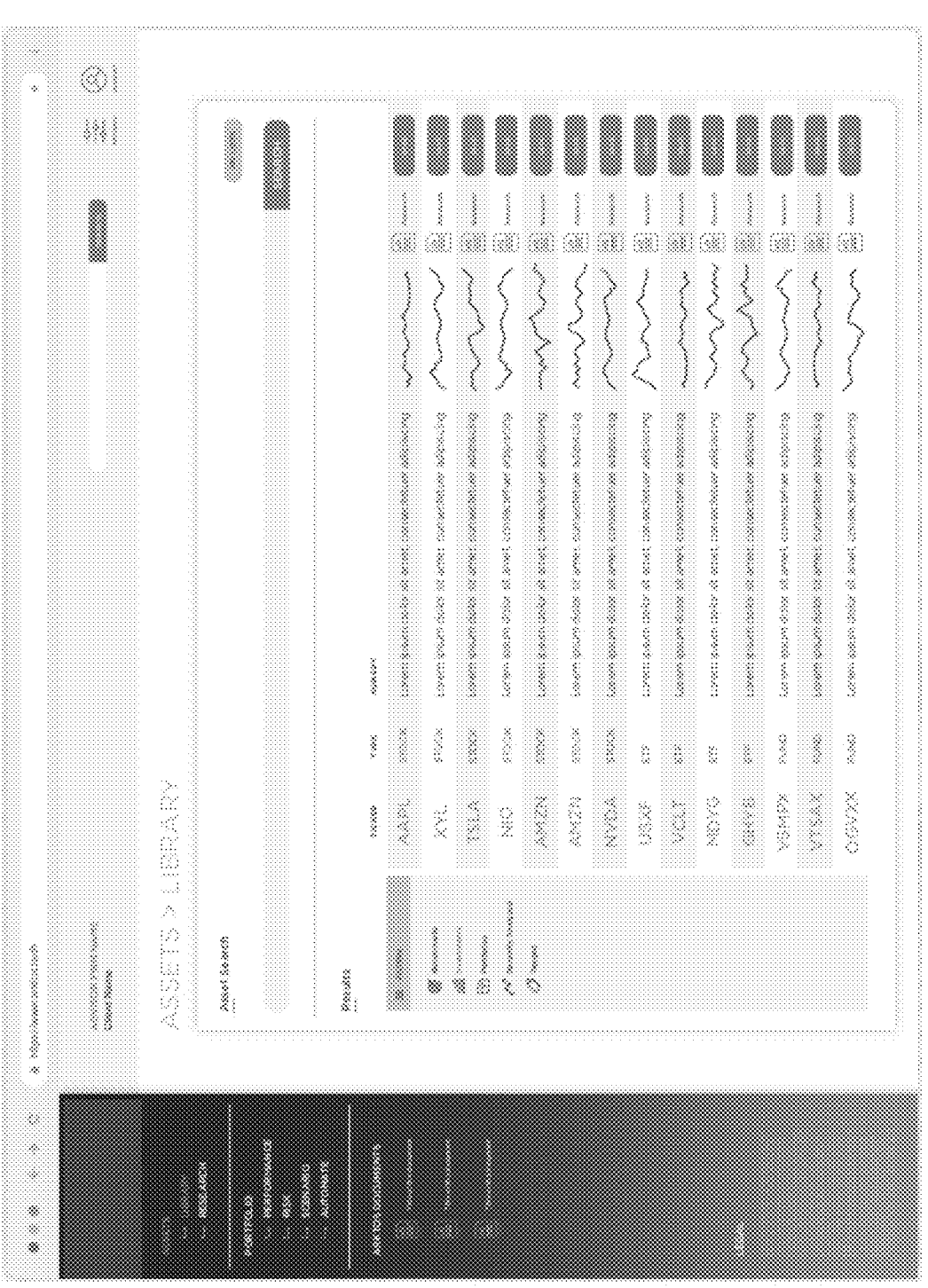
FIG. 12B shows a non-limiting example of a GUI for a webpage as described herein; in this case, a GUI including a searchable asset library screen.
Figure 12C:
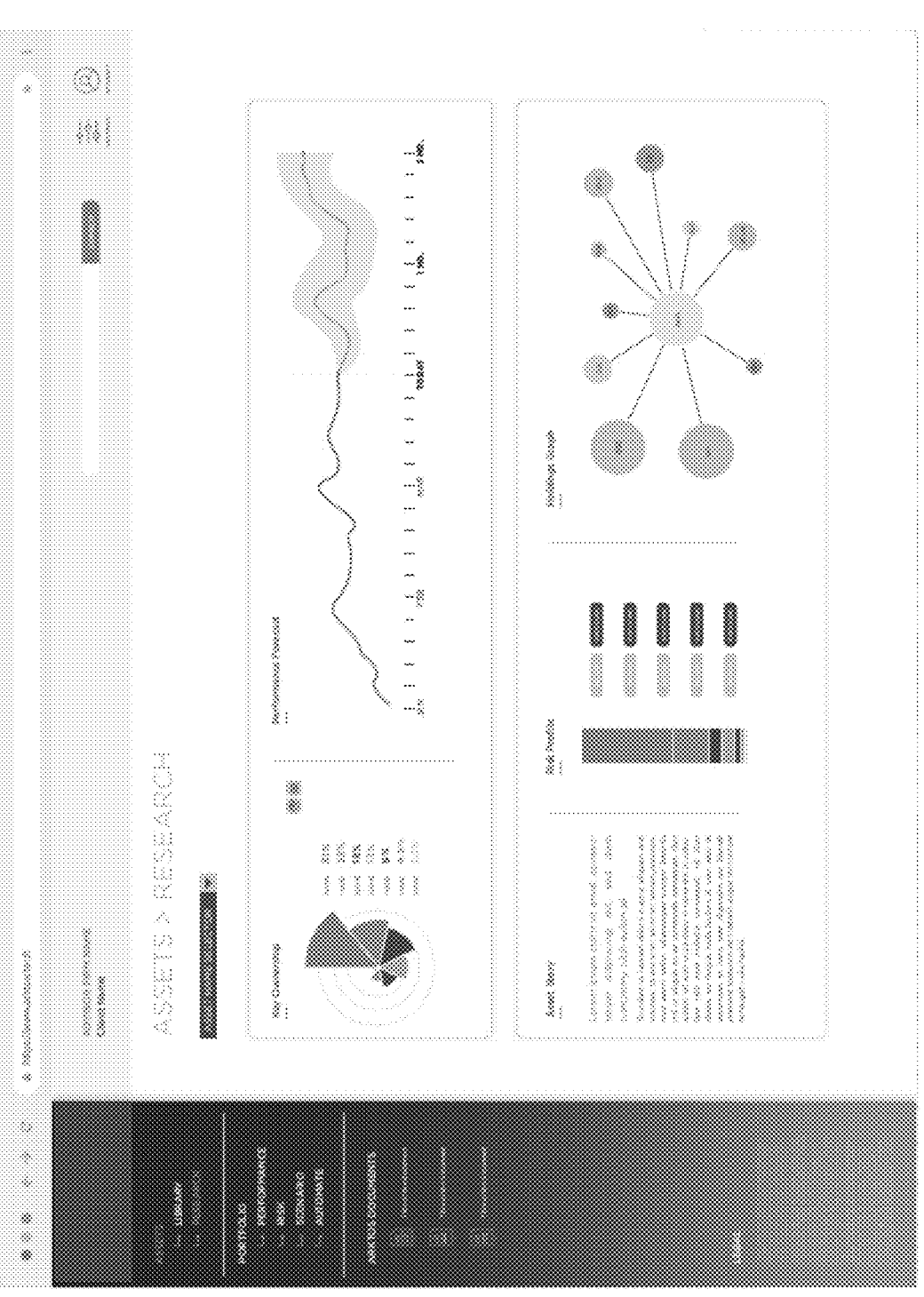
FIG. 12C shows a non-limiting example of a GUI for a webpage as described herein; in this case, a GUI including an asset research screen.

FIG. 12B shows an embodiment of an asset library search screen. FIG. 12C shows an embodiment of an asset research screen with visual and textual asset information and data. In this embodiment, the asset information and data comprise key ownership data, performance forecast charts, asset story summary, risk profile chart, a ranked holdings relationship chart. In some embodiments a user is directed to an asset research screen in response to a search query for an asset.

Figure 12D:
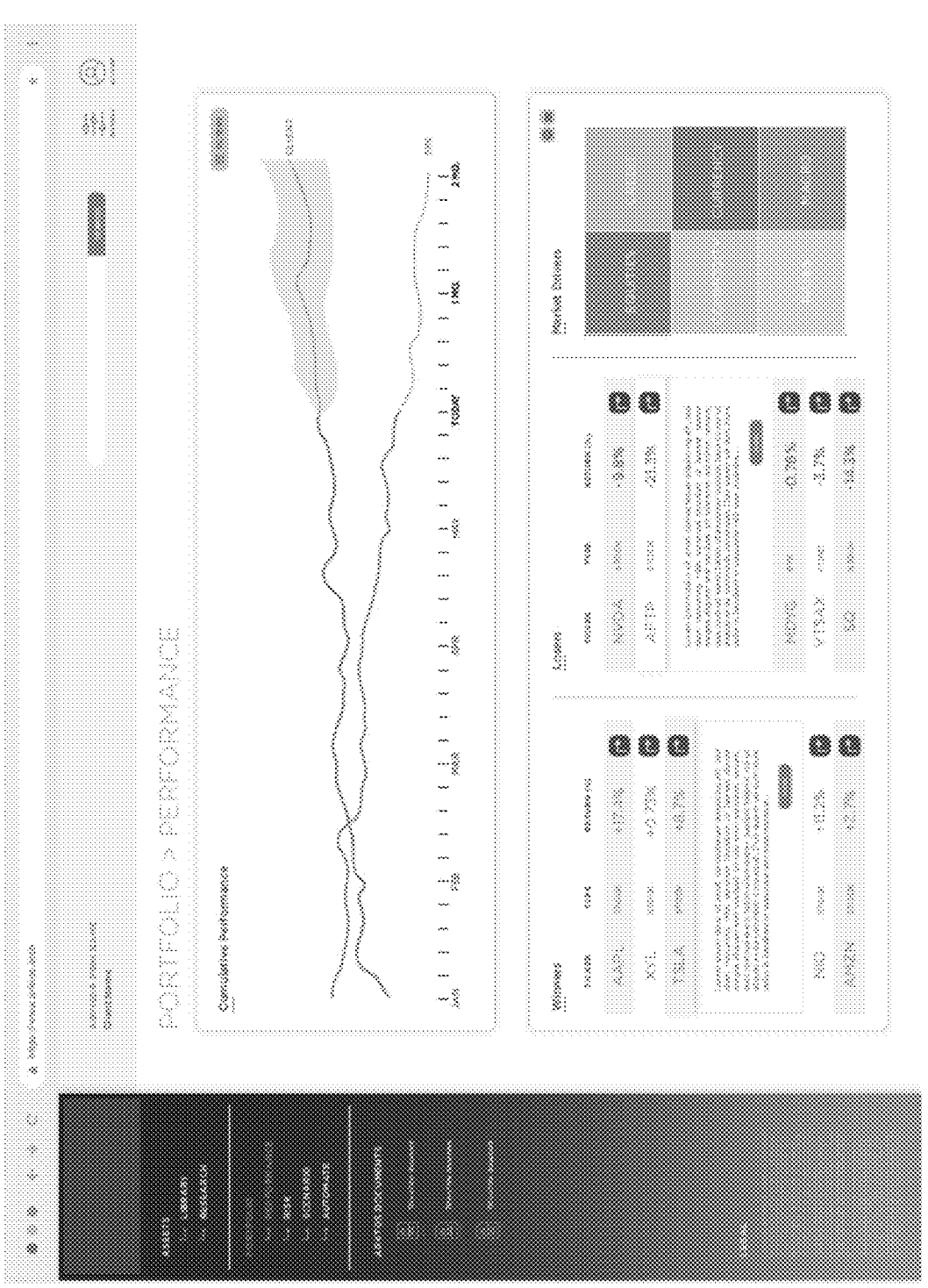
FIG. 12D shows a non-limiting example of a GUI for a webpage as described herein; in this case, a GUI including portfolio performance screen.
Figure 12E:
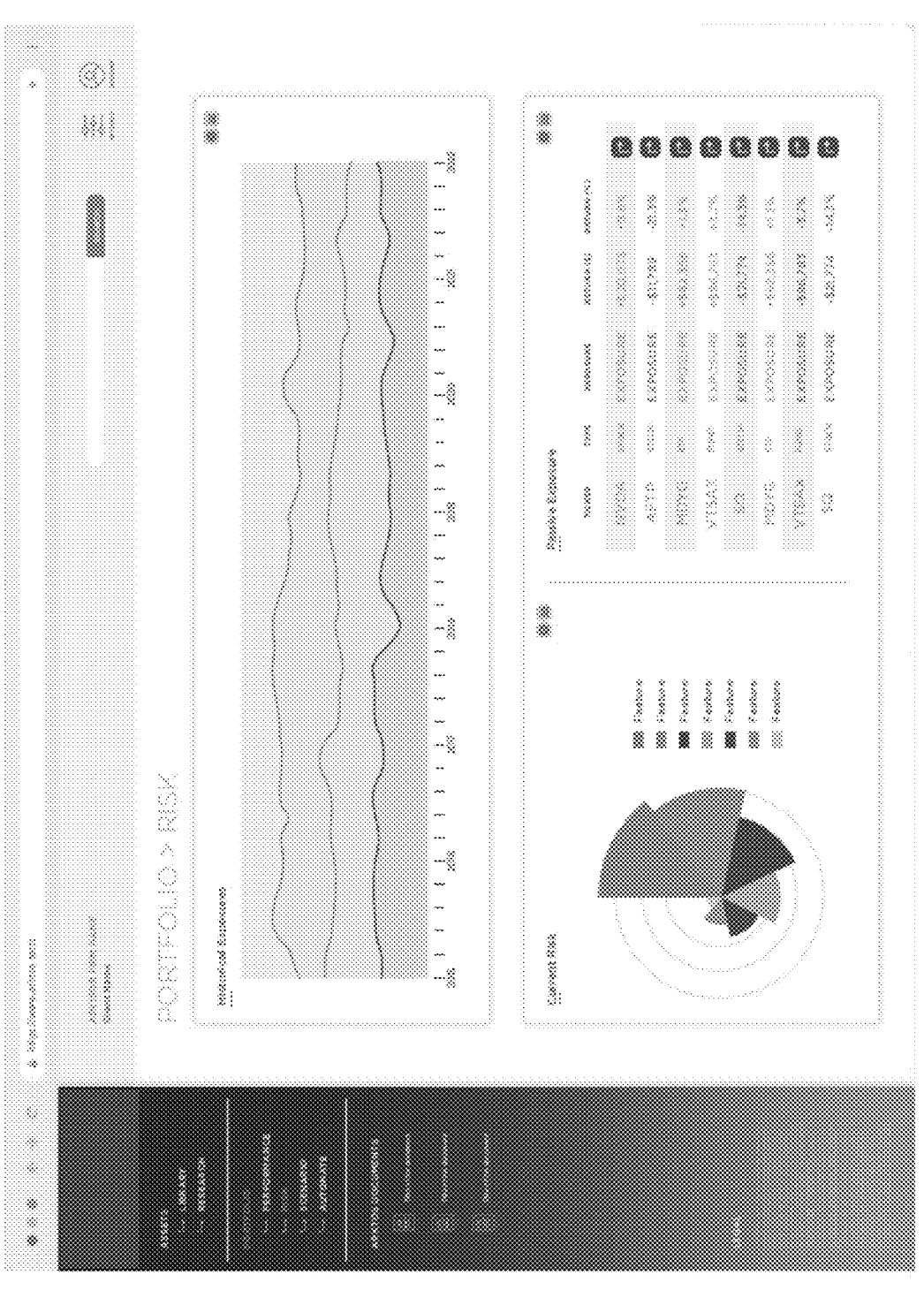
FIG. 12E shows a non-limiting example of a GUI for a webpage as described herein; in this case, a GUI including a portfolio risk screen.
Figure 12F:
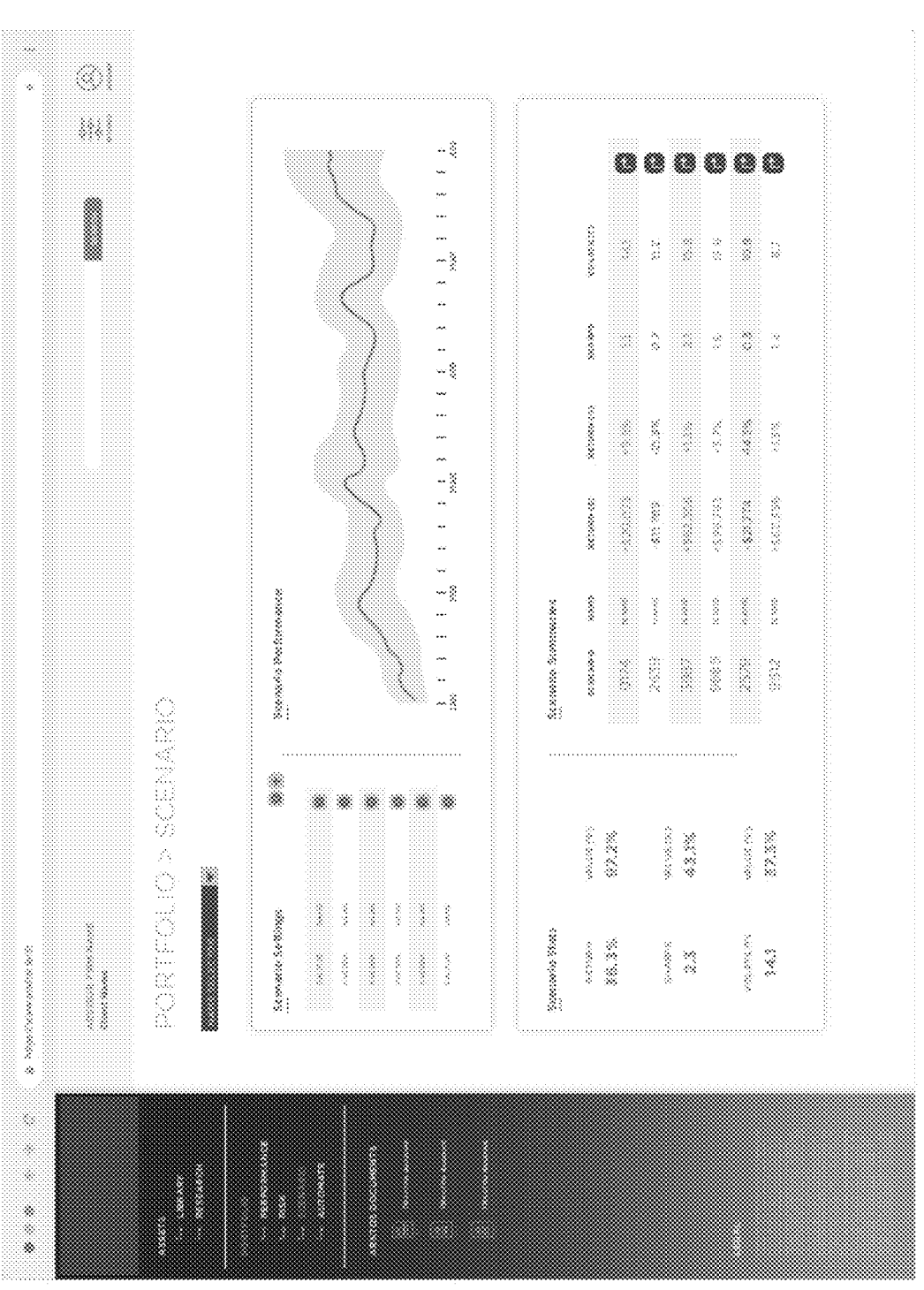
FIG. 12F shows a non-limiting example of a GUI for a webpage as described herein; in this case, a GUI including a portfolio scenario screen.

FIG. 12D shows an embodiment of a portfolio performance screen with visual and textual performance data and information. In this embodiment, the performance data and information comprise performance comparison charts; list and summary of assets that are performing well; a list of assets that are performing poorly; a link to market driver information. FIG. 12 E shows an embodiment of a portfolio risk screen with visual and textual risk information and data. In this embodiment the information and data comprise historical exposure graphs; current risk chart; and passive exposure spreadsheets and links. FIG. 12F shows an embodiment for a portfolio scenario screen with user input module and visual and textual scenario information and data. In this embodiment the portfolio scenario information comprises performance graphs, scenario statistics and scenario summary charts and links. In some embodiment, the platforms, systems, media, and methods disclosed herein, output portfolio scenario information and data in response to a user scenario input. In some embodiments a user inputs scenario factors and setting of a financial market scenario. In some embodiments the portfolio scenario predicts future scenario information and data. In some embodiments the portfolio scenario provides historical scenario information and data. In some embodiments historical scenario information and data and user scenario inputs can be saved.

Figure 12G:
FIG. 12G shows a non-limiting example of a GUI for a webpage as described herein; in this case, a GUI including portfolio automate screen.

FIG. 12G show and embodiment for a portfolio automate screen. In some embodiment, the platforms, systems, media, and methods disclosed herein, are configured to automate the management of one or more investment portfolios. In this embodiment, a user provides goal inputs and portfolio control inputs. In this embodiment, the portfolio automate screen provides projected portfolio information in data and optimized portfolio summary spreadsheets and links. In this embodiment, the projected portfolio information in data comprise efficient frontier graphs and projected portfolio statistics.

Referring to FIGS. 13A-13P, a series of user interfaces of a non-limiting example embodiment, the user interfaces depicting functionality of the platforms described herein.

FIG. 13A illustrates a non-limiting example of a trade tracker and open position monitoring interface comprising, an open position entry window 1312, wherein a trade tracker links open positions with analysis logged at time of entry; and a monitoring window 1314.

FIG. 13B illustrates a non-limiting example of a trade tracker and open position monitoring interface comprising, an open position monitoring window 1322 wherein open position data from one or more trade platforms are aggregated by sector and linked with model metrics.

FIG. 13C illustrates a non-limiting example of a short alert interface comprising a share dislocation opportunity window, wherein the platform provides automated calculations and sorting for dislocations.

FIG. 13D illustrates a non-limiting example of a trade log interface, wherein a user can input trade metrics. In some embodiments model metrics and/or inputted metrics can be saved and stored.

FIGS. 13E-13F illustrates a non-limiting example of a microflow and trade recommendation interface, comprising a flow window 1342 and a trade recommendation window 1344, wherein an algorithm weighs key metrics and ranks one or more tradeable assets. In some embodiments, trade recommendations and ranking are done daily. In some embodiments, trade recommendations and ranking are done continuously. FIG. 13F illustrates an enlarged example of the trade recommendation window highlighted from FIG. 13E.

FIGS. 13G-13H illustrate non-limiting examples of a portfolio interface.

FIGS. 13I-13J illustrate non-limiting examples of a portfolio interface. FIG. 13I illustrates a said exemplary embodiment comprising a Sector Forecast window 1352, wherein market cap weighted predictions can be aggregated and displayed by sector and/or subgroup; and/or a single name prediction window 1354, wherein single name predictions for a sector can be filter top-down. FIG. 13J illustrates a said exemplary embodiment comprising a single name forecast window, wherein settings such as dates, win rate, and/or percentage move can be adjusted to view historical predictions and outcomes.

FIGS. 13K-13P illustrate non-limiting examples of a market analysis interface. FIG. 13K illustrates a said exemplary embodiment comprising a Sector Forecast window 1362; and a rolling day sector flow window 1364, wherein historical flow data and predicted flow data can be compared and displayed. In some embodiments the rolling day sector flow window can be any time duration. FIG. 13L illustrates a said exemplary embodiment comprising a flows window 1366, wherein the interface is configured to allow a user to search and monitor actual flow data and predicted flow data. FIG. 13M illustrates a said exemplary embodiment comprising a shares held by funds window 1368, wherein fund data can be searched organized or filtered by one or more details, fields, categories, or a combination thereof. In some embodiments, the data is organized by weight/shares help. Any filtering, organizing and/or searching criteria may be used. FIG. 13N illustrates a said exemplary embodiment comprising a Sector Flow window 1372 and a rolling day sector flow window 1374, wherein historical flow data and predicted flow data can be compared and displayed. FIG. 13O illustrates a said exemplary embodiment comprising, a company stat window 1382 and a company movement window 1384. FIG. 13P illustrates a said exemplary embodiment comprising an ETF ownership window, comprising fund and asset relationship mapping.

In some embodiments, the platforms, systems, media, and methods disclosed herein, the aggregating data, determining relationship data, generating one or more databases, and performing a task comprises ETF data for one or more type of fund. In some embodiments the ETF data comprises mutual fund data, and/or foreign fund data.

The following illustrative examples are representative of embodiments of the software applications, systems, and methods disclosed herein and are not meant to be limiting in any way.

It is noted that ETFs are used as a non-limiting example for the use of the platforms, systems, media, and methods disclosed herein. In some embodiments, the platforms, systems, media, and methods disclosed herein, are configured to utilize, and provide passive market transparency for the ETFs.

Vectorized Computation

In some embodiments, the platforms, systems, media, and methods disclosed herein utilize an algorithm to perform vectorized calculations. In view of the disclosure provided herein, those of skill in the art will recognize that vectorization refers to the ability of the framework to implicitly parallelize a computation over all indices of a tensor. The parallel computing architecture of the various embodiments described herein, provide a significant performance boost over explicit iteration over indices. Tensors are represented as multi-dimensional array data structures. A non-limiting example being, a tensor containing holdings information has three indices: time, stock held, and ETF owner. This information is sufficient to represent a time-dependent graph. In various embodiments, implementation of vectorization of operations allows an algorithm to be written without explicit reference to indices such as time, asset, or ETFs, and to be performed element-wise (Hadamard operators). In some embodiments, this allows us to translate quantities between bases (or frames of reference/"in terms of x") using graph relationship analysis. In some embodiments this allows for calculation of bidirectional dataflow between two principal bases, a simple basis (e.g., a stock) and a composite basis (e.g., an ETF).

Naive vectorization relies upon mutual independence of quantities, wherein the distributed framework described herein, is capable of more general vectorization that can handle dependence and recurrence between indices. In some embodiments, the platforms, systems, media, and methods disclosed herein, can let $F(t)$ depend on $F(t-1)$, all without referring to a specific time-coordinate $t$. This is crucial due to the path-dependence in financial markets, and deviation from martingale behavior. In some embodiments, the platforms, systems, media, and methods disclosed herein, makes use of sub-vectorized dependency management algorithms to allow for concurrent calculation of dependent variable relationships, allowing platforms, systems, media, and methods to represent the full richness of a time dependent graph, and the evolving nature of cyclic paths, while still achieving excellent computational performance and requiring less computation power and storage. The current technology in the field is forced to iterate sequentially to resolve such dependencies.

In some embodiments, the platforms, systems, media, and methods disclosed herein, the aggregating data, determining relationship data, generating one or more databases, and performing a task comprises ETF data for more than one fund or investment vehicle. In some embodiments the ETF data comprises mutual fund data, and/or foreign fund data. In some embodiments, the ETF data comprises one or more of ETF ownership data, ETF relationship data, associated ETF service provider data, or a combination thereof, for the plurality of ETFs. In some embodiments, ETF data includes data related to the surrounding infrastructure (e.g., Authorized Participants (AP), market makers, creation/redemption data, AP buying/selling data, etc.).

It is noted that ETFs are used as a non-limiting example for the use of the platforms, systems, media, and methods disclosed herein. In some embodiments, the platforms, systems, media, and methods disclosed herein, are configured to utilize, and provide passive market transparency for the ETFs.

Providing Passive Market Information for a Given Asset or Portfolio

Figure 5:
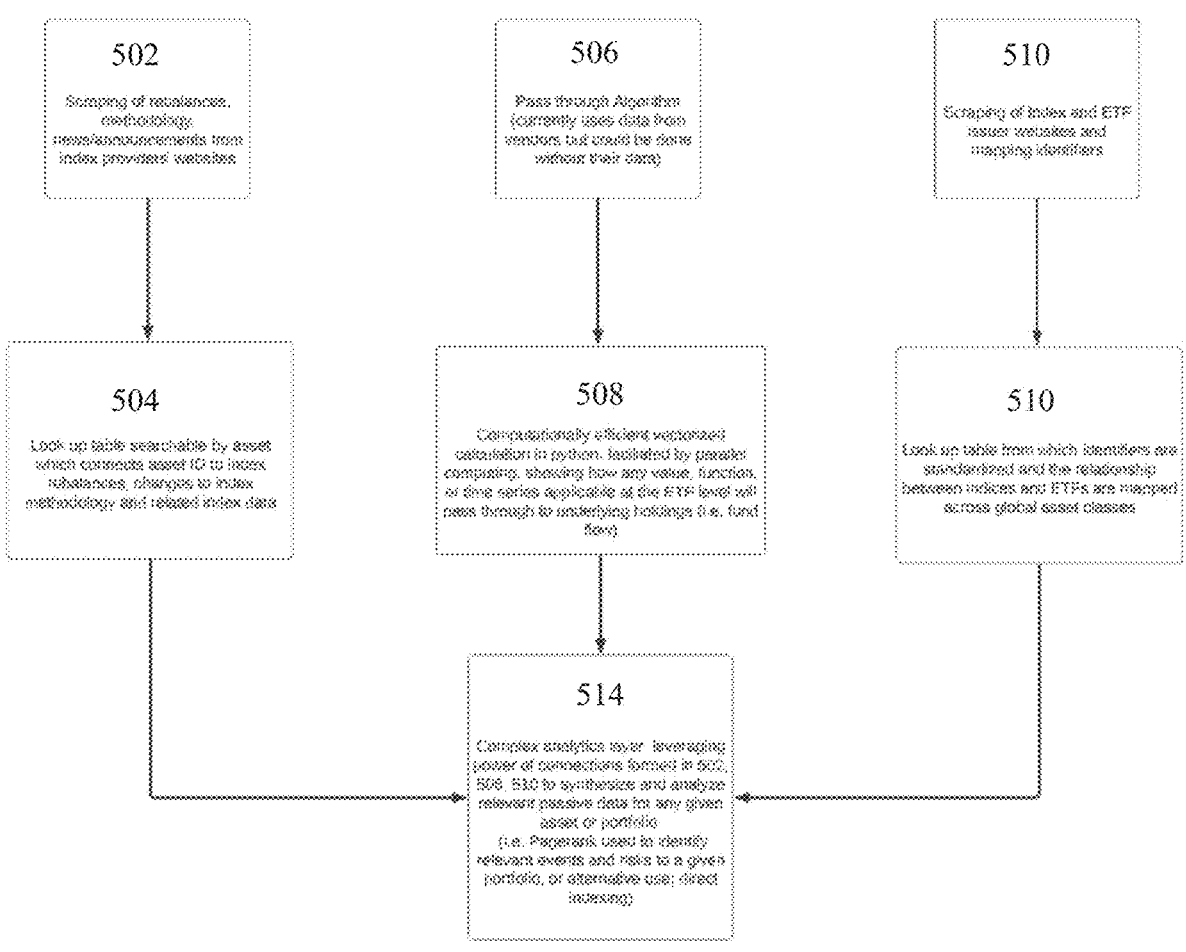
FIG. 5 shows a non-limiting example of a schematic process diagram; in this case, a process for mapping information flow across financial markets.

Referring to FIG. 5, a schematic process diagram, illustrates an exemplary technique for providing passive market transparency. In this exemplary embodiment, the process, scrapes index provider websites for rebalance, methodology, news, and announcements data 502. In this embodiment, the scraped data is aggregated and synthesized to generate a first database comprising a searchable look up table that connects asset ID to index rebalances, changes to index methodology, and related index data 504. In this embodiment, the process applies a pass through algorithm using asset data, index data, and ETF data 506. In this embodiment, the algorithm utilizes vectorized and parallel computing techniques to determine how a value, function, or time series applicable to an ETF will pass through to underlying holdings (i.e., fund flow) 508. In this embodiment, the process scrapes index issuer websites and ETF issuer websites and mapping identifiers 510. In this embodiment, the scraped and aggregated data and relationship mapping is aggregated and synthesize into a second database comprising a look up table of standardized identifiers and relationship mapping between indices and ETF across global asset classes 512. In this embodiment, the process, applies an analytics layer to the first database 504, the second database 512 and the fund flow calculations 508 to synthesize and analyze relevant passive market data for any given assets or portfolio 514. In this embodiment a second algorithm can be used to apply a page-rank like process to the data to identify and provide a user with relevant events and/or risk to a given portfolio. In some embodiments the algorithm can provide other information and analysis.

It is noted that ETFs are used as a non-limiting example for the use of the platforms, systems, media, and methods disclosed herein. In some embodiments, the platforms, systems, media, and methods disclosed herein, are configured to utilize, and provide passive market transparency for the ETFs and ETF data.

Semantic Search Engine

In some embodiments the platforms, systems, media, and methods disclosed herein, can be configured to provide a semantic Search Engine.

In some embodiments the search engine scrapes websites for passive market data, particularly related to assets, indices, and ETFs.

Parses the Scraped Data.

Analyzes the data and standardizes the taxonomy and identifiers used to refer to one or more assets, indices, and/or ETFs the parsed data relates to.

Aggregates and synthesizes the standardized data into a searchable database that links any and all identifiers that are used to refer to a same asset, index, and/or ETF. In a nonlimiting example a search query for APPL will return market information for (APPL, Apple, Mac, etc.).

It is noted that ETFs are used as a non-limiting example for the use of the platforms, systems, media, and methods disclosed herein. In some embodiments, the platforms, systems, media, and methods disclosed herein, are configured to utilize, and provide passive market transparency for the ETFs and ETF data.

Dynamic Hedging Baskets/Slippage Defense

In some embodiments, the platforms, systems, media, and methods disclosed herein, are configured to perform a task. In some embodiments, the task comprises performing and/or providing recommendations for a dynamic hedging basket sub-strategy for a portfolio. In some embodiments, that the task aims to marginally decrease exposures to passive risk factors. In some further embodiments, this is accomplished by flattening the portfolio. In some embodiments, once a portfolio has been flattened, risk models for single-name exposures can be evaluated. In some embodiments the platforms, systems, media, and methods disclosed herein, can be configured to generate an effective "basket" to hedge risk from indirect passive exposure in a portfolio. In some further embodiments, an effective "basket" can be generated by shorting (negative delta) names determined to be the most at-risk and/or longing (positive delta) names determined to be the least at-risk, within marginal basket parameters.

In some embodiments, flattening a portfolio refers to a change-of-basis, or a change of denomination, in that any index exposure (such as ETF shares held in a portfolio) is taken and translated it into single-name exposures using the index weights.

In some embodiments, the platforms, systems, media, and methods disclosed herein, are configured to perform a task. In some embodiments, the task comprises performing and/or providing recommendations for a dynamic slippage defense sub-strategy for a portfolio. In some embodiments, the platforms, systems, media, and methods disclosed herein, are configured to control the exit of one or more positions in a condensed timeline, in order to closely track a given benchmark. In some embodiments, the platforms, systems, media, and methods disclosed herein, control the selling of passive funds. In some embodiments, the platforms, systems, media, and methods disclosed herein are configured to continuously drop the price of the sell order for one or more passive funds (also known as crossing the spread) in order to transact with buyers offering lower bids and offload their position in accordance with a required timing. In some embodiments, the platforms, systems, media, and methods disclosed herein, are configured to perform and/or provide recommendation to account for the above process in reverse.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

Identifying Compliance Concerns and Conflicts of Interest

In some embodiments, the platforms, systems, media, and methods disclosed herein, are configured to perform a task. In some embodiments, the task comprises flagging regulatory concerns or suspicious/prohibited activity generated by passing through on or more variables taken from the ETF service provider ecosystem, holdings of the ETF, or both. In some embodiments, the task highlights companies, broker dealers, or participants, which benefit monetarily from certain indices or ETFs. In some embodiments, the task comprises assigning one or more companies a compliance score. In some embodiments, the task comprises assigning assets or ETFs ESG ratings. The rating may be calculated from passing through ratings calculated on the asset level and aggregating the ratings to create a composite level value. In some embodiments, platform comprises an alert system. In some embodiments, the task comprises alerting a user. The alert may include providing a user with a push notification. In some embodiments, the task comprise notifying the user when one or more metrics are anticipated to deviate substantially from baseline or threshold values. In some further embodiments, the task can be configured to generate a recommendation in response to one or more metrics deviating from baseline or threshold values. In some embodiments, a user selects one or more metrics for the system to track. In some embodiments, a user may provide the baseline or threshold values. In some further embodiments, the task can be configured to generate a recommendation to a user based on identifying an abnormality.

What is claimed is:

1. A computer-implemented method of providing passive market data transparency using a distributed computing architecture, the method comprising:

a) generating a first database, wherein generating the first database comprises i) aggregating passive market data from one or more sources, wherein the passive market data comprises index data for one or more indices, exchange traded fund (ETF) data for one or more ETFs, and asset data for one or more assets, where the aggregated passive market data comprises at least time-series data structured as one or more tensors with a plurality of indices, with a tensor represented as a multi-dimensional array data structure, ii) converting the aggregated passive market data from a non-standard format into a standard format, wherein the standard format is based on a taxonomy of the one or more indices, the one or more ETFs, and the one or more assets across the one or more sources, and iii) generating a standard identifier according to the taxonomy for each of the one or more indices, the one or more ETFs, and the one or more assets, wherein the standard identifier is linked to all identifiers used for the same asset, index, or ETF;

b) inputting the one or more tensors with the plurality of indices to a machine learning model to predict bidirectional pass through data between at least an asset and an ETF or between at least an index and an ETF in an ETF/index/asset network, with the machine learning model including a multi-dimensional representation of relational structure between the asset and the ETF or the index and the ETF as one or more bidirectional, time-series data structures, wherein the ETF/index/asset network comprises the relationships and associated non-linear interactions of one or more ETFs, one or more indices and one or more assets, wherein the bidirectional passthrough data comprise one or more characteristics, events or flows, the machine learning model comprising:

a first class of nodes and a second class of nodes, wherein one or more of the nodes in the first class represent at least first time-series data for a given bidirectional pass through data, with the first time-series data being ETF data, wherein one or more of the nodes in the second class represent at least second time-series data for the given bidirectional pass through data, with the second time-series data being index data or asset data first directional edges connecting nodes in the first class to nodes in the second class, each first edge specifying a first weight representing a first dependency between a node in the first class and a node in the second class;

second directional edges connecting nodes in the second class to nodes in the first class, each second edge specifying a second weight representing a second dependency between a node in the first class and a node in the second class;

wherein a bidirectional structure of the one or more bidirectional, time-series data structures enables frame of reference translation between nodes in the first class and nodes in the second class;

outputting, from the machine learning model, vectorized computations of bidirectional dataflow between nodes in the first and second classes;

based on the output vectorized computations, training the machine learning model to predict with increased accuracy bidirectional pass through data between nodes in the first and second classes of the machine learning model;

wherein the vectorized computations comprise parallelization of computing the bidirectional dataflow over all indices of at least one of the one or more tensors; and wherein the distributed computing architecture is configured to perform vectorization that handles dependence and recurrence between indices of the one or more tensors, including permitting a time indexed value associated with a given tensor index to depend on a value associated with a prior time index without explicit iteration over indices and without referring to a specific time-coordinate, by executing one or more sub-vectorized dependency management algorithms that perform concurrent calculation of dependent variable relationships;

c) applying, in the distributed computing architecture, the trained machine learning model over at least the time-series data to generate pass through data based at least in part on values of the bidirectional pass through data;

wherein applying the trained machine learning model comprises executing the one or more sub-vectorized dependency management algorithms to concurrently calculate dependent variable relationships in the time-series data without sequentially iterating over indices of the one or more tensors;

d) storing, in a storage device, the trained machine learning model;

e) generating a second database by aggregating the pass through data, and converting the pass through data to a standard format, wherein the standard format is based on a taxonomy of the one or more generated bidirectional, time-series data structures based at least in part on the bidirectional pass through data and their pass through effects, and generating a standard identifier according to the taxonomy, wherein the second database is searchable by the standard identifiers;

f) providing an analytics layer for synthesizing the first database, the one or more generated bidirectional, time-series data structures including the bidirectional pass through data, the pass through data, and the second database, and producing an analytics output, wherein producing the analytics output comprises:

i) receiving a search query to search, the one or more generated bidirectional, time-series data structures including the bidirectional pass through data, the pass through data, or the second database, mapping the search query to one or more of the standard identifiers, and returning a set of pass through data across the one or more dimensions of the multi-dimensional ETF/index/asset network, for the one or more standard identifiers of the search query, and ii) performing one or more tasks using the returned set of passive market data or the set of pass through data, wherein the one or more tasks comprise: mapping passive market activity, performing portfolio risk monitoring, performing direct indexing, performing compliance monitoring, performing conflict monitoring, tracking information flows, or a combination thereof; and g) generating a passive market visual interface for navigating and interpreting the analytics outputs, wherein the passive market visual interface is configured to be presented on a display, and wherein the passive market visual interface comprises at least one of a market overview window, a forecast and recommendation window, an event and flows window, an ownership window, a portfolio performance, or a risk window.

2. The method of claim 1, wherein the passive market data comprises one or more of ETF data, ownership data, relationship data, or associated ETF service provider data, for the ETF/index/asset network.

3. The method of claim 1, wherein the first database returns passive market data for a searched asset across global index providers, ETFs, or Fund Issuers.

4. The method of claim 1, wherein the ETF data comprises one or more of data related to Authorized Participants (AP), market makers, creation/redemption data, AP buying/selling data, or a combination thereof.

5. The method of claim 1, wherein aggregating and standardizing passive market data further comprises aggregating and standardizing the passive market data from multiple reporting sources and formats.

6. The method of claim 1, wherein the second database returns pass through data for a searched asset across global index providers, ETFs, or Fund Issuers.

7. The method of claim 1, wherein the time series data comprises calendar time series data.

8. The method of claim 1, wherein the time series data comprises relative time series data.

9. The method of claim 1, wherein applying the first algorithm is automated.

10. The method of claim 1, wherein the first algorithm comprises a machine learning algorithm.

11. The method of claim 1, wherein the pass through flows comprise one or more of fund flows, flows of risk or derivative/swap exposure, flows of orders or changes to existing or latent order books, flows of consolidated trades and quotes, flows of distributions/dividends or equivalent yields, flows of payments, flows of dark pool or odd lot transactional information, flows of tax liability or tax related information, flows of proxy or shareholder votes, or flows of Material Non-Public Insider Information, or a combination thereof.

12. The method of claim 1, further comprising calculating the pass through data by applying one or more of an information flow, capital flow, or data flow to the one or more bidirectional, time-series data structures.

13. The method of claim 1, further comprising calculating the pass through data based at least in part on creation and redemption variables.

14. The method of claim 1, further comprising calculating the pass through data based at least in part on AP selling and buying variables.

15. The method of claim 1, wherein the pass through data comprises passing through an integer input, a function, or a combination thereof through the one or more bidirectional, time-series data structures.

16. The method of claim 1, further comprising generating a visual display by generating an actionable recommendation or making a prediction based at least in part on the calculated pass through data.

17. The method of claim 1, wherein producing the analytics output comprises applying a second algorithm to rank, sort, and/or quantify the influence of pass through variables across the ETF/index/asset network.

18. The method of claim 17, wherein the second algorithm comprises a machine learning algorithm.

19. The method of claim 1, wherein the first database and the second database are stored in a memory.

20. The method of claim 1, wherein the aggregated ETF passive market data comprises mutual fund data and ETF data.

21. The method of claim 1, wherein the second database comprises relational information between the one or more ETFs, indices, and assets.

22. The method of claim 1, wherein the time series data comprises one or more of pricing data, market capitalization data, shares outstanding, volume data, derivative exposure data, swaps data, counter party risk data, liquidity data, leverage data, or other market or publicly reported data on the ETF or asset level.

23. The method of claim 1, wherein calculating the pass through data comprises calculating an internalization of create redeem activity by broker dealers, operational shorting activity, or other activities down to the authorized participant level for a given ETF.

24. The method of claim 1, wherein the analytics layer is configured to produce an analytics output to calculate predicted price slippage caused by passive activity and present the predicted price slippage to the user through the visual display.

25. The method of claim 1, wherein the second database is utilized to train a machine learning algorithm or a large language model.

26. The method of claim 1, wherein the analytics layer is configured to track one or more mutual fund to ETF conversions.

27. The method of claim 1, wherein the analytics layer is further configured to produce an analytics output to generate an actionable recommendation or make a prediction to hedge against risk for a portfolio.

28. The method of claim 1, wherein the visual interface is configured to display the generated bidirectional, time-series data structures, and a visual representation of the pass through data calculations mapped onto the bidirectional, time-series data structures.

29. A computer-implemented system comprising at least one processor, a memory, and instructions executable by the at least one processor to cause the at least one processor to perform operations for providing passive market data transparency using distributed computing architecture, the operations comprising:

a) generating a first database, wherein generating the first database comprises i) aggregating passive market data from one or more sources, wherein the passive market data comprises index data for one or more indices, exchange traded fund (ETF) data for one or more ETFs, and asset data for one or more assets, where the aggregated passive market data comprises at least time-series data structured as one or more tensors with a plurality of indices, with a tensor represented as a multi-dimensional array data structure, ii) converting the aggregated passive market data from a non-standard format into a standard format, wherein the standard format is based on a taxonomy of the one or more indices, the one or more ETFs, and the one or more assets across the one or more sources, and iii) generating a standard identifier according to the taxonomy for each of the one or more indices, the one or more ETFs, and the one or more assets, wherein the standard identifier is linked to all identifiers used for the same asset, index, or ETF;

b) inputting the one or more tensors with the plurality of indices to a machine learning model to predict bidirectional pass through data between at least an asset and an ETF or between at least an index and an ETF in an ETF/index/asset network, with the machine learning model including a multi-dimensional representation of relational structure between the asset and the ETF or the index and the ETF as one or more bidirectional, time-series data structures, wherein the ETF/index/ asset network comprises the relationships and associ- ated non-linear interactions of one or more ETFs, one or more indices and one or more assets, wherein the bidirectional passthrough data comprise one or more characteristics, events or flows, the machine learning model comprising:

a first class of nodes and a second class of nodes, wherein one or more of the nodes in the first class represent at least first time-series data for a given bidirectional pass through data, with the first time- series data being ETF data, wherein one or more of the nodes in the second class represent at least second time-series data for the given bidirectional pass through data, with the second time- series data being index data or asset data first direc- tional edges connecting nodes in the first class to nodes in the second class, each first edge specifying a first weight representing a first dependency between a node in the first class and a node in the second class;

second directional edges connecting nodes in the second class to nodes in the first class, each second edge specifying a second weight representing a second dependency between a node in the first class and a node in the second class;

wherein a bidirectional structure of the one or more bidirectional, time-series data structures enables frame of reference translation between nodes in the first class and nodes in the second class;

outputting, from the machine learning model, vectorized computations of bidirectional dataflow between nodes in the first and second classes;

based on the output vectorized computations, training the machine learning model to predict with increased accu- racy bidirectional pass through data between nodes in the first and second classes of the machine learning model;

wherein the vectorized computations comprise paral- lelization of computing the bidirectional dataflow over all indices of at least one of the one or more tensors; and wherein the distributed computing architecture is config- ured to perform vectorization that handles dependence and recurrence between indices of the one or more tensors, including permitting a time indexed value associated with a given tensor index to depend on a value associated with a prior time index without explicit iteration over indices and without referring to a specific time-coordinate, by executing one or more sub-vectorized dependency management algorithms that perform concurrent calculation of dependent vari- able relationships;

c) applying, in the distributed computing architecture, the trained machine learning model over at least the time- series data to generate pass through data based at least in part on values of the bidirectional pass through data;

wherein applying the trained machine learning model comprises executing the one or more sub-vectorized dependency management algorithms to concurrently calculate dependent variable relationships in the time- series data without sequentially iterating over indices of the one or more tensors;

d) storing, in a storage device, the trained machine learning model;

e) generating a second database by aggregating the pass through data, and converting the pass through data to a standard format, wherein the standard format is based on a taxonomy of the one or more generated bidirec- tional, time-series data structures based at least in part on the bidirectional pass through data and their pass through effects, and generating a standard identifier according to the taxonomy, wherein the second database is searchable by the standard identifiers;

f) providing an analytics layer for synthesizing the first database, the one or more generated bidirectional, time-series data structures including the bidirectional pass through data, the pass through data, and the second database, and producing an analytics output, wherein producing the analytics output comprises:

i) receiving a search query to search, the one or more generated bidirectional, time-series data structures including the bidirectional pass through data, the pass through data, or the second database, mapping the search query to one or more of the standard identifiers, and returning a set of pass through data across the one or more dimensions of the multi-dimensional ETF/ index/asset network, for the one or more standard identifiers of the search query, and ii) performing one or more tasks using the returned set of passive market data or the set of pass through data, wherein the one or more tasks comprise: mapping passive market activity, performing portfolio risk moni- toring, performing direct indexing, performing compli- ance monitoring, performing conflict monitoring, tracking information flows, or a combination thereof; and g) generating a passive market visual interface for navi- gating and interpreting the analytics outputs, wherein the passive market visual interface is configured to be presented on a display, and wherein the passive market visual interface comprises at least one of a market overview window, a forecast and recommendation win- dow, an event and flows window, an ownership win- dow, a portfolio performance, or a risk window.

30. Non-transitory computer-readable storage media encoded with instructions executable by one or more pro- cessors to provide a passive data transparency application comprising:

a) a software module generating a first database, wherein generating the first database comprises i) aggregating passive market data from one or more sources, wherein the passive market data comprises index data for one or more indices, exchange traded fund (ETF) data for one or more ETFs, and asset data for one or more assets, where the aggregated passive market data comprises at least time-series data struc- tured as one or more tensors with a plurality of indices, with a tensor represented as a multi-dimensional array data structure, ii) converting the aggregated passive market data from a non-standard format into a standard format, wherein the standard format is based on a taxonomy of the one or more indices, the one or more ETFs, and the one or more assets across the one or more sources, and iii) generating a standard identifier according to the tax- onomy for each of the one or more indices, the one or more ETFs, and the one or more assets, wherein the standard identifier is linked to all identifiers used for the same asset, index, or ETF;

b) a software module inputting the one or more tensors with the plurality of indices to a machine learning model to predict bidirectional pass through data between at least an asset and an ETF or between at least an index and an ETF in an ETF/index/asset network, with the machine learning model including a multi-dimensional representation of relational structure between the asset and the ETF or the index and the ETF as one or more bidirectional, time-series data structures, wherein the ETF/index/asset network comprises the relationships and associated non-linear interactions of one or more ETFs, one or more indices and one or more assets, wherein the bidirectional passthrough data comprise one or more characteristics, events or flows, the machine learning model comprising:

a first class of nodes and a second class of nodes, wherein one or more of the nodes in the first class represent at least first time-series data for a given bidirectional pass through data, with the first time-series data being ETF data, wherein one or more of the nodes in the second class represent at least second time-series data for the given bidirectional pass through data, with the second time-series data being index data or asset data first directional edges connecting nodes in the first class to nodes in the second class, each first edge specifying a first weight representing a first dependency between a node in the first class and a node in the second class;

second directional edges connecting nodes in the second class to nodes in the first class, each second edge specifying a second weight representing a second dependency between a node in the first class and a node in the second class;

wherein a bidirectional structure of the one or more bidirectional, time-series data structures enables frame of reference translation between nodes in the first class and nodes in the second class;

outputting, from the machine learning model, vectorized computations of bidirectional dataflow between nodes in the first and second classes;

based on the output vectorized computations, training the machine learning model to predict with increased accuracy bidirectional pass through data between nodes in the first and second classes of the machine learning model;

wherein the vectorized computations comprise parallelization of computing the bidirectional dataflow over all indices of at least one of the one or more tensors; and wherein the distributed computing architecture is configured to perform vectorization that handles dependence and recurrence between indices of the one or more tensors, including permitting a time indexed value associated with a given tensor index to depend on a value associated with a prior time index without explicit iteration over indices and without referring to a specific time-coordinate, by executing one or more sub-vectorized dependency management algorithms that perform concurrent calculation of dependent variable relationships;

c) a software module applying, in the distributed computing architecture, the trained machine learning model over at least the time-series data to generate pass through data based at least in part on values of the bidirectional pass through data;

wherein applying the trained machine learning model comprises executing the one or more sub-vectorized dependency management algorithms to concurrently calculate dependent variable relationships in the time-series data without sequentially iterating over indices of the one or more tensors;

d) a software module storing, in a storage device, the trained machine learning model;

e) a software module generating a second database by aggregating the pass through data, and converting the pass through data to a standard format, wherein the standard format is based on a taxonomy of the one or more generated bidirectional, time-series data structures based at least in part on the bidirectional pass through data and their pass through effects, and generating a standard identifier according to the taxonomy, wherein the second database is searchable by the standard identifiers;

f) a software module providing an analytics layer for synthesizing the first database, the one or more generated bidirectional, time-series data structures including the bidirectional pass through data, the pass through data, and the second database, and producing an analytics output, wherein producing the analytics output comprises:

i) receiving a search query to search, the one or more generated bidirectional, time-series data structures including the bidirectional pass through data, the pass through data, or the second database, mapping the search query to one or more of the standard identifiers, and returning a set of pass through data across the one or more dimensions of the multi-dimensional ETF/index/asset network, for the one or more standard identifiers of the search query, and ii) performing one or more tasks using the returned set of passive market data or the set of pass through data, wherein the one or more tasks comprise: mapping passive market activity, performing portfolio risk monitoring, performing direct indexing, performing compliance monitoring, performing conflict monitoring, tracking information flows, or a combination thereof; and g) a software module generating a passive market visual interface for navigating and interpreting the analytics outputs, wherein the passive market visual interface is configured to be presented on a display, and wherein the passive market visual interface comprises at least one of a market overview window, a forecast and recommendation window, an event and flows window, an ownership window, a portfolio performance, or a risk window.

* * * * *